(12) United States Patent
Chanda et al.

(10) Patent No.: US 11,895,023 B2
(45) Date of Patent: *Feb. 6, 2024

(54) ENABLING HARDWARE SWITCHES TO PERFORM LOGICAL ROUTING FUNCTIONALITIES

(71) Applicant: Nicira, Inc., Palo Alto, CA (US)

(72) Inventors: Anupam Chanda, San Jose, CA (US); Bruce Davie, Melbourne (AU)

(73) Assignee: NICIRA, INC., Palo Alto, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 17/525,895

(22) Filed: Nov. 13, 2021

(65) Prior Publication Data
US 2022/0078111 A1    Mar. 10, 2022

Related U.S. Application Data

(63) Continuation of application No. 15/965,903, filed on Apr. 28, 2018, now Pat. No. 11,245,621, which is a
(Continued)

(51) Int. Cl.
*H04L 45/586* (2022.01)
*H04L 12/46* (2006.01)
(Continued)

(52) U.S. Cl.
CPC ........ *H04L 45/586* (2013.01); *H04L 12/4633* (2013.01); *H04L 45/02* (2013.01); *H04L 45/745* (2013.01); *H04L 49/70* (2013.01)

(58) Field of Classification Search
None
See application file for complete search history.

(56) References Cited

U.S. PATENT DOCUMENTS

| 5,526,484 A | 6/1996 | Casper et al. |
| 5,751,967 A | 5/1998 | Raab et al. |

(Continued)

FOREIGN PATENT DOCUMENTS

| EP | 1154601 A1 | 11/2001 |
| EP | 1653688 A1 | 5/2006 |

(Continued)

OTHER PUBLICATIONS

Al-Fares, Mohammad, et al., "A Scalable, Commodity Data Center Network Architecture," SIGCOMM '08, Aug. 17-22, 2008, 12 pages, Seattle, Washington, USA.

(Continued)

*Primary Examiner* — Ajit Patel
*Assistant Examiner* — Liem H. Nguyen
(74) *Attorney, Agent, or Firm* — Quarles & Brady LLP

(57) ABSTRACT

A managed hardware forwarding element (MHFE) that performs packet forwarding operations for a logical network is described. The MHFE receives configuration data for the logical network that defines a logical router and a set of logical switches for logically connecting several end machines that operate on different host machines to several physical machines that are connected to the MHFE. The logical router also includes multiple routing components. The MHFE also receives a first forwarding table and a second forwarding table. The first forwarding table stores linking data for each logical port of each logical switch in the set of logical switches that identifies a corresponding routing component in the logical router. The second forwarding table stores a set of routes for each routing component of the logical router. The MHFE uses the first and second forwarding tables to perform packet forwarding operations at the MHFE.

20 Claims, 19 Drawing Sheets

Related U.S. Application Data continuation of application No. 14/815,865, filed on Jul. 31, 2015, now Pat. No. 9,967,182.

(51) Int. Cl.
  *H04L 45/02* (2022.01)
  *H04L 45/745* (2022.01)
  *H04L 49/00* (2022.01)

(56) References Cited

U.S. PATENT DOCUMENTS

| | | |
|---|---|---|
| 6,243,394 B1 | 6/2001 | Deng |
| 6,640,251 B1 | 10/2003 | Wiget et al. |
| 6,850,529 B1 | 2/2005 | Wong |
| 7,463,639 B1 | 12/2008 | Rekhter |
| 7,933,198 B1 | 4/2011 | Pan |
| 7,937,438 B1 | 5/2011 | Miller et al. |
| 8,046,456 B1 | 10/2011 | Miller et al. |
| 8,161,095 B2 | 4/2012 | Manion et al. |
| 8,345,688 B2 | 1/2013 | Zhou et al. |
| 8,386,642 B2 | 2/2013 | Elzur |
| 8,589,919 B2 | 11/2013 | Smith et al. |
| 8,874,876 B2 | 10/2014 | Bhadra et al. |
| 8,897,134 B2 | 11/2014 | Kern et al. |
| 8,943,490 B1 | 1/2015 | Jain et al. |
| 8,964,528 B2 | 2/2015 | Casado et al. |
| 9,014,181 B2 | 4/2015 | Lakshman et al. |
| 9,032,095 B1 | 5/2015 | Traina et al. |
| 9,100,285 B1 | 8/2015 | Choudhury et al. |
| 9,130,870 B1 | 9/2015 | Swierk et al. |
| 9,154,433 B2 | 10/2015 | Koponen et al. |
| 9,178,833 B2 | 11/2015 | Koponen et al. |
| 9,306,843 B2 | 4/2016 | Koponen et al. |
| 9,319,375 B2 | 4/2016 | Gross et al. |
| 9,331,940 B2 | 5/2016 | Balus et al. |
| 9,369,426 B2 | 6/2016 | Koponen et al. |
| 9,397,946 B1 | 7/2016 | Yadav |
| 9,455,901 B2 | 9/2016 | Davie et al. |
| 9,485,149 B1 | 11/2016 | Traina et al. |
| 9,577,927 B2 | 2/2017 | Hira et al. |
| 9,621,461 B2 | 4/2017 | Sun |
| 9,633,040 B2 | 4/2017 | Lee |
| 9,667,541 B2 | 5/2017 | Song |
| 9,699,070 B2 | 7/2017 | Davie et al. |
| 9,755,965 B1 | 9/2017 | Yadav et al. |
| 9,819,581 B2 | 11/2017 | Chanda et al. |
| 9,847,938 B2 | 12/2017 | Chanda et al. |
| 9,917,799 B2 | 3/2018 | Chanda |
| 9,923,815 B2 | 3/2018 | Assarpour et al. |
| 9,942,058 B2 | 4/2018 | Chanda et al. |
| 9,948,577 B2 | 4/2018 | Chanda |
| 9,967,182 B2 | 5/2018 | Chanda et al. |
| 9,979,593 B2 | 5/2018 | Chanda et al. |
| 9,992,112 B2 | 6/2018 | Chanda |
| 9,998,324 B2 | 6/2018 | Chanda et al. |
| 9,998,375 B2 | 6/2018 | Chanda |
| 10,153,965 B2 | 12/2018 | Davie et al. |
| 10,182,035 B2 | 1/2019 | Basler |
| 10,200,343 B2 | 2/2019 | Chanda et al. |
| 10,230,576 B2 | 3/2019 | Chanda et al. |
| 10,250,553 B2 | 4/2019 | Chanda et al. |
| 10,263,828 B2 | 4/2019 | Chanda et al. |
| 10,313,186 B2 | 6/2019 | Wang et al. |
| 10,411,912 B2 | 9/2019 | Chanda et al. |
| 10,447,618 B2 | 10/2019 | Chanda |
| 10,554,484 B2 | 2/2020 | Chanda et al. |
| 10,659,431 B2 | 5/2020 | Basler |
| 10,764,111 B2 | 9/2020 | Chanda et al. |
| 10,805,152 B2 | 10/2020 | Chanda et al. |
| 10,924,386 B2 | 2/2021 | Davie et al. |
| 11,005,683 B2 | 5/2021 | Chanda et al. |
| 11,032,234 B2 | 6/2021 | Chanda et al. |
| 11,095,513 B2 | 8/2021 | Wang et al. |
| 11,196,682 B2 | 12/2021 | Chanda |
| 11,245,621 B2 * | 2/2022 | Chanda ................ H04L 45/586 |
| 11,368,431 B2 | 6/2022 | Basler |
| 11,502,898 B2 | 11/2022 | Chanda et al. |
| 2002/0001310 A1 | 1/2002 | Mai et al. |
| 2002/0065919 A1 | 5/2002 | Taylor et al. |
| 2002/0093952 A1 | 7/2002 | Gonda |
| 2003/0041170 A1 | 2/2003 | Suzuki |
| 2003/0163645 A1 | 8/2003 | Tremblay et al. |
| 2004/0037279 A1 | 2/2004 | Zelig et al. |
| 2004/0052216 A1 | 3/2004 | Roh |
| 2004/0267866 A1 | 12/2004 | Carollo et al. |
| 2005/0163115 A1 | 7/2005 | Dontu et al. |
| 2005/0262132 A1 | 11/2005 | Morita et al. |
| 2006/0092940 A1 | 5/2006 | Ansari et al. |
| 2007/0028039 A1 | 2/2007 | Gupta et al. |
| 2007/0115961 A1 | 5/2007 | Dorenbosch et al. |
| 2008/0189769 A1 | 8/2008 | Casado et al. |
| 2008/0215586 A1 | 9/2008 | Pruet |
| 2009/0006603 A1 | 1/2009 | Duponchel et al. |
| 2009/0135823 A1 | 5/2009 | Liu et al. |
| 2009/0150527 A1 | 6/2009 | Tripathi et al. |
| 2009/0161547 A1 | 6/2009 | Riddle et al. |
| 2011/0026521 A1 | 2/2011 | Gamage et al. |
| 2011/0075674 A1 | 3/2011 | Li et al. |
| 2011/0090911 A1 | 4/2011 | Tao et al. |
| 2011/0131361 A1 | 6/2011 | Itakura |
| 2011/0158086 A1 | 6/2011 | Sakauchi et al. |
| 2011/0206047 A1 | 8/2011 | Donthamsetty et al. |
| 2011/0286326 A1 | 11/2011 | Awano |
| 2011/0299537 A1 | 12/2011 | Saraiya et al. |
| 2011/0317559 A1 | 12/2011 | Kern et al. |
| 2012/0011106 A1 | 1/2012 | Reid et al. |
| 2012/0084406 A1 | 4/2012 | Kumbalimutt |
| 2012/0147898 A1 | 6/2012 | Koponen et al. |
| 2012/0215876 A1 | 8/2012 | Ohtake |
| 2012/0236761 A1 | 9/2012 | Yang et al. |
| 2012/0278802 A1 | 11/2012 | Nilakantan et al. |
| 2012/0290694 A9 | 11/2012 | Marl et al. |
| 2012/0303835 A1 | 11/2012 | Kempf et al. |
| 2013/0044636 A1 * | 2/2013 | Koponen ................ H04L 45/04 370/254 |
| 2013/0044641 A1 | 2/2013 | Koponen et al. |
| 2013/0051399 A1 | 2/2013 | Zhang et al. |
| 2013/0054773 A1 | 2/2013 | Onoue |
| 2013/0058208 A1 | 3/2013 | Pfaff et al. |
| 2013/0058225 A1 | 3/2013 | Casado et al. |
| 2013/0058229 A1 | 3/2013 | Casado et al. |
| 2013/0058350 A1 | 3/2013 | Fulton |
| 2013/0058351 A1 | 3/2013 | Casado et al. |
| 2013/0060929 A1 | 3/2013 | Koponen et al. |
| 2013/0103817 A1 * | 4/2013 | Koponen ................ H04L 45/42 709/223 |
| 2013/0103818 A1 | 4/2013 | Koponen et al. |
| 2013/0114466 A1 | 5/2013 | Koponen et al. |
| 2013/0121209 A1 | 5/2013 | Padmanabhan et al. |
| 2013/0132533 A1 | 5/2013 | Padmanabhan et al. |
| 2013/0223454 A1 | 8/2013 | Dunbar et al. |
| 2013/0287026 A1 | 10/2013 | Davie |
| 2013/0315246 A1 | 11/2013 | Zhang et al. |
| 2013/0322453 A1 | 12/2013 | Allan |
| 2013/0329548 A1 | 12/2013 | Nakil et al. |
| 2013/0336134 A1 | 12/2013 | Bao et al. |
| 2014/0029451 A1 | 1/2014 | Nguyen |
| 2014/0029618 A1 | 1/2014 | Janardhanan |
| 2014/0071986 A1 | 3/2014 | Sobe |
| 2014/0101467 A1 | 4/2014 | Jubran et al. |
| 2014/0195666 A1 | 7/2014 | Dumitriu et al. |
| 2014/0201738 A1 | 7/2014 | Choi et al. |
| 2014/0229605 A1 | 8/2014 | Besser |
| 2014/0247753 A1 | 9/2014 | Koponen et al. |
| 2014/0269290 A1 * | 9/2014 | Cors ................... H04L 49/501 370/232 |
| 2014/0269683 A1 | 9/2014 | Bhagavathiperumal et al. |
| 2014/0269709 A1 | 9/2014 | Benny et al. |
| 2014/0301391 A1 | 10/2014 | Krishnan et al. |
| 2014/0348161 A1 | 11/2014 | Koponen et al. |
| 2014/0362775 A1 | 12/2014 | Steiner et al. |
| 2015/0009992 A1 | 1/2015 | Zhang |
| 2015/0016287 A1 * | 1/2015 | Ganichev ................ H04L 43/10 370/252 |

(56) References Cited

U.S. PATENT DOCUMENTS

| | | | |
|---|---|---|---|
| 2015/0016469 A1* | 1/2015 | Ganichev | H04L 45/00 370/429 |
| 2015/0100560 A1 | 4/2015 | Davie et al. | |
| 2015/0100675 A1 | 4/2015 | Davie et al. | |
| 2015/0100704 A1 | 4/2015 | Davie et al. | |
| 2015/0103838 A1 | 4/2015 | Zhang et al. | |
| 2015/0124586 A1 | 5/2015 | Pani | |
| 2015/0124809 A1 | 5/2015 | Edsall et al. | |
| 2015/0124821 A1 | 5/2015 | Chu et al. | |
| 2015/0195178 A1 | 7/2015 | Bhattacharya et al. | |
| 2015/0215189 A1 | 7/2015 | Lim | |
| 2015/0281075 A1 | 10/2015 | Park et al. | |
| 2015/0312117 A1 | 10/2015 | Behera et al. | |
| 2015/0326425 A1 | 11/2015 | Natarajan et al. | |
| 2015/0326524 A1 | 11/2015 | Tankala et al. | |
| 2015/0334696 A1 | 11/2015 | Gu et al. | |
| 2015/0372906 A1 | 12/2015 | Tirat | |
| 2015/0379150 A1 | 12/2015 | Duda | |
| 2015/0381428 A1 | 12/2015 | Ong | |
| 2016/0014039 A1 | 1/2016 | Reddy et al. | |
| 2016/0014073 A1 | 1/2016 | Reddy et al. | |
| 2016/0173535 A1 | 6/2016 | Barabash et al. | |
| 2016/0197824 A1 | 7/2016 | Lin et al. | |
| 2016/0212222 A1 | 7/2016 | Bultema et al. | |
| 2016/0232019 A1 | 8/2016 | Shah et al. | |
| 2016/0308690 A1 | 10/2016 | Chanda et al. | |
| 2016/0337896 A1 | 11/2016 | Rajagopalan et al. | |
| 2016/0352613 A1 | 12/2016 | Narayanan et al. | |
| 2016/0352633 A1 | 12/2016 | Kapadia et al. | |
| 2016/0380812 A1 | 12/2016 | Chanda et al. | |
| 2017/0034002 A1 | 2/2017 | Sinn | |
| 2017/0034051 A1 | 2/2017 | Chanda et al. | |
| 2017/0034052 A1 | 2/2017 | Chanda et al. | |
| 2017/0034053 A1 | 2/2017 | Chanda et al. | |
| 2017/0063608 A1 | 3/2017 | Wang et al. | |
| 2017/0085502 A1 | 3/2017 | Biruduraju | |
| 2017/0093617 A1 | 3/2017 | Chanda et al. | |
| 2017/0093618 A1 | 3/2017 | Chanda et al. | |
| 2017/0093636 A1 | 3/2017 | Chanda et al. | |
| 2017/0093646 A1 | 3/2017 | Chanda et al. | |
| 2017/0093686 A1 | 3/2017 | Uttaro et al. | |
| 2017/0093758 A1 | 3/2017 | Chanda | |
| 2017/0126615 A1 | 5/2017 | Chanda et al. | |
| 2017/0171055 A1 | 6/2017 | Wang et al. | |
| 2017/0171077 A1 | 6/2017 | Chanda | |
| 2017/0171078 A1 | 6/2017 | Chanda | |
| 2017/0171113 A1 | 6/2017 | Chanda | |
| 2017/0208097 A1 | 7/2017 | Kirby et al. | |
| 2017/0272316 A1 | 9/2017 | Johnson et al. | |
| 2017/0317928 A1 | 11/2017 | Gude et al. | |
| 2017/0339054 A1* | 11/2017 | Yadav | H04L 41/5054 |
| 2017/0366446 A1 | 12/2017 | Davie et al. | |
| 2018/0007004 A1 | 1/2018 | Basler | |
| 2018/0007005 A1 | 1/2018 | Chanda et al. | |
| 2018/0013687 A1 | 1/2018 | Jin et al. | |
| 2018/0026895 A1 | 1/2018 | Wang et al. | |
| 2018/0183730 A1 | 6/2018 | Chanda | |
| 2018/0219699 A1 | 8/2018 | Chanda et al. | |
| 2018/0241622 A1 | 8/2018 | Chanda et al. | |
| 2018/0241672 A1 | 8/2018 | Chanda et al. | |
| 2018/0248796 A1 | 8/2018 | Chanda et al. | |
| 2019/0089622 A1 | 3/2019 | Davie et al. | |
| 2019/0141011 A1 | 5/2019 | Basler | |
| 2019/0207904 A1 | 7/2019 | Chanda et al. | |
| 2019/0238393 A1 | 8/2019 | Chanda et al. | |
| 2019/0260637 A1 | 8/2019 | Wang et al. | |
| 2019/0356512 A1 | 11/2019 | Chanda et al. | |
| 2020/0021541 A1 | 1/2020 | Chanda | |
| 2020/0366553 A1 | 11/2020 | Chanda et al. | |
| 2020/0396206 A1 | 12/2020 | Basler | |
| 2021/0243112 A1 | 8/2021 | Davie et al. | |

FOREIGN PATENT DOCUMENTS

| | | |
|---|---|---|
| JP | 2003069609 A | 3/2003 |
| WO | 2005112390 A1 | 11/2005 |
| WO | 2008095010 A1 | 8/2008 |

OTHER PUBLICATIONS

Graubner, Pablo, et al., "Cloud Computing: Energy-Efficient Virtual Machine Consolidation," IT Professional, Mar. 2013, 7 pages, vol. 15, Issue 2, IEEE.

Pfaff, Ben, et al., "The Open vSwitch Database Management Protocol," draft-pfaff-ovsdb- proto-00, Aug. 20, 2012, 34 pages, Nicira, Inc., Palo Alto, California, USA.

* cited by examiner

ENABLING HARDWARE SWITCHES TO PERFORM LOGICAL ROUTING FUNCTIONALITIES

CLAIM OF BENEFIT TO PRIOR APPLICATIONS

This application is a continuation application of U.S. patent application Ser. No. 15/965,903, filed Apr. 28, 2018, now published as U.S. Patent Publication 2018/0248796. U.S. patent application Ser. No. 15/965,903 is a continuation application of U.S. patent application Ser. No. 14/815,865, filed Jul. 31, 2015, now issued as U.S. Pat. No. 9,967,182. U.S. Patent Publication 2018/0248796 and U.S. Pat. No. 9,967,182 are incorporated herein by reference.

BACKGROUND

There is a growing movement, driven by both industry and academia, towards a new network control paradigm called Software-Defined Networking (SDN). In Software-Defined Networking (SDN), a control plane implements and maintains the control logic that governs the forwarding behavior of shared network switching elements on a per user basis. A virtual network that is implemented for a tenant of a hosting system is a good example of an SDN. The virtual (logical) network of a tenant of the hosting system connects a set of data compute nodes (e.g., virtual machines) that are assigned to the tenant, to each other and to other virtual and/or physical networks through a set of logical switches and logical routers.

One of the challenges in today's hosting system networks is extending the virtual networks (e.g., of one or more tenants) to other physical networks through hardware switches (e.g., third-party hardware switches).

BRIEF SUMMARY

Some embodiments provide a novel method of configuring a logical router of a logical network on a managed hardware forwarding element (MHFE) in order for the MHFE to implement the logical network and to perform logical routing functionalities. In some embodiments, the method is performed by a control plane that configures and manages one or more logical networks for one or more tenants of a hosting system (e.g., a datacenter). In some embodiments, a logical network of the hosting system includes a set of logical forwarding elements (e.g., logical switches and routers) that logically connects different end machines (e.g., virtual machines, containers, etc.) that run on different host machines. Some embodiments configure a logical router of a logical network on the MHFE (e.g., a third-party hardware switch such as a top-of-rack or TOR switch or other appliances such as firewalls, load balancers, etc.) to enable the physical workloads connected to the MHFE (e.g., third-party servers connected to a TOR switch) to exchange network data with other end machines and/or external networks that are connected to the logical network.

In some embodiments, the control plane receives a definition of a logical router (e.g., through an application programming interface or API) and defines several routing components for the logical router. Each of these routing components is separately assigned a set of routes and a set of logical interfaces. Each logical interface (also referred to as logical port) of each routing component is also assigned a network layer (e.g., Internet Protocol or IP) address and a data link layer (e.g., media access control or MAC) address.

In some embodiments, the several routing components defined for a logical router include a single distributed router (also referred to as distributed routing component) and several different service routers (also referred to as service routing components). In addition, the control plane of some embodiments defines a transit logical switch (TLS) for handling communications between the components internal to the logical router (i.e., between the distributed router and the service routers).

The control plane of some embodiments configures and manages one or more logical networks for one or more tenants of a hosting system (e.g., a datacenter). In some embodiments, a logical network of the hosting system logically connects a set of end machines (e.g., virtual machines, physical servers, containers, etc.) and a set of physical machines using a set of logical forwarding elements (e.g., logical L2 and L3 switches). In some embodiments, different subsets of end machines reside on different host machines that execute managed forwarding elements (MFEs). The MFEs implement the logical forwarding elements of the logical network to which the local end machines are logically connected. Additionally, the logical forwarding elements are implemented by one or more MHFEs in order to connect the physical machines that are connected to the MHFEs to the other end machines of the logical network. In other words, each of the host machines executes an MFE that processes packets sent to and received from the end machines residing on the host machine, and exchanges these packets with other MFEs operating on other host machines as well as the MHFEs (e.g., through tunnels). The MFE of some embodiments is a software instance that is implemented in the virtualization software (e.g., a hypervisor) of the host machine.

Some embodiments implement the distributed routing component of the logical router in a distributed manner across the different MFEs and the MHFE. Some embodiments implement each of the service routing components of the logical network on an edge node (e.g., a gateway), which is a machine at the edge of the network (e.g., the datacenter network), in order to communicate with one or more external networks. Each of the service components has an uplink interface (port) for communicating with an external network as well as a TLS interface (port) for connecting to the transit logical switch and communicating the network data with the distributed routing component of the logical router that is also connected to the transit logical router.

Some embodiments configure both the distributed component and the service components of the logical router on an MHFE. In other words, in some embodiments, the MHFE acts as the edge node of the logical router by implementing the service routers (components) of the logical router for exchanging network data with the external networks. When the control plane receives a definition of a logical router, in which, the uplink port of the logical router is bound to a physical port of an MHFE (i.e., the physical port is assigned the same IP and MAC addresses of the uplink port), the control plane instantiates both the distributed component and service components of the logical router on the MHFE. The control plane further defines a new uplink logical switch (ULS) for handling the communications between the SRs implemented on the MHFE and the external networks.

In some embodiments, the control plane defines the southbound interface of the uplink logical switch (ULS) to be associated with the physical port of the edge MHFE that is assigned the MAC and IP addresses of the uplink port of the logical router. In some such embodiments, the control plane defines the northbound interface of the ULS to be associated with an external network (e.g., a southbound port of a next hop physical router that connects the logical network to one or more external networks).

In order to configure and manage the different components of a logical router as well as other logical forwarding elements (e.g., logical L2 switches) of a logical network, some embodiments configure a set of database tables (e.g., forwarding tables of the forwarding elements) on the MHFE using an open source protocol (e.g., an open vSwitch database management (OVSDB) protocol), which is recognizable by the MHFE. Such an open source protocol requires minimal software to execute on the MHFE (e.g., TOR switch) and to enable the MHFE to implement the logical network forwarding elements (e.g., logical L2 and L3 forwarding elements) in order to communicate with the other machines connected to the logical network as well as other external networks.

After generating the database tables on the MHFE using the open source protocol (e.g., OVSDB), some embodiments use the database schema to propagate a particular one of the tables with the physical locator information of the logical ports of the different routing components (i.e., distributed and service routers) of the logical router. The physical locator information, in some embodiments, specifies the tunnel (e.g., Virtual Extensible LAN (VXLAN) tunnel) endpoint addresses (i.e., IP addresses) of the MFEs and MHFEs that implement the different logical forwarding elements (e.g., logical L2 and L3 switches). This table (the tunnel endpoint locator table), in some embodiments, specifies the network layer (IP) addresses of the MFEs and MHFEs that implement the logical ports of logical switches to which the machines (e.g., end machines, physical machines, etc.) and/or logical ports of the logical routers are connected. By locating the endpoints, the MFEs and MHFEs are able to establish tunnels between themselves and exchange the network data through the established tunnels (VXLAN tunnels).

In some embodiments, the generated tunnel endpoint locator table has several fields including (i) a logical switch field that species the logical switch to which a port of a machine or logical router is connected, (ii) a MAC address field that specifies the corresponding MAC address of the port, and (iii) a locator field that specifies the IP address of the tunnel endpoint for the corresponding MAC address. In order to configure the locator data of the logical ports of the different routing components on the table, some embodiments populate a record for each logical port of the distributed routing component in the table in a first manner a record for each logical port of the service routing component in a second different manner.

For each port of the distributed component that is connected to a logical forwarding element (e.g., an L2 logical switch), some embodiments generate a record and stores (i) in the logical switch field, the logical switch to which the port is connected, (ii) in the MAC address field, the MAC address of the port, and (iii) in the locator field, a fixed IP address of 127.0.0.1, or the localhost. The localhost is a loopback interface address (127.0.0.1) in networking which can be used to access the machine's own network services. In other words, when the MHFE (e.g., the VXLAN tunnel endpoint (VTEP) of the MHFE) realizes that the destination MAC address of a packet belongs to a port of the distributed routing component, the VTEP does not establish a tunnel for routing the packet. This is because the distributed routing component is implemented by every single MFE, MHFE, and gateway that participates in the logical network. As such, a packet with a destination MAC address of the logical router is not required to be routed to any other node in the network.

Some embodiments, on the other hand, populate the tunnel endpoint locator table with the tunnel endpoint data of each logical port of the service routing components that is connected to a logical forwarding element (e.g., an L2 logical switch). That is, for each logical port of the service routers, some embodiment store (i) in the logical switch field, the logical switch to which the port is connected (e.g., the transit logical switch to which the southbound port of the service component is connected), (ii) in the MAC address field, the MAC address of the port, and (iii) in the locator field, the IP address of the tunnel endpoint that implements the logical switch port to which the service component port is connected (e.g., the IP address of the gateway machine that implements the service routing component).

Some embodiments enable an MHFE (e.g., the hardware VTEP of the MHFE) to perform L3 routing functionalities on the packets that are destined for the logical router implemented by the MHFE. In order for the hardware VTEP to realize that a packet is destined for the logical router, the hardware VTEP must be able to identify the destination MAC address of the packet as a MAC address that belongs to a logical port of a routing component of the logical router. In order to enable the hardware VTEP to make such a determination, some embodiments use the database schema (e.g., OVSDB schema) to propagate configuration data that links the different database tables generated on the MHFE.

Linking the different tables allows the hardware VTEP to search the MAC address of the received packet against a logical router table that has all the MAC addresses of the different ports of the different routing constructs of the logical router. In OVSDB schema, among the different tables (e.g., forwarding tables) that are generated and configured on the MHFE, the control plane generates a logical router table on the MHFE that maps the IP addresses of the different ports of the distributed and service routing components of the logical router to the logical switches with which they are associated. On the other hand the tunnel endpoint locator table described above, includes the MAC addresses of all the different logical ports of the routing components of the logical router. In order to link these two tables together, some embodiments store the IP addresses of the ports of the logical router in an optional field of the tunnel endpoint locater table while configuring this table. In other words, the control plane uses a field of the table that has optional data (i.e., the field may or may not be used) to propagate the linking configuration data in the field.

By doing so, in some embodiments, the control plane is able to tag the MAC addresses of the logical ports of the logical router during the configuration of the tunnel endpoint locator table. That is, while the control plane is configuring the tunnel endpoint locator table, the control plane looks up the corresponding IP address of each port's MAC address in the logical router table, and when a match found, the control plane tags the corresponding MAC address of the port, in the tunnel endpoint locator table, as a logical router port's MAC address. As such, when a hardware VTEP receives a packet, the hardware VTEP simply looks up the destination MAC address of the packet in the tunnel endpoint locator table, and if the MAC address in the table is tagged as a logical router port MAC address, the hardware VTEP realized that the packet is an L3 packet and starts L3 processing on the packet.

In some other embodiments, the control plane, although populates the linking IP address in the tunnel endpoint locator table, does not tag the MAC addresses during the configuration of this table. In some such embodiments the hardware VTEP retrieves a corresponding IP address of the destination MAC address of the packet from the tunnel locator table and matches the corresponding IP address against the IP addresses of all the logical ports of the routing components that are stored in the logical router table in the OVSDB schema (i.e., the logical router table configured on the MHFE). When the hardware VTEP finds a match for the IP address in the logical router table, the hardware VTEP realizes that the destination MAC address of the packet is in fact a MAC address of one of the logical router ports. As such, the hardware VTEP starts to perform routing functionalities on the packet (e.g., the hardware VTEP modifies the source and destination MAC addresses in the packet headers to route the packet to the next hop).

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
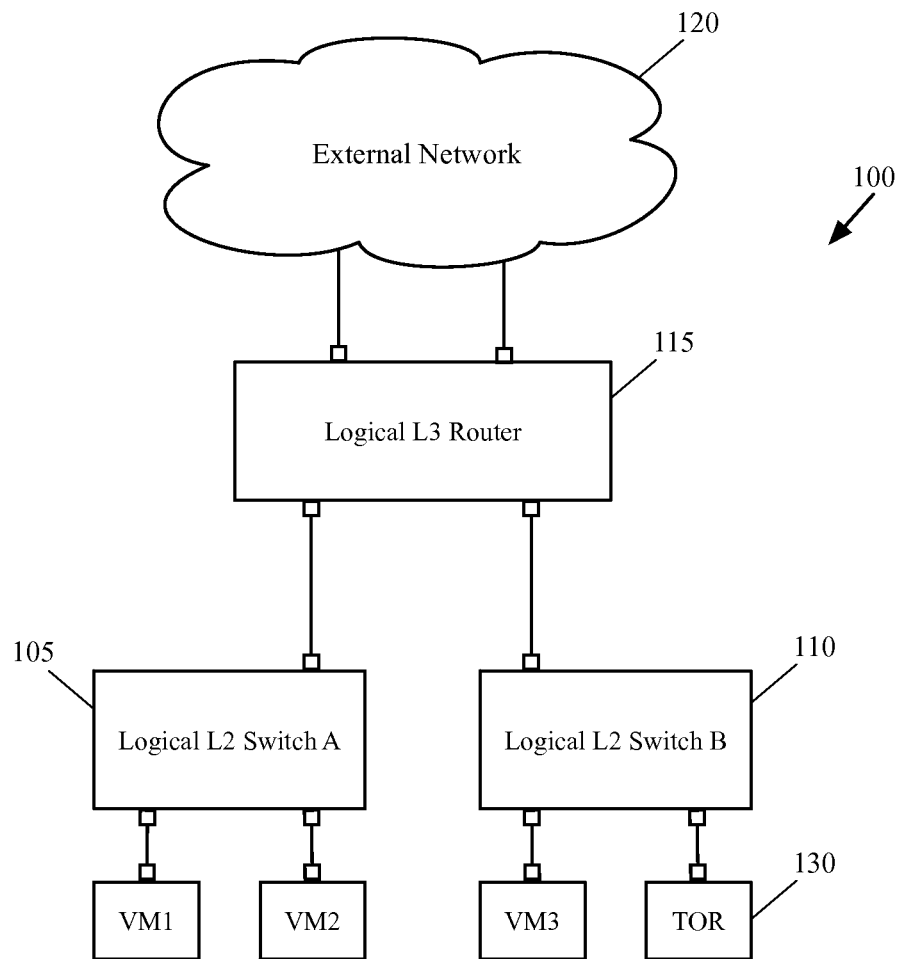
FIG. 1 illustrates a configuration view of a logical router, which represents a logical network as designed by a user.

In the following detailed description of the invention, numerous details, examples, and embodiments of the invention are set forth and described. However, it should be understood that the invention is not limited to the embodiments set forth and that the invention may be practiced without some of the specific details and examples discussed.

A new schema (i.e., OVSDB schema) that allows the control plane to configure hardware switches to implement different logical networks (for different tenants) has recently been introduced to the market. Some embodiments provide methods to improve this new schema in order to implement different logical network elements (e.g., logical routers) on the hardware switches.

Some embodiments provide a novel method of configuring a logical router of a logical network on a managed hardware forwarding element (MHFE) in order for the MHFE to implement the logical network and to perform logical routing functionalities. In some embodiments, the method is performed by a control plane that configures and manages one or more logical networks for one or more tenants of a hosting system (e.g., a datacenter). In some embodiments, a logical network of the hosting system includes a set of logical forwarding elements (e.g., logical switches and routers) that logically connects different end machines (e.g., virtual machines, containers, etc.) that run on different host machines.

Some embodiments configure a logical router of a logical network on the MHFE (e.g., a third-party hardware switch such as a top-of-rack (TOR) switch or other appliances such as firewalls, load balancers, etc.) to enable the physical workloads connected to the MHFE (e.g., third-party servers connected to a TOR switch) to exchange network data with other end machines and/or external networks that are connected to the logical network.

In some embodiments, the control plane receives a definition of a logical router (e.g., through an application programming interface (API)) and defines several routing components for the logical router. Each of these routing components is separately assigned a set of routes and a set of logical interfaces. Each logical interface (also referred to as logical port) of each routing component is also assigned a network layer (e.g., Internet Protocol (IP)) address and a data link layer (e.g., media access control (MAC)) address. In some embodiments, the several routing components defined for a logical router include a single distributed router (also referred to as distributed routing component) and several different service routers (also referred to as service routing components). In addition, the control plane of some embodiments defines a transit logical switch (TLS) for handling communications between the components internal to the logical router (i.e., between the distributed router and the service routers).

The service components of a logical router, in some embodiments, may be configured in active-active or active-standby mode. In active-active mode, all of the service components are fully functional at the same time, and traffic can ingress or egress from the logical network through the service components using equal-cost multi-path (ECMP) forwarding principles (balancing the traffic across the various service routing components). In this mode, each logical interface of each separate service component has unique IP and MAC addresses for communicating with an external network and/or with the distributed component (through the transit logical switch).

In some embodiments, the logical router is part of a two-tier logical network structure. The two-tier structure of some embodiments includes (1) a single logical router (referred to as a provider logical router (PLR) and administrated by, e.g., the owner of the datacenter) for connecting the logical network to a network external to the datacenter, and (2) multiple logical routers (each referred to as a tenant logical router (TLR) and administrated by, e.g., different tenants of the datacenter) that connect to the PLR and do not separately communicate with the external network. In some embodiments, the control plane defines a transit logical switch between the distributed component of the PLR and the service components of the TLR.

For a PLR logical router, some embodiments use active-active mode whenever possible, and only use active-standby mode when stateful services (e.g., NAT, firewall, load balancer, etc.) are configured for the PLR. In active-standby mode, only one of the service routing components is active, i.e., fully operational at a time, and only this active routing component sends out messages to attract traffic. All the other service routing components is in standby. In some embodiments, the active service component and a standby service component use the same IP address, but different MAC addresses, for communicating with the distributed component. However, only the active component replies to address resolution protocol (ARP) requests from this distributed component. Furthermore, only the active service component advertises routes to the external network to attract traffic.

For a TLR logical router, some embodiments either use no service components or two service components in active-standby mode when stateful services are configured for the TLR. The TLR operates internally in the same manner as a PLR in active-standby mode, i.e., having an active component and a standby component sharing the same network layer address, but only the active component responding to ARP requests. To connect to the PLR, some embodiments assign each of the two service components of the TLR a same network layer address (though different from the IP address used to connect to its own distributed component).

The logical router described above is a distributed logical router implemented by a single distributed routing component and a set of service routing components. Some embodiments provide other types of logical router implementations in a physical network (e.g., a datacenter network) such as a centralized logical router. In a centralized logical router, L3 logical routing functionalities are performed in only gateway machines, and the control plane of some embodiments does not define any distributed routing component and instead only defines multiple service routing components, each of which is implemented in a separate gateway machine. Different types of logical routers with multiple routing components for end machines of a datacenter are described in greater detail in U.S. Provisional Patent Application 62/110,061, filed Jan. 30, 2015, which is incorporated herein by reference.

The above introduced the general concepts of a logical router configuration as well as certain aspects of the logical router configuration and implementation of some embodiments. In the following, Section I describes how the different routing components of a logical router is configured on a managed hardware forwarding elements (e.g., a TOR switch) in order for the MHFE to implement these components. Section II then describes configuring the logical router on the MHFE in such a way to enable the MHFE to perform routing functionalities. Next, Section III describes configuration of the MHFEs in other types of logical network topologies and for other types of logical routers. Section IV then describes configuring an MHFE as an edge node of a logical router. Finally, Section V describes the electronic system with which some embodiments of the invention are implemented.

I. Configuring Logical Router on MHFE

Some embodiments use a distributed logical router implementation that enables first-hop routing in a distributed fashion (rather than concentrating all of the routing functionality at the gateways). In the physical realization, the logical router of some embodiments includes a single distributed routing component (also referred to as a distributed router (DR)) and one or more service routing components (also referred to as service routers (SRs)). The DR, in some embodiments, spans managed forwarding elements (MFEs) that couple directly with virtual machines (VMs) or other data compute nodes that are logically connected, directly or indirectly, to the logical router. The DR of some embodiments also spans the gateways to which the logical router is bound as well as one or more MHFEs (e.g., third-party physical machines). The DR of some embodiments is responsible for first-hop distributed routing between logical switches and/or other logical routers that are logically connected to the logical router.

The service routers (SRs) of some embodiments are responsible for delivering services that are not implemented in a distributed fashion (e.g., some stateful services) as well as connecting the logical network to external network(s). A distributed logical router will have SRs if either (i) the logical router is a provider logical router (PLR), and therefore connects to external physical networks or (ii) the logical router has services configured that do not have a distributed implementation (e.g., NAT, load balancing, DHCP in some embodiments). Even if there are no stateful services configured on a PLR, some embodiments use SRs for failure handling and for ECMP.

Logical routers, in some embodiments, can be viewed from three different perspectives. The first of these views is the API view, or configuration view, which is how the user (e.g., a datacenter provider or tenant) views and defines the logical router. The second view is the control plane or management plane view, which is how the controller computer internally defines the logical router. Finally, the third view is the physical realization, or implementation of the logical router, which is how the logical router is actually implemented in the physical network.

FIG. 1 illustrates the configuration view of a distributed logical router in a logical network as designed by a user (e.g., a network administrator, a tenant of a datacenter, etc.). As shown, the logical router 115 is part of the logical network 100 which also includes two other logical switches 105 and 110. The logical router 115 has two logical ports that are connected to the logical switches 105 and 110.

Logical switch 105 has logical ports that are connected to virtual machines VM1 and VM2 while the logical switch 110 has logical ports connected to the virtual machine VM3 and TOR switch 130. The logical router 115 also includes two logical ports that connect to the external physical network 120. The TOR switch 130 connects one or more physical machines (e.g., physical servers, etc.) to the VMs of the logical network 100 through the logical switches 105 and 110, and the logical router 115.

While shown as VMs in this figure and other figures below, it should be understood that other types of data compute nodes (e.g., namespaces, containers, etc.) may connect to logical forwarding elements (e.g., logical switches 105 or logical routers 115) in some embodiments. It should also be understood that although a TOR switch in the example figures is shown as a managed hardware forwarding element (MHFE), the MHFE can be any other third-party forwarding elements (e.g., other physical switches and routers, appliances such as firewalls, load balancers, etc.). Additionally, although in the illustrated example, as well other examples below, only one TOR switch is shown to connect to the logical network, one of ordinary skill in the art would realize that many more TOR switches or other third-party hardware switches can connect to the logical network in the same manner. The illustrated examples include only one TOR switch in order to simplify the figures and the descriptions.

Figure 2:
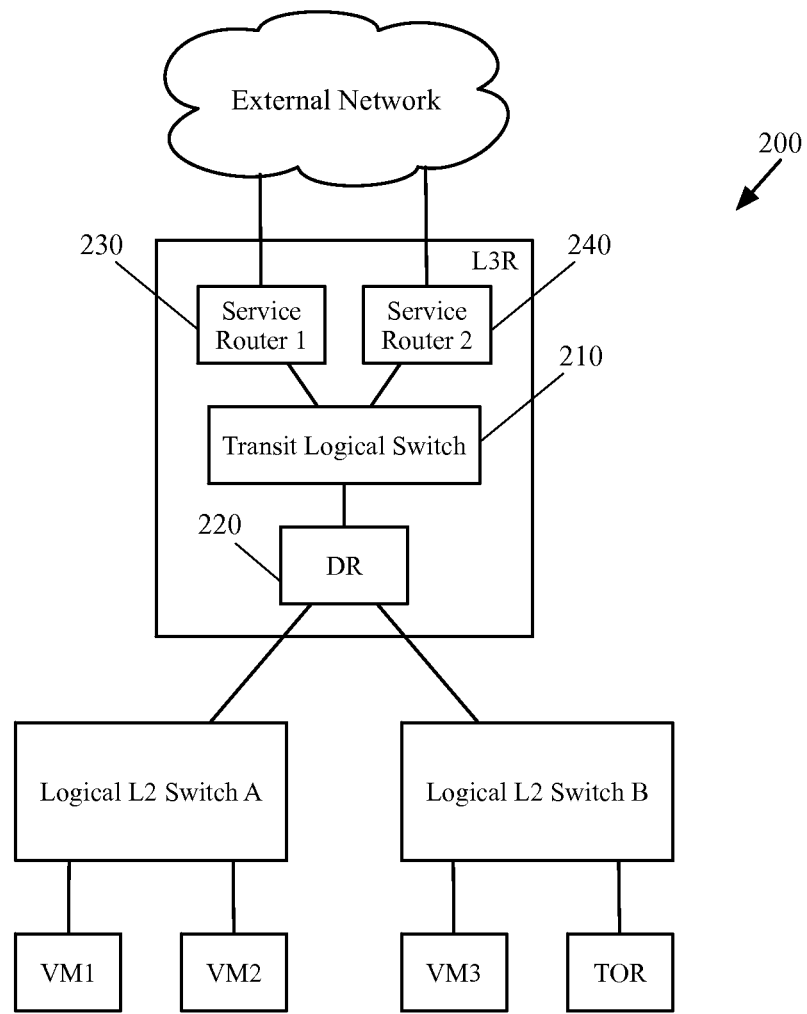
FIG. 2 illustrates a control plane view of a logical network when the logical router is implemented in a distributed manner.

FIG. 2 illustrates the management (control) plane view of the logical network 100 shown in FIG. 1. The control plane view 200 for the distributed implementation illustrates that the control plane, after receiving the configuration data of the distributed logical router, creates a distributed router 220, two service routers 230 and 240, and a transit logical switch 210 based on the received logical router data. In some embodiments, the control plane generates separate routing information bases (RIBs) and/or forwarding information bases (FIBs) for each of the routing components 220, 230, and 240. That is, in addition to having separate objects created in the management/control plane, each of the routing components is treated as a separate router with separate routes.

The transit logical switch 210 has different logical ports for each of the created routers, and each of the routing components 220-240 has an interface to logically connect to the transit logical switch 210. The configuration of the northbound and southbound interfaces of the various routing components 220-240 and their connections with the transit logical switch 210 will be described in further detail below by reference to FIGS. 3 and 4.

Figure 3:
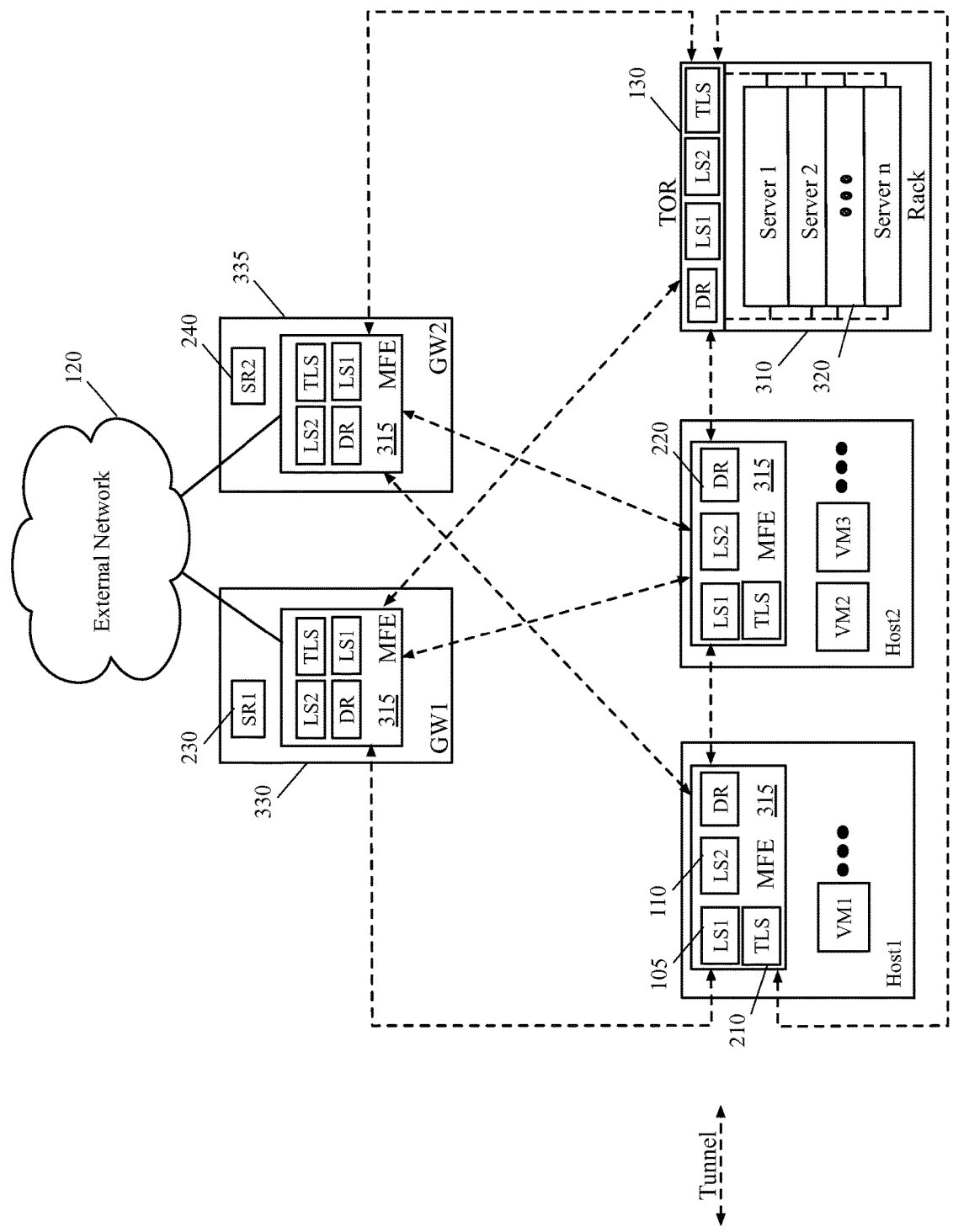
FIG. 3 illustrates a physical distributed implementation of a logical router defined for a logical network.

FIG. 3 illustrates the physical distributed implementation of the logical router 115 of FIG. 1. As shown, the virtual machine VM1, which couples to the logical switch 105 (LS1) in the logical network 100, operates on the host machine Host1, while VM2 and VM3 that couple to logical switches 105 and 110, respectively, operate on the host machine Host2. Additionally, the TOR switch 130 that couples to the logical switch 110 is part of a third-party rack 310 which also includes a set of servers 320 that are connected to the TOR switch 130. The virtual machines VM1-VM3 and servers 320 communicate (e.g., exchange network data) with each other and other entities via the logical network 100.

Each host machine is operating a managed forwarding element (MFE) 315. In some embodiments, the MFEs 315 operating on the host machines are software switches provided by the hypervisors or other virtualization software on the host machines. The TOR 130 is operating as a managed hardware forwarding element (MHFE). A MHFE in some embodiments is a third-party hardware switch that implements one or more logical networks and logically connects the physical workload attached to it (e.g., hardware and physical machines connected to the TOR 130) to the end machines and other devices in the logical network. The MFEs and MHFE implement the logical switches 105, 110, and 210 as well as the distributed routing component 220. The MFEs of some embodiments perform first-hop switching for the logical switches 105 and 110 for packets sent by the VMs of the logical network 100 (unless the pipeline of the transit logical switch 210 of the MFE specifies to send the packet to a SR). The MFEs 315 (or a subset of them) may also implement logical switches (and distributed logical routers) for other logical networks if the other logical networks have VMs that reside on the host machines Host1 and Host2 as well.

The control plane of some embodiments configures and manages one or more logical networks for one or more tenants of a hosting system (e.g., a datacenter). In some embodiments, a logical network of the hosting system logically connects a set of end machines (e.g., virtual machines, physical servers, containers, etc.) and a set of physical machines using a set of logical forwarding elements (e.g., logical L2 and L3 switches). In some embodiments, different subsets of end machines reside on different host machines that execute managed forwarding elements (MFEs). The MFEs implement the logical forwarding elements of the logical network to which the local end machines are logically connected. These MFEs may be flow-based forwarding elements (e.g., Open vSwitch) or code-based forwarding elements (e.g., ESX), or a combination of the two, in various different embodiments. These different types of forwarding elements implement the various logical forwarding elements differently, but in each case they execute a pipeline for each logical forwarding element that may be required to process a packet.

In some embodiments, the logical forwarding elements are implemented by one or more MHFEs (e.g., TOR switches) in order to connect the physical machines that are connected to the MHFEs to the other end machines of the logical network. In other words, each of the host machines executes an MFE that processes packets sent to and received from the end machines residing on the host machine, and exchanges these packets with other MFEs operating on other host machines as well as the MHFEs (e.g., through tunnels established by overlay encapsulation).

In some embodiments, when the MFE receives a packet from a VM that is coupled to the MFE, it performs the processing for the logical switch to which that VM logically couples, as well as the processing for any additional logical forwarding elements (e.g., logical router processing if the packet is sent to an external network, logical router processing and processing for the other logical switch in the network if the packet is sent to an end machine coupled to the other logical switch, etc.).

In some embodiments, the MFEs implement the logical forwarding elements through a set of flow entries. These flow entries are generated by a local controller operating on each host machine (not shown). The local controller of each host machine generates the flow entries by receiving the logical forwarding data from the control plane and converting the logical forwarding data to the flow entries for routing the packets of the logical network in the host machine. That is, the local controller, operating on a host machine, converts the universal logical forwarding data that is computed and sent by the control plane to every local controller operating on different host machines, to a customized set of forwarding behaviors that is recognizable and used by the MFE that operates on the same host machine as the local controller.

The MFE then uses the customized set of forwarding data to forward the packets of the logical network between the end machines operating on the host machine. In other words, by using the generated flow entries, the MFEs are able to forward and route packets between network elements of the logical network that are coupled to the MFEs. In some embodiments, however, some or all of the MFEs are not flow-based software forwarding elements, but instead process packets based on configuration data that is generated by their respective local controllers. In some embodiments, the local controllers receive the same data from the control plane irrespective of the type of MFEs they manage, and perform different data conversions for different types of MFEs.

Additionally, the control plane distributes the logical forwarding data of the logical forwarding elements to the TOR switch 130 in order for the TOR switch to implement these logical forwarding elements and connect the physical workload to the virtual machines VM1-VM3. In some embodiments, the control plane distributes the logical forwarding data of the logical forwarding elements to the TOR switch using an open source database schema such as OVSDB. In some other embodiments the control plane distributes the forwarding data to a particular MHFE controller using the NETCPA protocol, which is a proprietary protocol (a VXLAN control plane protocol). In some such embodiments, the MHFE controller subsequently translate the logical forwarding data to the open source protocol that is recognizable by the TOR switch and distributes the forwarding data to the TOR switch using the open source protocol.

The distributed router 220, as shown in FIG. 3, is implemented across the MFEs 315, the TOR switch 130, and the gateway machines 330 and 335. That is, the datapaths (e.g., in the MFEs 315, or in a different form factor on the gateways and MHFEs) all include the necessary processing pipelines for the DR 220 (and the transit logical switch 210 illustrated in FIG. 2). Unlike the distributed router 220, each of the two service routers 230 and 240 operates on a single gateway machine. Specifically, the SR 230 shown in the figure operates on the gateway machine 330, while the SR 240 operates on the gateway machine 335.

In some embodiments, the gateway machines 330 and 335 (also called edge nodes in some embodiments) are host machines similar to the host machines Host1 and Host2, which host service routers rather than user VMs. As shown in the figure, each of the gateway machines 330 and 335 includes an MFE 315 as well, which are similar to the other MFEs operating on the other host machines that implement the logical forwarding elements of the logical network 100. In the illustrated gateway machines 330 and 335, the SRs are shown as separate from the MFEs that operate on the gateway machines.

Different embodiments, however, may implement the SRs differently. Some embodiments implement the SRs as VMs (e.g., when the MFE is a software switch integrated into the virtualization software of the gateway machine), in which case the SR processing is performed outside of the MFE. As will be discussed in more detail below in Section IV, some embodiments implement the SRs on an edge MHFE (e.g., a hardware VTEP). In some such embodiments, the edge hardware VTEP plays the role of a gateway machine and connects the logical network (also implemented by the VTEP) to external network(s).

On the other hand, some embodiments implement the SRs as virtual routing and forwarding (VRFs) elements within the MFE datapath (when the MFE uses DPDK for the datapath processing). In either case, the MFE treats the SR as part of the datapath, but in the case of the SR being a VM (or other data compute node) separate from the MFE, the MFE sends the packet to the SR for processing by the SR pipeline (which may include the performance of various services). As with the MFEs on the host machines Host1 and Host2, the MFEs of the gateway machines, as described above, are configured to perform all of the distributed processing components of the logical network.

The SRs of some embodiments may operate in an active-active or active-standby mode, depending on whether any stateful services (e.g., firewalls) are configured on the logical router. When stateful services are configured, some embodiments require only a single active SR. In some embodiments, the active and standby service routers are provided with the same configuration, but the MFEs operating on the host machines are configured to send packets via a tunnel to the active SR (or to the MFE of the gateway machine that implements the active SR). Only if the tunnel is down will the MFE send packets to the standby SR.

As described above, in order to exchange the network data between the different elements of the logical network 100, the different MFEs and MHFE that implement the logical forwarding elements establish tunnels between themselves. In some embodiments, the control plane (e.g., one or more controller computers of a centralized controller system) distributes configuration data to the MFEs and MHFE (e.g., through separate controllers of MFEs and MHFE), which includes instructions on how to set up tunnels between the MFEs and MHFE. For instance, the configuration data specifies the location (e.g., IP address) of each tunnel endpoint. In some embodiments, the TOR switch is also one of the tunnel endpoints.

The TOR switch of some embodiments, after receiving the endpoint addresses (in the configuration data), stores the tunnel endpoint addresses of the other MFEs and MHFEs that implements the logical forwarding elements and their different logical ports in a particular tunnel endpoint locator table. The tunnel endpoint locator table is one of several database tables that are configured on the TOR switch through a database schema (e.g., OVSDB). The distributed configuration data, therefore, enables the TOR switch to locate other tunnel endpoints (through their IP addresses) and establish the tunnels between the TOR switch and the other endpoints. Configuring the TOR switch to enable the switch to locate these other endpoints is discussed in further detail below.

When a user configures a logical router, the control plane uses this configuration to configure the SRs and the DR of the logical router. For instance, the logical router 115 of FIG. 1 has four interfaces (two ports connected to the logical switches' ports, and two uplink ports). However, as shown in FIG. 2, the distributed control plane implementation of the logical router includes a DR with three logical ports (two of which are connected to the logical switches and one connected to the TLS 210) and two SRs that each has two logical ports (a total of seven interfaces). The IP and MAC addresses and other configuration details assigned to the four interfaces as part of the logical router configuration are used to generate the configuration for the various components of the logical router.

In addition, as part of the configuration, some embodiments generate a routing information base (RIB) for each of the logical router components. That is, although the administrator defines only a single logical router, the management (control) plane of some embodiments generates separate RIBs and/or FIBs for the DR and for each of the SRs. For the SRs of a PLR, the control plane in some embodiments generates the RIB initially, but the physical implementation of the SR also runs a dynamic routing protocol process (e.g., BGP, OSPF, etc.) to supplement the RIB locally.

In some embodiments, the DR is always located on the southbound side (i.e., facing the data compute nodes of the logical network, rather than facing the external physical network) of the logical router implementation. The southbound ports of the DR, therefore, are connected to different logical switches that have their other ports connected to different virtual and physical machines that reside in host machines or connected to managed hardware forwarding elements, or alternatively have their ports connected to other forwarding elements. The northbound interface of the DR, on the other hand, couples to the transit logical switch that is part of the logical router.

Figure 4:
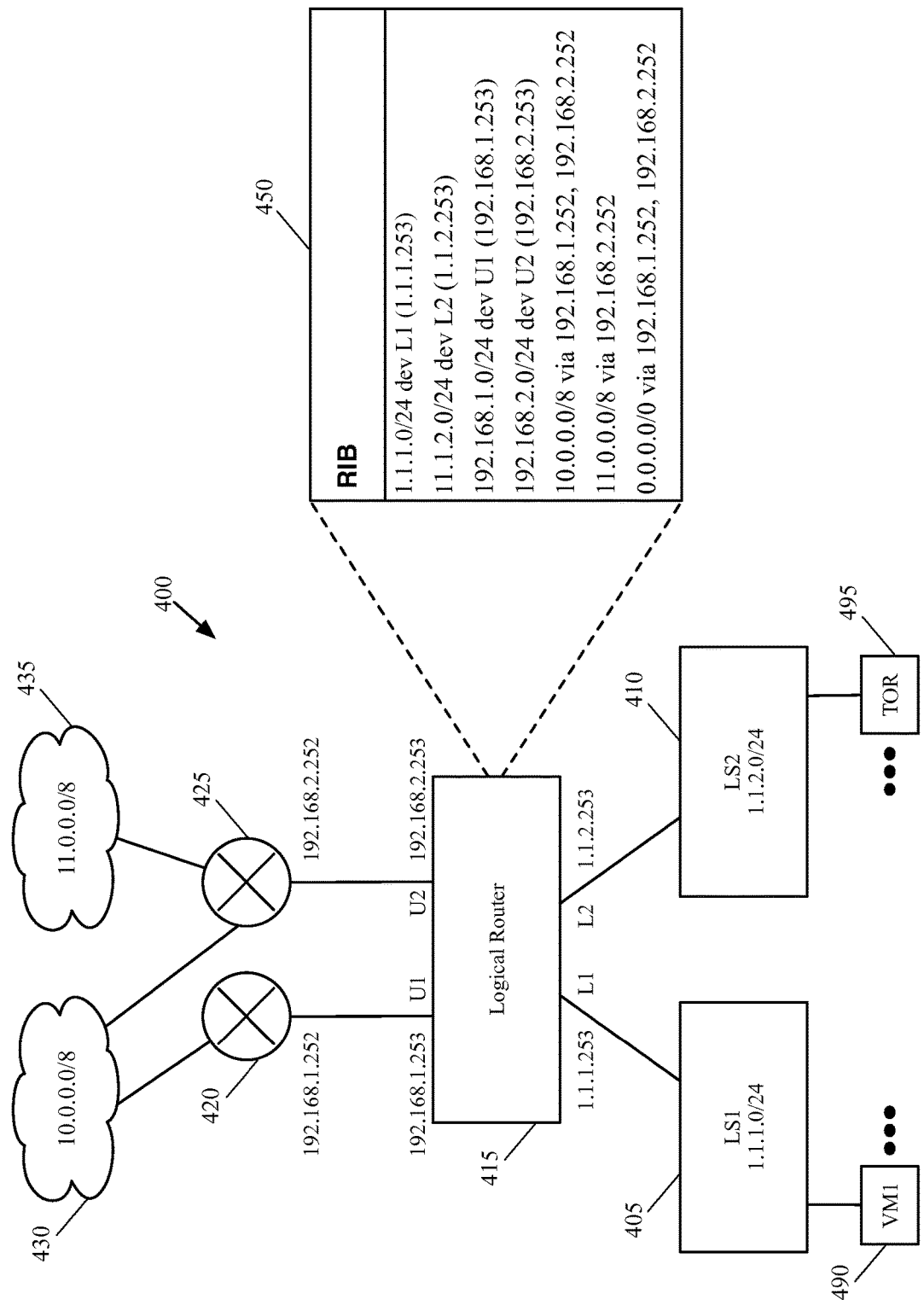
FIG. 4 conceptually illustrates a more detailed configuration of a logical network topology, including the network addresses and interfaces assigned by an administrator.

FIG. 4 conceptually illustrates a detailed configuration of a logical network topology 400 that includes the network addresses and interfaces assigned by a user. As shown, the logical switches 405 and 410 are each assigned their own subnets, 1.1.1.0/24, and 1.1.2.0/24, and all of the data compute nodes and MHFEs attached to the logical switches 405 and 410 have IP addresses in the corresponding subnet. The logical router 415 has an interface L1 to the first logical switch 405. The interface L1 has an IP address of 1.1.1.253 that is the default gateway for the data compute nodes and MHFEs in the subnet 1.1.1.0/24, which includes the VM 490. The logical router 415 also has a second interface L2 to the second logical switch 410. The interface L2 has an IP address of 1.1.2.253 that is the default gateway for the data compute nodes and MHFEs in the subnet 1.1.2.0/24, which includes the TOR switch 495.

The northbound side of the logical router 415 has two uplinks, U1 and U2. The first uplink U1 has an IP address of 192.168.1.253 and connects to a first physical router 420 with an IP address of 192.168.1.252. The second uplink U2 has an IP address of 192.168.2.253 and connects to a second physical router 425 with an IP address of 192.168.2.252. The physical routers 420 and 425 are not actually part of the logical network (e.g., logical network 100), but rather connect the logical network to the external networks 430 and 435. The first physical router 420 connects to the subnet 10.0.0.0/8, while the second physical router 425 connects to both of the subnets 10.0.0.0/8 and 11.0.0.0/8. Although not shown, each of the logical ports of the logical router 415 is also assigned a separate data link layer (MAC) address.

Based on these example addresses, the RIB 450 defines the different routings performed by the router 415. Specifically, the RIB includes four connected routes based on the subnets configured on the southbound and northbound interfaces of the logical router. These four connected routes include a route that egresses from logical port L1 for any packet that has a destination IP address that is in the subnet of LS1; a route that egresses from the logical port L2 for packets with destination IP addresses that belong to the subnet of LS2; a route that egresses the logical port U1 for packets with destination IP addresses that belong to the subnet of U1 and/or physical router 420; and a route that egresses from the logical port U2 for packets with destination IP addresses that belong to the subnet of U2 and/or physical router 425. The RIB also includes three other static routes: any packet with the subnet IP address of 10.0.0.0/8 is to be routed from either logical port U1 or logical port U2; any packet with the subnet IP address of 11.0.0.0/8 is to be routed from logical port U2; and a default route which is either through the logical port U1 or the logical port U2 of the router.

Figure 5:
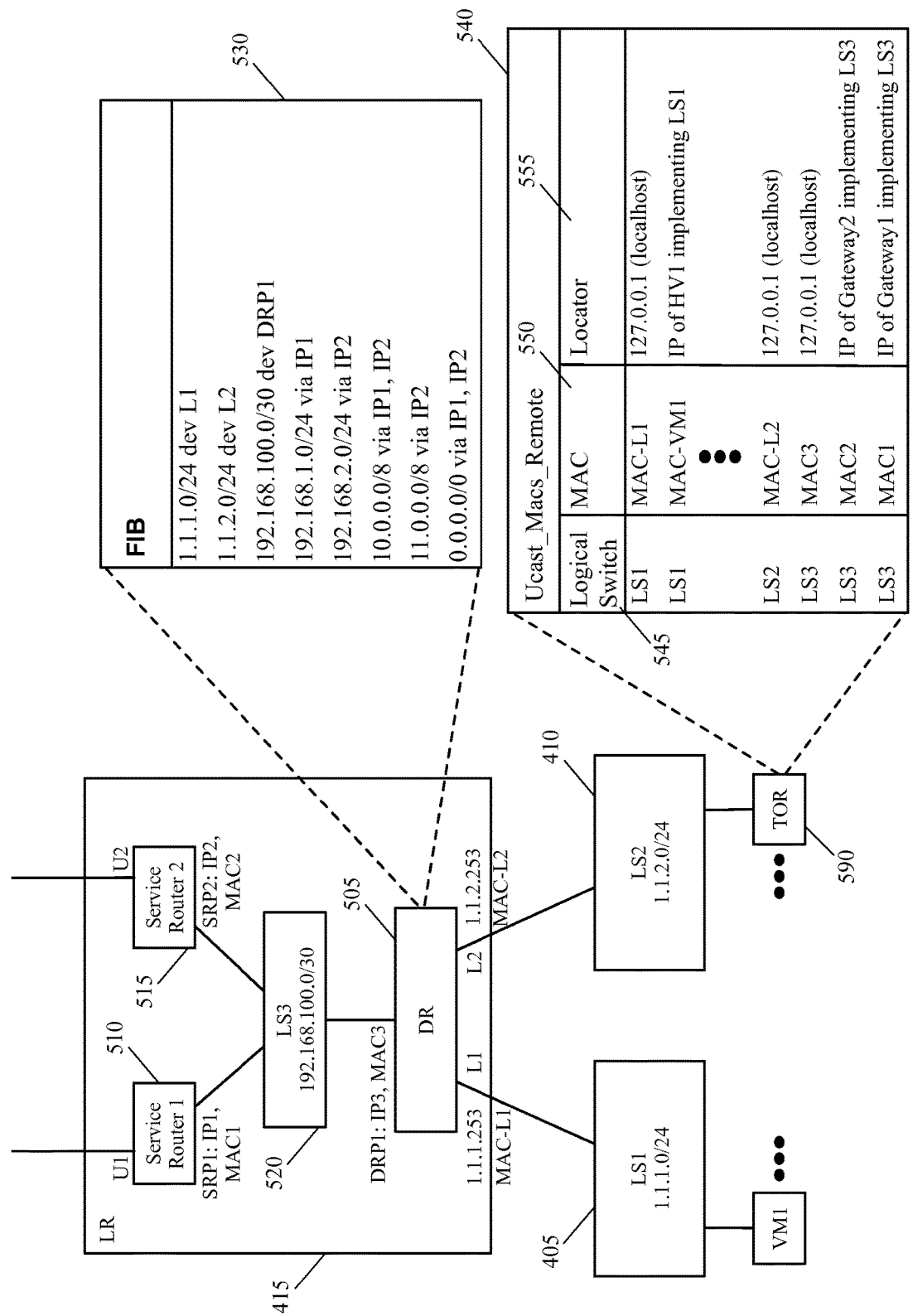
FIG. 5 illustrates the configuration of a logical router and how the control plane configures the tunnel endpoint locators on an MHFE that implements the logical router.

FIG. 5 illustrates the configuration of the logical router 415 of FIG. 4 and how the control plane configures the tunnel endpoint locators on an MHFE that implements the logical router 415. As shown, the logical switches 405 and 410 are configured as indicated by the user configuration. However, the control plane defines a distributed routing component (DR) 505, two service routing components (SRs) 510 and 515, and a transit logical switch (TLS or L3) 520 for the logical router 415. The DR is assigned the two southbound interfaces of the logical router 415, which connect to the logical switches 405 and 410. The transit logical switch 520 (L3) is assigned a subnet of 192.168.100.0/30. Some embodiments require the subnet assignment of each logical switch be unique among the logical switches that logically connect (directly or indirectly) the logical router 415. Each of the three control plane router constructs (the DR 505, the SR 510, and the SR 515) also includes an interface that connects to the TLS 520, and has an IP address in the subnet of the transit logical switch. The northbound interfaces U1 and U2 are assigned to the two SRs 510 and 515, the configuration of which is described below.

A DR (e.g., 505) of a logical router (e.g., 415) in some embodiments is configured as follows. The southbound interfaces of the DR are configured in the same way as the southbound interfaces of the logical router. These interfaces are those that connect to a logical switch in the logical topology. The DR of some embodiments is allocated a single northbound interface, which is assigned an IP address and a MAC address. Assuming the logical router has one or more SRs, the northbound interface of the DR connects to a transit logical switch.

The RIB of the DR is assigned connected routes based on the subnets configured on its various southbound and northbound interfaces. These are the subnets configured for (i) the transit logical switch configured between the DR and SR components of the logical router, and (ii) any logical switches on its southbound interfaces. These logical switches on the southbound interfaces are user-defined logical domains to which data compute nodes connect (or other transit logical switches located between the DR of a PLR and any TLRs that connect to the PLR as described below is Section III below).

In addition, any static routes that egress from an uplink of the logical router are included in the RIB of the DR;

however, these routes are modified such that the next-hop IP address is set to that of the uplink's SR. For example, a static route "a.b.c.0/24 via 192.168.1.252" (192.168.1.252 being an address of an external physical network router) is modified to be "a.b.c.0/24 via [IP of SR's southbound interface]". Static routes that egress from a southbound interface of the logical router, on the other hand, are included in the RIB of the DR unmodified.

The control plane in some embodiments generates the FIB 530 based on the configuration data and the RIB of logical router 415 which includes the different routes illustrated in the figure. The illustrated routes include three connected routes, for the logical switch domains connected to the DR (1.1.1.0/24, 1.1.2.0/24, and 192.168.100.0/24). In addition, the subnet on which the first uplink is located (192.168.1.0/24) is reached via the southbound interface of the first SR 510 (IP1), while the subnet on which the second uplink is located (192.168.2.0/24) is reached via the southbound interface of the second SR 515 (IP2). In addition, three static routes have been added by the user for the logical router 415, which the control plane automatically modifies for the DR 505. Specifically, the static routes include the network 10.0.0.0/8 via the southbound interface of either of the SRs, and the network 11.0.0.0/8 via the southbound interface of SR2. Lastly, default routes pointing to these same southbound interfaces are included. As shown, the IP addresses IP1, IP2, and IP3 that are created by the control plane for the ports of the logical router constructs that interface the TLS are all in the subnet 192.168.100.0/24.

In addition to configuring the FIB of the DR, the control plane also assigns MAC addresses to the DR interfaces in some embodiments. In some embodiments, some or all of the physical routing elements (e.g., software modules) in the physical network that implement the DR functionality only support a single MAC address. In this case, because the MAC of a DR port may come from that of a logical router port visible to users, this imposes requirements on how the control plane allocates MAC addresses for the logical router ports. Thus, in some embodiments, all DR/SR ports that connect to any logical switch that has user data compute nodes or SRs must share a common MAC address. In addition, if a DR/SR port is connected to another DR/SR or to a physical network, this port is assigned a unique MAC address.

Similar to the DR of a logical router, the control plane also configures each SR of the logical router with a separate FIB and interfaces. As described above, in some embodiments SRs may deliver services (i.e., functionalities beyond simply routing, such as NAT, firewall, load balancing, etc.) and provide the connection between the logical network and external physical networks. As shown in FIG. 5, since the logical router 415 has two uplinks, the control plane defines two service routers 510 and 515. Each of these SRs is assigned a southbound interface, with different IP and MAC addresses (as the SRs are in an active-active configuration). The IP addresses IP1 (for the first SR 510) and IP2 (for the second SR 515) are in the subnet 192.168.100.0/30, as is IP3 (the northbound interface of the DR 505).

For each southbound interface of the logical router, some embodiments add a route for the corresponding network to the RIB of each SR. This route points to the northbound DR interface as its next-hop IP address. Furthermore, any other routes configured for the logical router that egress from the southbound interface are copied to the SR with the same northbound DR interface as the next-hop IP address. On the other hand, a static route of the logical router that egresses from an uplink (e.g., U1 or U2) is copied to the FIB of the SR. In addition, the SRs (of a top-level logical router) may learn dynamic routes and place the learned dynamic routes in their FIB (though some embodiments perform this locally, without involving the centralized controller system in the control plane).

As described above, some embodiments implement the distributed routing component of the logical router in a distributed manner across the different MFEs and the MHFE. Some of these embodiments implement each of the service routing components of the logical network on an edge node (e.g., a gateway machine), which is a machine at the edge of the network (e.g., the datacenter network), in order to communicate with one or more external networks. The control plane of some embodiments distributes configuration data of the logical forwarding elements to the MFEs in a manner that is different than to the MHFEs.

In some embodiments, the control plane computes and distributes the logical configuration and forwarding data to each local controller that operates on a host machine using a proprietary protocol (e.g., NETCPA). In some such embodiments, the local controller operating on a host machine generates a set of forwarding tables for the MFE that runs on the same host machine and distributes the generated data to the MFE for implementing the logical forwarding elements of the logical network (e.g., by forwarding the logical network data to other end machines executed on the same host machine, or establishing tunnels to other MFEs and/or MHFEs and forwarding the network data through the established tunnels to those MFEs and MHFEs).

In some embodiments, the control plane computes and distributes the logical configuration and forwarding data to each MHFE using an open source protocol that is recognizable and used by the MHFE (e.g., an open vSwitch database management (OVSDB) protocol). In some other embodiments, the control plane distributes the logical network data to a particular controller that manages the MHFE using a proprietary protocol (e.g., NETCPA) and the particular controller distributes the data to the MHFE using an open source protocol such as OVSDB. The controllers (local controller operating on the host machine, particular controller managing the MHFE, etc.) of some embodiments are applications that are instantiated on either the host machines or other dedicated controller machines.

In order to configure and manage the different components of a logical router as well as other logical forwarding elements (e.g., logical L2 switches) of a logical network on a MHFE, some embodiments configures the MHFE with a set of database tables (e.g., forwarding tables of the forwarding elements) that is populated by using a database schema (e.g., OVSDB schema) that is recognizable and used by the MHFE. Such an open source protocol requires minimal software on the MHFE to enable the implementation of the logical network forwarding elements (e.g., logical L2 and L3 forwarding elements) in order to communicate with the other machines connected to the logical network as well as other external networks.

After generating the database tables on the MHFE using the OVSDB schema, some embodiments propagate a particular one of these tables with the physical locator information of the logical ports of the different routing components (i.e., distributed and service routers) of the logical router. The physical locator information, in some embodiments, specifies the tunnel endpoint locations (e.g., VXLAN tunnel endpoints or VTEPs). This tunnel endpoint locator table (also referred to as a Ucast_Macs_Remote table in some embodiments) specifies the network layer (IP)

addresses of the MFEs and MHFEs that implement the logical ports of logical switches to which the machines (e.g., end machines, physical machines, etc.) and/or logical ports of the logical routers are connected. By locating the endpoints, the MFEs and MHFEs are able to establish tunnels between themselves and exchange the network data through the established tunnels. In some embodiments, a MHFE (i.e., a TOR) is also referred to as a hardware VTEP.

FIG. 5 illustrates a tunnel endpoint locator (Ucast_Macs_Remote) table 540 that is generated on the TOR switch 590 (e.g., by the OVSDB schema). Each record of the table 540 has several different fields (or table columns) that include (i) a logical switch field 545 that species the logical switch to which a port of a machine or a logical router is connected, (ii) a MAC address field 550 that specifies the corresponding MAC address of the port, and (iii) a locator field 555 that specifies the IP address of the tunnel endpoint for the corresponding MAC address. The tunnel endpoint locator table is therefore also referred to as a tunnel endpoint table.

In order to configure the logical router on this table 540 (i.e., configure the locator data of the logical ports of the different routing components on the table), some embodiments populate a record for each logical port of the distributed routing component in the table in a first manner and a record for each logical port of the service routing component in a second different manner. For each port of the distributed routing component (e.g., DR 505) that is connected to a logical forwarding element (e.g., LS1 405 and LS2 410), some embodiments generate a record and stores (i) in a logical switch field, the logical switch to which the port is connected, (ii) in a MAC address field, the MAC address of the port, and (iii) in a locator field, a fixed IP address of 127.0.0.1, or the local host. The local host is a loopback interface address (127.0.0.1) in networking which can be used to access the machine's own network services.

In other words, when the MHFE realizes that the destination MAC address of a packet belongs to a port of the distributed routing component, the VTEP of the MHFE does not establish a tunnel for routing the packet. This is because the distributed routing component, as described above, is implemented by every single MFE, MHFE, and gateway that participates in the logical network. As such, a packet whose destination MAC address is that of the logical router is not required to be routed to any other node in the network.

Some embodiments, on the other hand, populate the tunnel endpoint locator table with the tunnel endpoint data of each logical port of the service routing components that is connected to a logical forwarding element (e.g., an L2 logical switch). That is, for each logical port of the SRs, some embodiments store (i) in the logical switch field, the logical switch to which the port is connected (e.g., the transit logical switch to which the southbound port of the service component is connected), (ii) in the MAC address field, the MAC address of the port, and (iii) in the locator field, the IP address of the tunnel endpoint that implements the logical switch port to which the service component port is connected (e.g., the IP address of the gateway machine that implements the service routing component).

As for the end machines connected to the logical switches, some embodiments store (i) in the logical switch field, the logical switch to which the end machine's port is connected, (ii) in the MAC address field, the MAC address of the port, and (iii) in the locator field, the IP address of the tunnel endpoint that implements the logical switch port to which the end machine is connected (e.g., the IP address of the MFE that implements the port of the logical switch). For instance, the tunnel endpoint locator table 540 shown in the FIG. 5 includes the MAC address of virtual machine VM1 (MAC-VM) in the MAC address field 550. The port of this virtual machine is connected to the logical port of switch LS1 which is stored in the logical switch field 545. Since the MFE is operated by hypervisor HV1 (not shown in the figure), the control plane stores the IP address of this hypervisor in the locator field 555.

For the different logical ports of the different logical routing constructs, the tunnel endpoint locator table 540 includes the three different logical switches (LS1, LS2, and LS3) of the logical network in the logical switch field 545, the MAC addresses of the ports to which the logical switches' corresponding ports are connected in the MAC address field 550, and the locator (IP address) of the MFEs and MHFEs that implement the corresponding ports in the tunnel endpoint locator field 555. As mentioned above though, the control plane configures the tunnel endpoint locator table differently for different routing components of the logical router.

For example, for the MAC address of the logical port L1 of the DR (MAC-L1) which is connected to the logical switch LS1, the control plane stores 127.0.0.1 (localhost) as the IP address of the tunnel endpoint locator field 555. As described above, this is because the distributed component of the logical router is implemented by every MFE, MHFE, and gateway of the logical network and as such no tunnel is required to be established for any port of the DR. Therefore, MAC-L2 and MAC3 which are the MAC addresses of the other ports of the DR that are connected to the logical switches LS2 and LS3, respectively, also have the same loopback IP address of 127.0.0.1 (localhost) stored in their corresponding tunnel endpoint locator field 555.

For the service components of the logical router, however, the control plane stores the IP addresses of the gateway machines that implement (e.g., through the MFEs that the gateway machines execute) the logical switch ports that are connected to the SR ports. That is, the SR port SRP1 with the MAC address MAC1 is implemented by the MFE of the gateway machine Gateway1 (not shown in the figure). As such, the control plane stores, in the locator field, the IP address of MFE of Gateway1 (the hypervisor on which the MFE runs). Similarly, the logical port SRP2 of the service component 515 is connected to a logical port of the TLS 520 (LS3). This port is implemented by the gateway machine Gateway2 and as such the table stores the IP address of this gateway machine (the IP address of the hypervisor that implements the logical switch connected to the SRP2 port).

Figure 6:
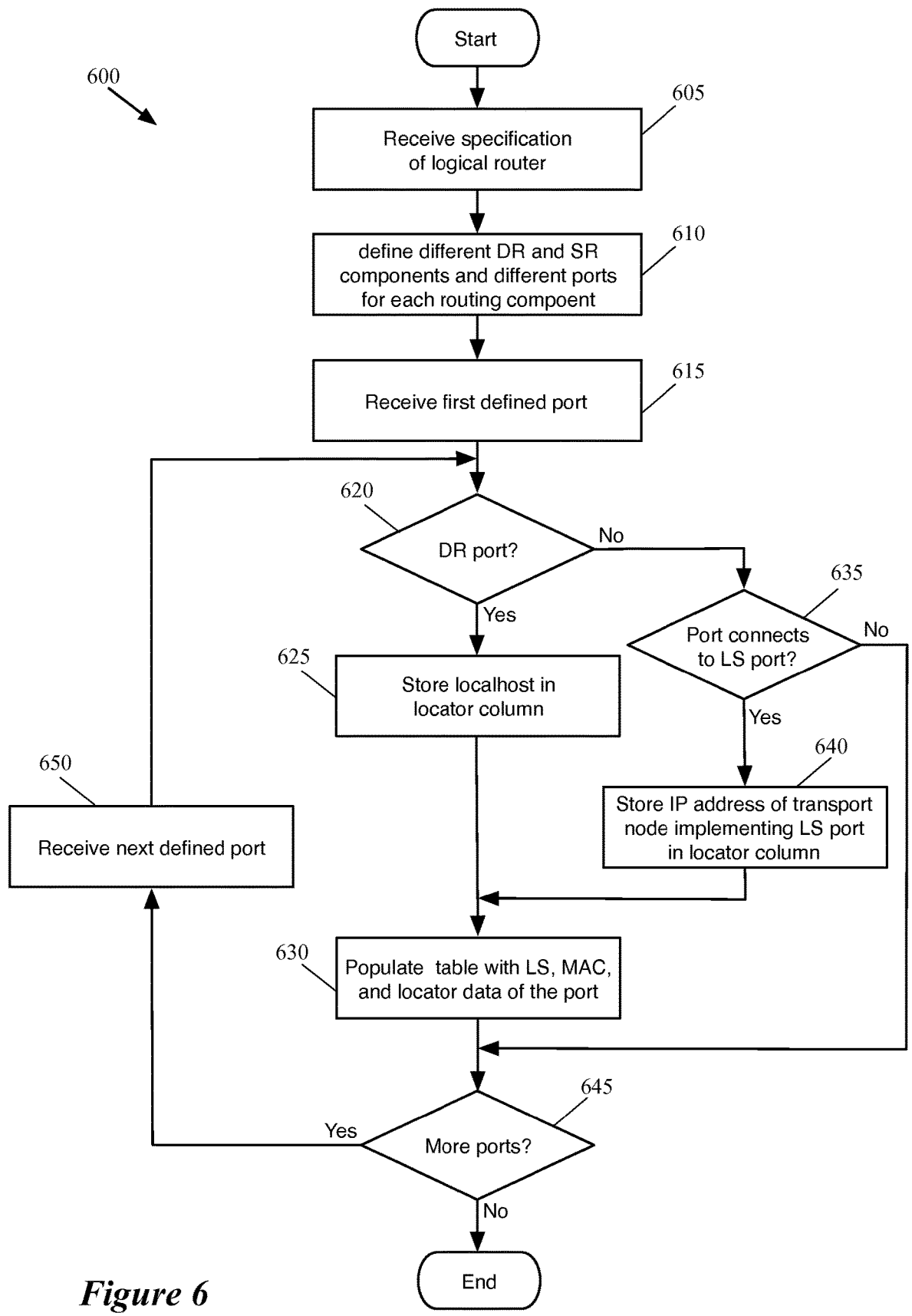
FIG. 6 conceptually illustrates a process of some embodiments for configuring the tunnel endpoint locators for different ports of the logical router on an MHFE.

FIG. 6 conceptually illustrates a process 600 of some embodiments for configuring the tunnel endpoint locators for different ports of the logical router on an MHFE. In some embodiments, process 600 is uses a control plane of a datacenter (e.g., a set of modules at a centralized controller that manages the networks of a datacenter). The control plane of some embodiments performs the configuration process and then uses a centralized control plane of the controller to distribute the data to the MHFE (or to a different controller that manages the MHFE to be subsequently distributed to the MHFE) that implements the configured logical router.

As shown, the process 600 begins by receiving (at 605) a specification of a logical router. The specification of the logical router is based on a user (network administrator, tenant, etc.) input to define the logical router. In some embodiments, this specification includes definitions of any services the logical router should provide, whether the logical router will be configured in active-active or active-standby mode (though some embodiments automatically use active-active mode unless stateful services are configured), how many uplinks are configured for the logical router, the IP and MAC addresses of the uplinks, the L2 and L3 connectivity of the uplinks, the subnets of any southbound interfaces of the logical router, any static routes for the RIB of the logical router, as well as other data.

The process then defines (at 610) the different routing components of the logical router based on the received specification. Specifically, the process defines a distributed router (DR) and a set of service routers (SRs) based on the specification of the logical router and assigns different MAC and IP addresses for the different ports of these routing components. Defining the different routing components and assigning network data link layers addresses to the different ports of the routing components is described in greater detail in the U.S. Provisional Patent Application 62/110,061, filed Jan. 30, 2015. Essentially, the process of some embodiments uses the southbound interface configuration of the logical router for the southbound interface of the DR. That is, the IP addresses and MAC addresses for the different southbound ports of the DR are those specified for the logical router.

The process 600 also assigns each uplink specified for the logical router to a gateway machine and defines a SR on the gateway machine. For each SR, the process uses the configuration for the uplink assigned to that gateway machine as the configuration for the northbound interface of the SR. This configuration information includes the IP and MAC address of the uplink, as well as any uplink-specific policies. In defining the different routing components, the process additionally defines a unique transit logical switch to connect the defined SRs and DR. Some embodiments require that the subnet assigned to the transit logical switch be unique among the logical network topology. The process also assigns a northbound interface to the DR and assigns both a MAC address and an IP address to this interface. The process also assigns southbound interfaces to the SRs with separate MAC and IP addresses (only the active-standby SRs may share the same IP address). In some embodiments, the IP addresses of the northbound port of the DR and the southbound ports of the SRs are in the same subnet that is assigned to the transit logical switch.

The process 600 receives (at 615) the first defined port (e.g., a port that is defined for the DR or one of the SRs). This is done in order to configure the defined ports of different routing components on the MHFE. The process then determines (at 620) whether the port belongs to a distributed routing component of the logical router or a service component of the logical router. If the port belongs to the DR, the process proceeds to 625. Otherwise, the process proceeds to 635.

At 625, the process stores the localhost as the IP address of the tunnel endpoint. That is, when the process realizes that the port that is being configured on the MHFE one of the southbound ports of the DR or the northbound port of the DR, the process stores in the locator field of the tunnel endpoint locator table (Ucast_Macs_Remote table) the loopback IP address 127.0.0.1. As described before, this address indicates to the MHFE that no tunneling is required for the packets that have one of the MAC addresses of the DR ports since DR is implemented on every other MFE, MHFE, and gateway machines as well. The process then proceeds to 630.

At 635, the process determines whether the port is associated with a logical switch. In other words, the process determines whether the port is one of the uplink ports of the SRs that might be directly connected to a next hop physical router, in which case no logical switch is associated with to the port. If the process determines that the port is not associated with a logical switch, the process proceeds to 645. On the other hand, when the process determines that the port is associated with a logical switch, the process stores (at 640) the IP address of the transport node (tunnel endpoint) that implements the associated logical switch with the SR port before proceeding to 630.

At 630, the process populates the tunnel endpoint table (e.g., 540) with the information of the DR port in order to configure this port on the MHFE. That is, the process generates a record in the table that has (i) the localhost in the locator field, (ii) the MAC address of the DR port in the MAC address field, and (iii) the logical switch with which this DR port is associated (i.e., the logical switch to one of the logical ports of which, the DR port is connected) in the logical switch field. As described above, in some embodiments, the logical switches, with which the DR ports are associated, might be either one of the southbound logical switches that logically connect the end machines executing on the hosts and other physical machines connected to the MHFEs to the logical router, or alternatively, the transit logical switch with which the northbound port of the DR is associated. The process then proceeds to 645.

After populating the tunnel endpoint table with the port information of the DR port or one of the SR ports, the process of some embodiments determines (at 645) whether the configured port is the last routing component port that is inspected and configured by the process. If the process determines that the port is not the last routing component port, the process receives (at 650) the next routing component port and returns to 620 to perform all of the above described steps on the port. Otherwise, the process 600 ends.

Some embodiments perform variations of the process 600. The specific operations of the process 600 may not be performed in the exact order shown and described. For example, the process of some embodiments, after defining each port (and assigning the MAC and IP addresses to the port) for each of the routing components of the logical router, configures the defined port on the MHFE. In other words, the process of some such embodiments does not define all the ports of the different routing components before configuring the ports in the manner described above. Additionally, the specific operations may not be performed in one continuous series of operations, and different specific operations may be performed in different embodiments. For example, the operation 610 (defining the different routing components and their corresponding ports) can be performed in multiple different steps, each step performed under different conditions (e.g., in an active-standby mode the assignment of the IP and MAC addresses is different than the assignment of the IP and MAC addresses in an active-active mode).

II. Identifying L3 Packets on MHFE

Some embodiments enable an MHFE (or the hardware VTEP of the MHFE) to perform L3 routing functionalities on the packets that are destined for the logical router implemented by the MHFE. In order for the hardware VTEP to realize that a packet is destined for the logical router, the hardware VTEP in some embodiments identifies the destination MAC address of the packet as a MAC address that belongs to a logical port of a routing component of the logical router. In order to enable the hardware VTEP to make such a determination, some embodiments use the database schema (e.g., OVSDB schema) to propagate configuration data that links the different database tables generated on the MHFE.

Linking the different tables allows the hardware VTEP to search the MAC address of the received packet against a logical router table that has all the MAC addresses of the different ports of the different routing constructs of the logical router. In OVSDB schema, among the different tables (e.g., forwarding tables) that are generated and configured on the MHFE, the control plane in some embodiments generates a logical router table on the MHFE that maps the IP addresses of the different ports of the distributed and service routing components of the logical router to the logical switches with which they are associated. In contrast, the tunnel endpoint locator table described above includes the MAC addresses of all the different logical ports of the routing components of the logical router. In order to link the logical router table and the tunnel endpoint locator table together, some embodiments store the IP addresses of the ports of the logical router in an optional field of the tunnel endpoint locater table while populating it. In other words, the control plane uses a field of the table that may or may not be used to propagate the linking configuration data.

By doing so, the hardware VTEP of some embodiments would be able to identify a corresponding IP address for the destination MAC address of the packet from the tunnel endpoint locator table and match the IP address against the IP addresses of all the logical ports of the routing components that are stored in the logical router table in the OVSDB schema (i.e., the logical router table configured on the MHFE). When the hardware VTEP finds a match for the IP address in the logical router table, the hardware VTEP realizes that the destination MAC address of the packet is in fact a MAC address of one of the logical router ports. As such, the VTEP starts to perform L3 processing on the packet (e.g., the hardware VTEP modifies the source and destination MAC addresses in the packet headers to route the packet to the next hop).

Figure 7:
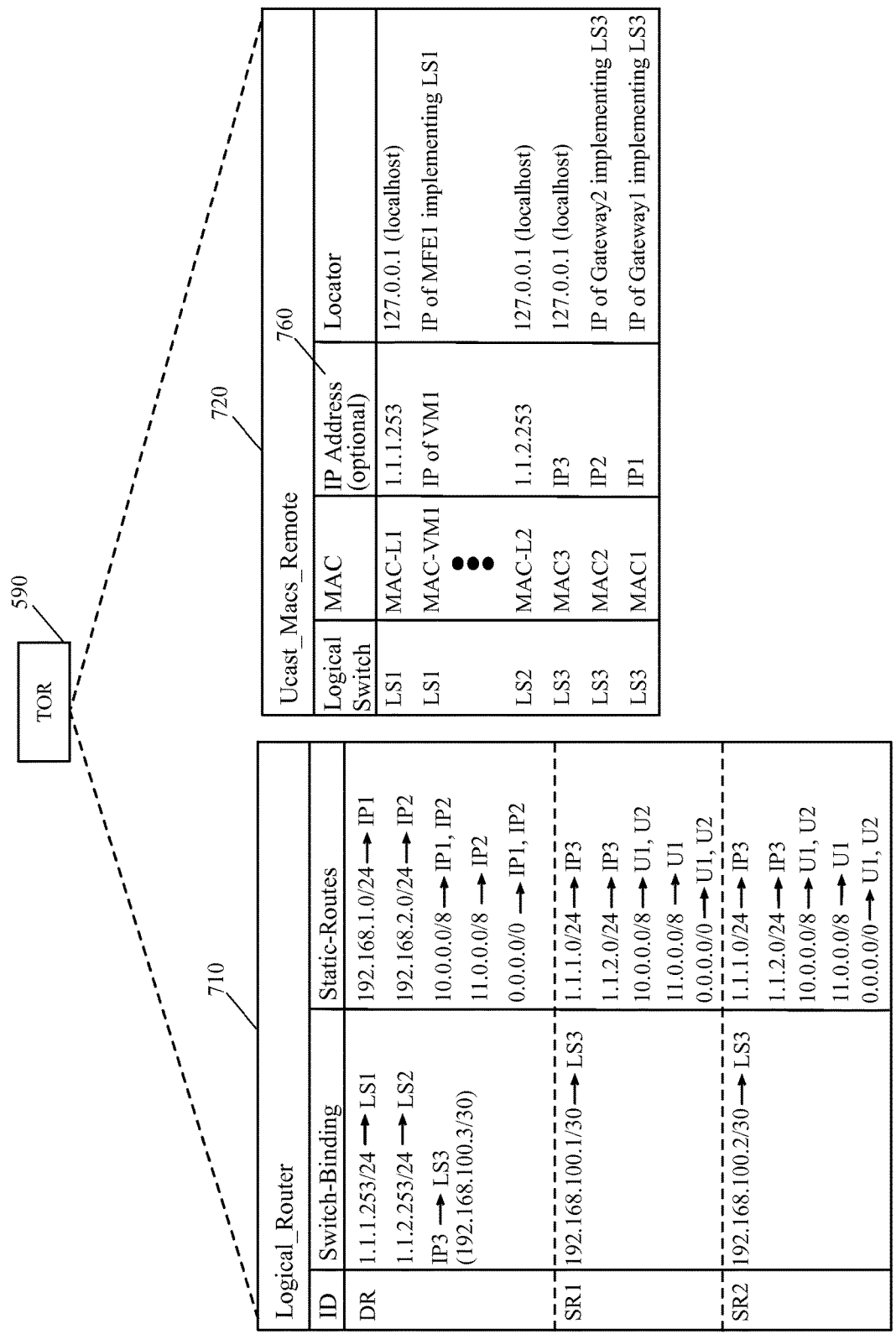
FIG. 7 illustrates the configuration data propagated in different database tables stored on an MHFE using the OVSDB schema in order to enable the MHFE to infer the data link layer (MAC) address of logical ports of a logical router.

FIG. 7 illustrates the configuration data propagated in different database tables stored on an MHFE using the OVSDB schema in order to enable the MHFE to infer the data link layer (MAC) address of logical ports of a logical router. The MHFE for which the tables are illustrated is the TOR switch 590 shown in FIG. 5. As shown in the figure the logical router table 710 (Logical_Router table) is a table that is configured to map the IP (IPv4 or IPv6) addresses of logical ports of a logical router to one or more logical switches. Since a logical router is divided to separate distributed and service routers in some embodiments, the control plane of some embodiments configures each of these routing components as a separate router in this table. As illustrated, each record in the logical router table 710 includes an ID field that identifies the router, a switch binding field that maps the different IP addresses of the different ports of the router to a logical switch, and a static route field that specifies the different static routes of the router.

As shown, the ID fields includes a row for the distributed router 505 (DR) of FIG. 5, a row for the service router 510 (SR1), and a row for the service router 515 (SR2). The corresponding switch binding field for DR has the IP address of logical port L1 (1.1.1.253/24), which is mapped to the logical switch 405 (LS1). Similarly, the IP address of logical port L2 (1.1.2.253/24) is mapped to the logical switch 410 (LS2) and the IP address of logical port DRP1 (192.168.100.3/30) is mapped to the transit logical switch 520 (LS3). The static routes populated in the static routes field for the DR are the remaining routes specified in the FIB 530 of the DR. In other words, the connected routes of the FIB of the routing component form the switch-binding field of the routing component and the remaining routes in the FIB form the static routes field in some embodiments.

Therefore, the static routes field of the table 710 shows for the DR that the subnet on which the first uplink is located (192.168.1.0/24) is reached via the southbound interface of the first SR (IP1), while the subnet on which the second uplink is located (192.168.2.0/24) is reached via the southbound interface of the second SR (IP2). Additionally, the network 10.0.0.0/8 is reached via either of the logical ports SRP1 and SRP2 (e.g., via EMCP), while the network 11.0.0.0/8 is reached via the logical port SRP2 of the service router SR2. Lastly, the default route (0.0.0.0/0) is reachable via either of the logical ports SRP1 and SRP2 (IP1 and IP2).

The table 710 also shows that the switch-binding field for the service routing component SR1 maps the IP address of the southbound logical port SRP1 (192.168.100.1/30) to the logical switch LS3. Similarly, the switch-binding field for the service routing component SR2 maps the IP address of the southbound logical port SRP2 (192.168.100.2/30) to the same logical switch LS3 (the transit logical switch 520 shown in FIG. 5). In some embodiments, when there is no logical switch associated with the northbound logical ports of the service routers (e.g., when the uplinks of the router are connected directly to a physical router that connects the router to an external network), no switch binding field for those logical ports are populated in the logical router table. Finally the static routes for the two service routers as shown are the remaining routes of the FIBs of these routers.

The illustrated table 720 is the same tunnel endpoint table 540 shown in FIG. 5 with the exception that this table now shows an additional field 760 which is an optional field for holding a corresponding IP address for each MAC address populated in field 550 (i.e., the MAC field in the Ucast_Macs_Addresses table 540) in the OVSDB schema. As described above, some embodiments (implemented by the control plane) populate the IP address of each logical port of the routing components in this field in order to (1) link the table 720 (i.e., Ucast_Macs_Addresses table) to the table 710 (Logical Router table) and (2) enable the TOR switch 590 to infer the MAC addresses of the logical router ports and thereby identify the packets that are destined for the logical router implemented by the TOR switch.

In some embodiments, the control plane determines which MAC addresses of the MAC field belong to a port of a routing component of the logical router during the configuration of the logical router on the MHFE. That is, while the control plane is populating the tunnel endpoint locator table 720 with the IP addresses of each MAC address of a port (e.g., logical and physical ports of logical and physical switches), the control plane matches the IP address for each port against the IP addresses stored in the logical router table 710. In some such embodiments, when a match is found, the control plane tags the corresponding MAC address in the tunnel endpoint locator table 720 as a MAC address that belongs to a logical router. By doing so, these embodiments enable the MHFE to infer a MAC address of a received packet belongs to a logical router port by simply looking up that MAC address in the tunnel endpoint locator table 720. In other words, when the control plane tags the MAC addresses of the logical router in table 720, the MHFE does not have to (i) retrieve a corresponding IP address for each MAC address of a received packet and (2) match the retrieved IP address against the logical router table.

In some other embodiments, as described above, the control plane tags the MAC addresses of the logical ports of a logical router during the configuration of the tunnel endpoint locator table. The control plane tags these MAC addresses by populating a corresponding IP address for each MAC address of the table and linking the corresponding IP addresses to the IP addresses of logical ports of the logical router populated in the logical router table. In some such embodiments, the TOR switch simply looks up the MAC address of the received packet in the tunnel endpoint locator table 1820 and starts L3 processing on the packet when the MAC address of the packet matches one of the tagged MAC addresses in the table.

As an example, when the TOR switch receives a packet that has a destination MAC address MAC-L1 in the data link layer of the packet header, the TOR switch concludes that the packet is an L3 packet by simply looking the MAC address in the tunnel endpoint locator table 720. In some other embodiments though, after extracting the MAC address (e.g., MAC-L1) from the received packet (form the layer 2 header of the packet), the MHFE retrieves the corresponding IP address for the MAC address (e.g., IP address 1.1.1.253) from the tunnel endpoint locator table 720 and matches this IP address against the IP addresses of the logical router table 710. The TOR switch then realizes that the MAC address belongs to one of the ports of the DR that is associated with the logical switch LS1. As such, the TOR switch concludes that the packet is an L3 packet and starts L3 processing on the packet.

Figure 8:
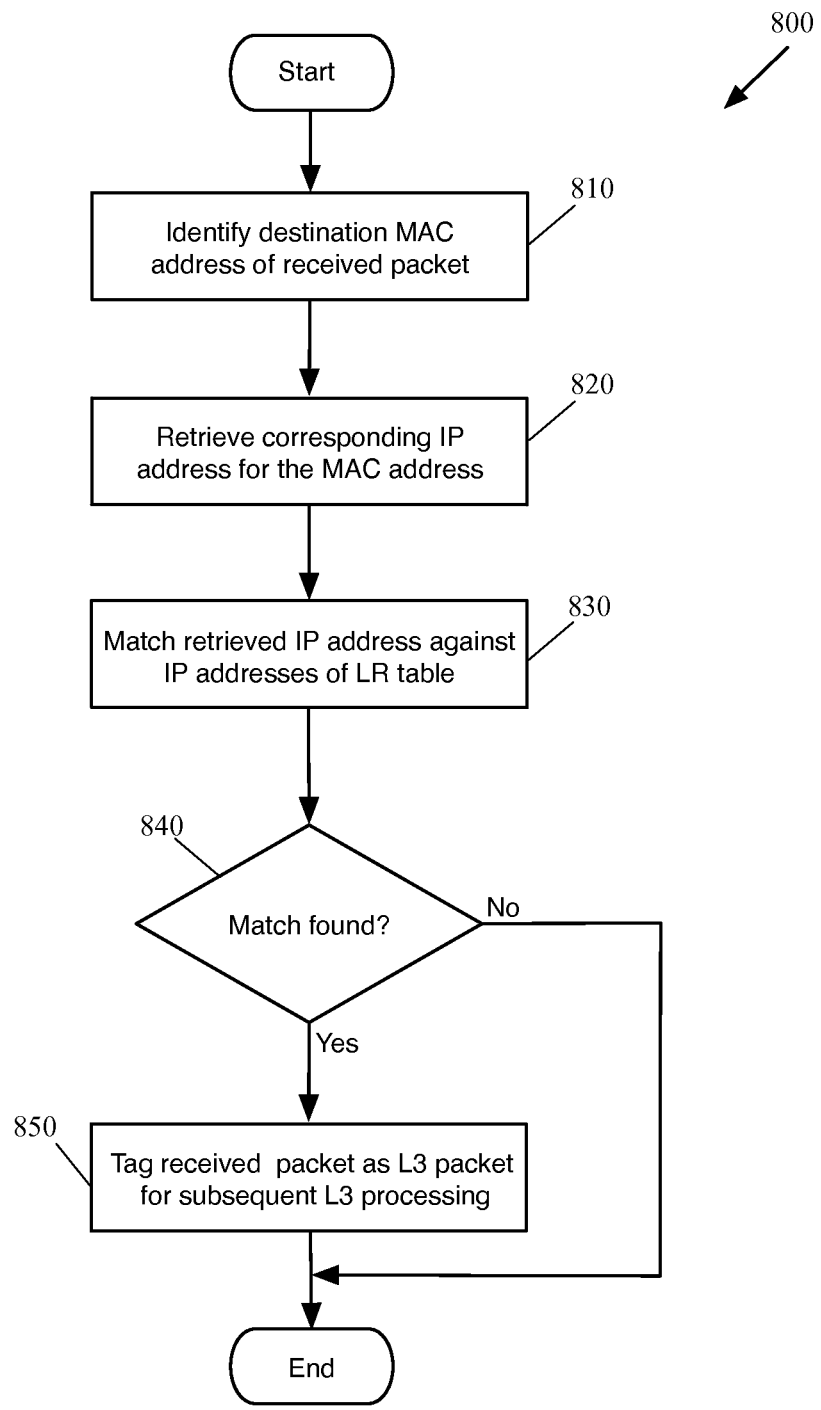
FIG. 8 conceptually illustrates a process that the MHFE of some embodiments performs for identifying logical ports of a logical router configured on the MHFE.

FIG. 8 conceptually illustrates a process 800 that the MHFE (e.g., TOR switch) of some embodiments performs for identifying logical ports of a logical router configured on the MHFE. The illustrated process relates to the embodiments that configure the tables with the linking data and the MHFE looks up the corresponding IP address of each MAC address of a received packet (or the first received packet of a flow) in the logical router table. As described above, in some other embodiments, the control plane (e.g., a controller computer in a centralized management control system) tags the MAC addresses that belong to the ports of a logical router as L3 MAC addresses while the control plane populates the tunnel endpoint locator table with the linking data.

In some embodiments, in order for the TOR switch to perform the process, the control plane first configures the different tables generated on the TOR switch using OVSDB schema. The control plane, as described above, propagates the different tables is such a way to create a link between a first forwarding table that contains the MAC addresses of the different ports of the forwarding elements (including the logical router ports), and a second forwarding table that is configured to contain the IP addresses of the different ports of the logical switch. In order to make such a link, the control plane of some embodiments propagates the first forwarding table with the corresponding IP addresses of every MAC address that is stored in the table as described above.

The process 800 begins by identifying (at 810) a destination MAC address of a packet that is received by the TOR switch. The process identifies the destination MAC address by extracting the destination MAC address field from the data link layer header of the packet in some embodiments. After identifying the MAC address of the packet, the process retrieves (at 820) the corresponding IP address of the MAC address. In some embodiments, the process retrieves the address from a corresponding field of the tunnel endpoint locator table (e.g., table 720) for this purpose.

The process then matches (at 830) the retrieved IP address against the logical router table (e.g., table 710) in order to determine whether a record with such IP address exists in the table.

Next, the process determines (at 840) whether a match is found for the retrieved IP address in the logical router table. If match is not found, the process 800 ends. If the process is able to find a match and determines that the packet is an L3 packet, it tags (at 850) the packet as an L3 packet so the TOR switch routes the packet based on the data stored in the packet headers (e.g., layer 2 and layer 3 headers of the packet), the routing rules stored in the different RIBs and FIBs of the different routers (e.g., routing components), and the data stored in other forwarding tables (e.g., the tunnel endpoint locator table that identifies the location of transport nodes to establish tunnels for exchanging the logical network traffic). The process 800 then ends.

Some embodiments perform variations of the process 800. The specific operations of the process 800 may not be performed in the exact order shown and described. For example, the process of some embodiments, after identifying (at 810) the destination MAC address of a received packet, do not perform any of the steps 820-840. Some such embodiments simply (i) look up the identified MAC address in the tunnel endpoint locator table (e.g., table 720 of FIG. 7), and (ii) if the found match in the table is tagged as an L3 MAC, send the packet for L3 processing. Additionally, the specific operations of process 800 may not be performed in one continuous series of operations, and different specific operations may be performed in different embodiments.

The above sections described (1) the configuration of the various logical routing components on an MHFE by the control plane in order to locate the tunnel endpoints for the different ports of the logical routing components, and (2) enabling the MHFE to perform routing functionalities on the logical network traffic that is destined for the logical router implemented by the MHFE. An example of routing the logical network traffic through a logical router implemented by the MHFE is given below. This example is described by reference to FIG. 9, which is similar to FIG. 3, except that some of the elements of the logical network are not shown in this figure (e.g., the second host Host2 which executes the second and third virtual machines VM2 and VM3) for the simplicity of description and to further simplify the provided example.

As described above, the logical routing components (as well as the logical switches, both those defined by the user and those defined by the control plane for connecting logical router components) are implemented by various managed forwarding elements (MFEs) as well as by one or more managed hardware forwarding elements (MHFEs). As shown in FIG. 3, for example, the data compute nodes attached to the user-defined logical switches reside on physical host machines on which MFEs operate (e.g., within the virtualization software of the host machine), while other physical machines (e.g., third-party physical machines) are attached to the MHFE (e.g., a third-party hardware switch). The MFEs and MHFE implement the logical switches of a logical network as well as the DRs, in some embodiments.

Figure 9:
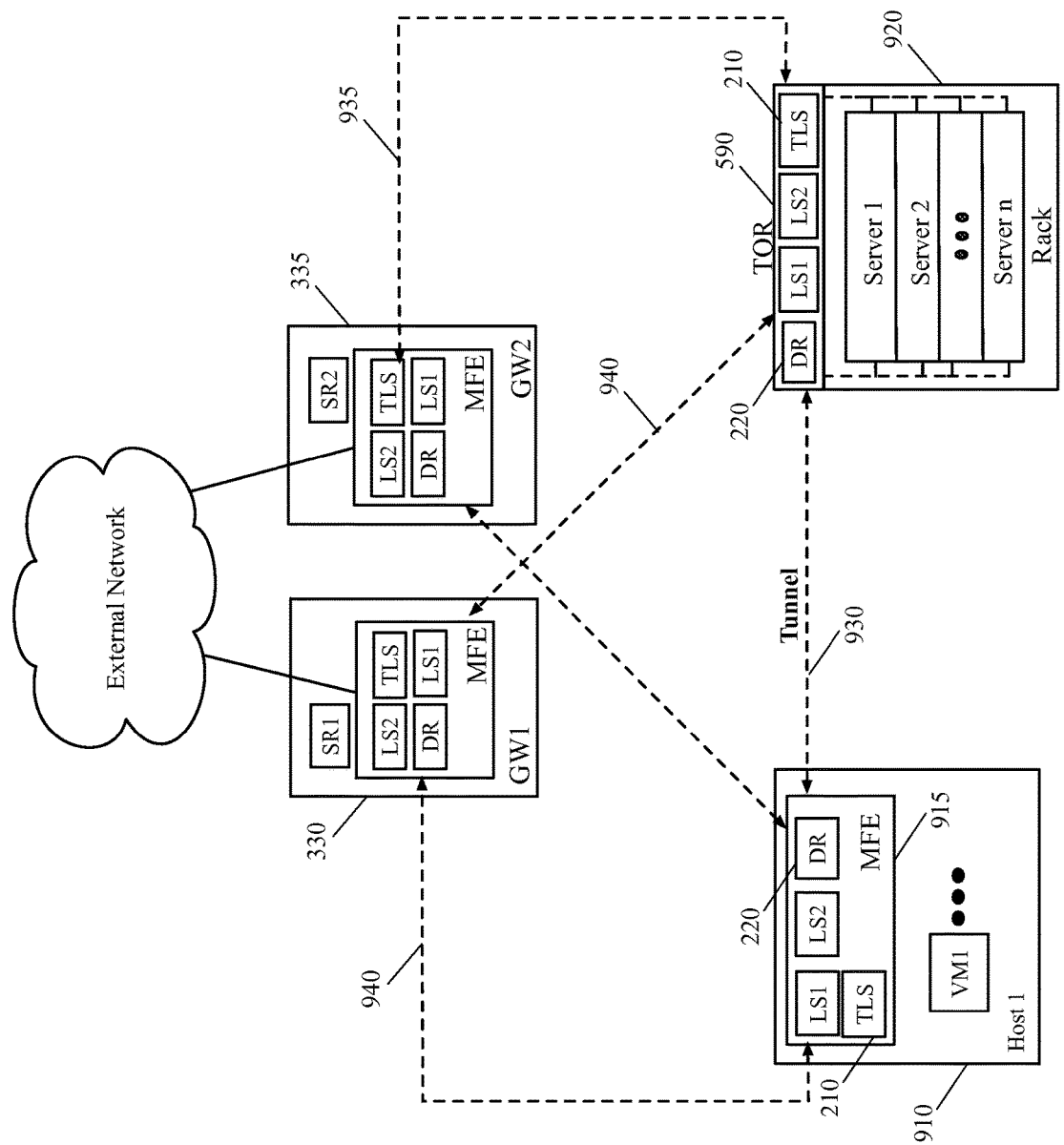
FIG. 9 illustrates a physical network implementation logical router that routes the logical network traffic.

FIG. 9 illustrates the virtual machine VM1 that resides on the physical host machine Host1 that executes managed forwarding element MFE1. Although not shown in this figure, FIG. 2 showed that this virtual machine is attached to the logical switch 105 (LS1) which is implemented by the MFE 915 (MFE1). The MFE 915 on the physical host machine 910 and the TOR 590 on the rack 920 include configuration to implement both logical switches 105 and 110 (LS1 and LS2), the DR 220, and the transit logical switch 210. In addition, similar to FIG. 3, this figure shows that the two gateway machines 330 and 335 (also called edge nodes) each implements a SR of the logical router. The figure also shows various tunnels (e.g., VXLAN tunnels) established between the different MFEs of the different host and gateway machines to exchange the network traffic between each other. Although not shown in the figure, some embodiments also establish a tunnel between the two gateway machine so that the SRs implemented on these machine can exchange data and in case one of them fails, the other one can take over.

Figure 10:
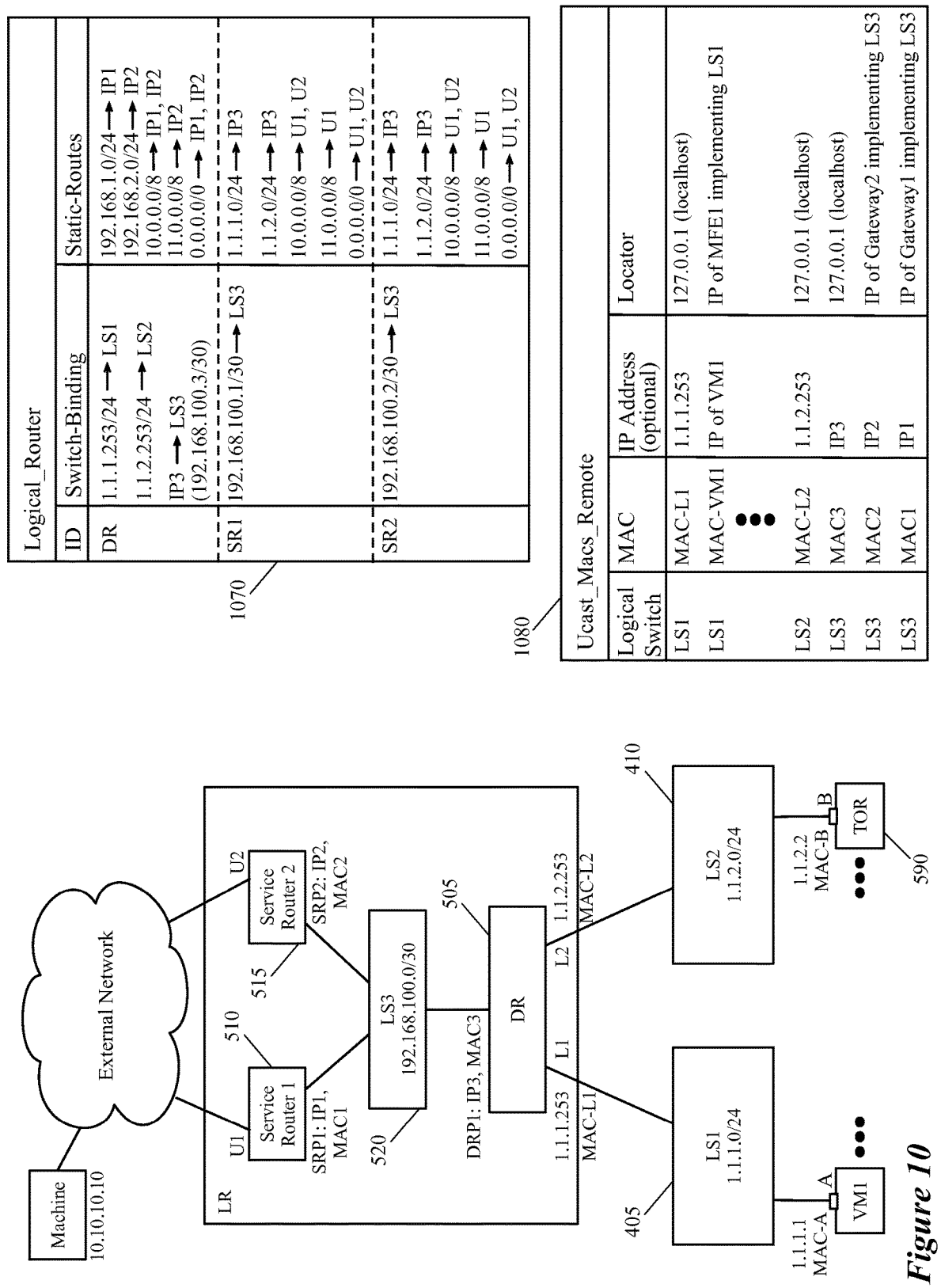
FIG. 10 illustrates a control plane view for the physical network implementation shown in FIG. 9.

The packet processing pipeline for the example architecture shown in FIG. 9 will now be described by reference to FIG. 10, which is similar to control plane view shown in FIG. 5 with the exception that in this figure, the physical port B on TOR switch 590 and port A on VM1 are illustrated. Additionally, this figure includes the same forwarding tables configured on the TOR switch that are shown in FIG. 7 to simplify the description.

The first example packet processing describes an east-west routing. In some embodiments, the east-west traffic (e.g., traffic from a data compute node on LS1 to a data compute node on LS2) is handled primarily at the first-hop MFE and/or MHFE (e.g., the MFE of the virtualization software on the host machine 910 for the source VM1), then tunneled to the destination MFE and/or MHFE (e.g., the MHFE 590 in the rack 920. As such, the packets do not pass through the SRs, and thus do not receive any services provided by these SRs. Other embodiments, however, allow for routing policies that send certain east-west traffic to the SRs for processing.

In the first example a physical machine (e.g., a third-party server) that is connected to the hardware VTEP (i.e., TOR switch 590) sends a packet to the virtual machine VM1 residing on host 910. For this example, the different pipelines of different logical forwarding elements implemented by the MHFE is first described. Based on the source IP address of the packet (or the ingress port through which the packet is received), the datapath on the MHFE 590 initially runs the source logical switch pipeline, which is logical switch 410 (LS2). The LS2 pipeline specifies to forward the packet to the DR 505, the pipeline for which also takes place on the MHFE 590. This pipeline identifies that the logical switch 405 (LS1) is the next hop based on the destination IP address of the packet. As such the source MHFE is not required to establish a tunnel to any one of the gateway machines that implements the SRs, nor does it have to execute the pipeline for the transit logical switch 520 (LS3).

Instead, the MHFE executes the pipeline for the logical switch LS1 (the identified next hop), which is also implemented by the MHFE. This pipeline specifies to tunnel the packet to the MFE that runs on host 910 that also executes the destination VM1. That is, the logical switch LS1 pipeline identifies the MFE 915 as the MFE that implements the port of the logical switch LS1 that is associated with the destination port of virtual machine VM1. The logical switch LS1 pipeline then establishes a tunnel to this MFE that also executes LS1 pipeline, encapsulates the packet with appropriate tunneling data and sends the packet to the other endpoint. Next, the MFE 915 receives the packet, decapsulates it (to remove the tunneling data), and identifies the destination virtual machine VM1 based on the destination MAC address of the packet. The MFE then sends the packet to its final destination VM1.

The L3 processing of the packet with example IP and MAC addresses of the ports is as follows. In the example, the physical machine is connected to port B of the hardware VTEP that is associated with the logical switch 410 (LS2) as shown in FIG. 10, and has an IP address of IP-B (1.1.2.2) and a MAC address of MAC-B. Also the virtual machine VM1 has a virtual interface (port A), which is implemented on MFE 915. Port A has an IP address IP-A (1.1.1.1) and a MAC address MAC-A, which is associated with the logical switch 405 (LS1).

As described above in FIG. 5, the default gateway for the TOR switch 590 is the L2 port of the DR 505 (the default gateway has been assigned to the TOR switch 590 by assigning a static IP address to its different ports including port B, or through a DHCP service). The default gateway port L2 is in the same subnet as port B is and has an IP address of 1.1.2.253 and a MAC address of MAC-L2 as shown in the FIG. 10. Therefore, the physical machine (e.g. a server connected to port B of the TOR switch) sends an L3 packet that has a destination MAC address of MAC-L2, a source MAC address of MAC-B, a destination IP address of 1.1.1.1 (i.e. the IP address of VM1), and a source IP address of 1.1.2.2 (i.e., the IP address of TOR 590). It should be noted that the MAC address of the default gateway port can be learned by sending an ARP request from the physical machine (e.g., server) connected to port B to the hardware VTEP, which in response yields the MAC address using the Ucast_Macs_Remote table (since the hardware VTEP knows that port B is associated with the logical switch LS2 and therefore the MAC address associated with this logical switch in the table is MAC-L2).

After the packet is received at the hardware VTEP (i.e., TOR 590), the hardware VTEP realizes that the packet is an L3 packet because the destination MAC address of the packet is MAC-L2 which is a MAC address of one of the ports of the logical router. As described above, the hardware VTEP makes such a determination by linking the packet's IP address to the IP address of the logical router ports in the logical router table 1070 configured on the hardware VTEP. As such, the MHFE performs L3 processing on the packet. That is, the MHFE replaces the destination MAC address of the packet (MAC-L2) with the destination MAC address of the MFE port associated with the virtual machine VM1 (MAC-A) and also replaces the source MAC address MAC-B with the router port's MAC address (MAC-L1). The source and destination IP addresses remain the same.

In order to replace the source MAC address, the MHFE looks at the switch binding column of the logical router table 1070. Based on the destination IP address of the packet (i.e., 1.1.1.1), the MHFE 590 determines that the egress port should be in the same subnet that logical switch LS1 is. Therefore the packet must egress from port L1 of the DR 505, which has the MAC address of MAC-L1. The MHFE also looks up the destination IP address in the tunnel endpoint locator table and the matched record in this table yields the MAC address of the MFE port (MAC-A) as well as the tunnel endpoint locator address of the MFE (e.g., the IP address of the MFE 915 or the IP address of the hypervisor on which the MFE runs) that implements the logical switch associated with this port.

The MHFE 590 then establishes the tunnel 930 (e.g., a VXLAN tunnel) to the identified tunnel endpoint (MFE 915) and sends the packet to the destination port using the tunnel (e.g., after adding the tunnel encapsulation data to the packet). In the described example, the MHFE is able to locate the destination MAC address and tunnel endpoint locator in the tunnel endpoint locator table 1080 based on the destination IP address of the packet which is stored in the optional IP address column of the table at the configuration time of the table (as described above). However, if this IP address is missing in the table, some embodiments identify this IP address and store the identified address in the table using an address resolution protocol (ARP) mechanism.

A second packet processing example which involves north-south routing will now be described. This example is also described by reference to FIGS. 9 and 10. Specifically, the same machine on port B of the TOR switch sends a northbound packet to a machine in an external network, which has an IP address of 10.10.10.10. For this example, the different pipelines of different logical forwarding elements implemented by the MHFE is first described. Based on the source IP address of the packet (or the ingress port through which the packet is received), the datapath on the MHFE 590 initially runs the source logical switch pipeline, which is the logical switch 410 (LS2). The LS2 pipeline specifies to forward the packet to the DR 505, the pipeline for which also takes place on the MHFE. This pipeline identifies one of the SRs implemented on a gateway machine as its next hop since the subnet of the destination IP address is shared with both SR subnets (some embodiments use ECMP to select one of the SRs).

Next, the source MHFE executes the pipeline for the transit logical switch 520 (LS3), which specifies to tunnel the packet to the appropriate gateway machine (edge node) that hosts (implements) the selected SR (e.g., one of the gateway machines 330 and 335 in FIG. 9). The gateway machine (i.e., the MFE on the gateway machine) receives the packet, decapsulates it (to remove the tunneling data), and identifies the SR based on the logical context information on the packet (e.g., the VNI of the transit logical switch 520) as well as the destination MAC address that corresponds to the SR's southbound interface. The SR pipeline is then executed (by the MFE in some embodiments, and by a VM implementing the SR in other embodiments). The SR pipeline sends the packet to the physical network that has the destination IP address.

The L3 processing of the packet with example IP and MAC addresses of the ports is as follows. Similar to the first example, the physical machine is connected to port B of the hardware VTEP that is associated with the logical switch LS2 and has an IP address of 1.1.2.2 and a MAC address of MAC-B. Also as stated before, the packet is being sent to a machine with IP address of 10.10.10.10 in an external network.

As described above, the default gateway for the TOR switch is the L2 port of the DR 505. The default gateway port L2 is in the same subnet as port B is and has an IP address of 1.1.2.253 and a MAC address of MAC-L2. Therefore, the physical machine (on port B of the TOR switch) sends an L3 packet that has a destination MAC address of MAC-L2, a source MAC address of MAC-B, a destination IP address of 10.10.10.10, and a source IP address of IP-B. After the packet is received at the hardware VTEP, the VTEP realizes that the packet is an L3 packet because the destination MAC address of the packet is MAC-L2, which is a MAC address of one of the ports of the logical router (similar to the first example described above). As such, the MHFE performs L3 processing on the packet.

The MHFE 590 starts to perform the L3 processing by replacing the destination MAC address of the packet (MAC-L2) with the destination MAC address of any of the SRP1 and SRP2 ports of any of the SR1 and SR2 (shown in FIG. 10) associated with the transit logical switch LS3. The MHFE also replaces the source MAC address MAC-B with the MAC address of northbound logical port of the DR 505 (i.e., MAC3). The source and destination IP addresses remain the same.

In some embodiments the hardware VTEP (MHFE) decrements the time to live (TTL) field of the packet header in an east-west routing (i.e., when only the DR port of the logical router performs the routing such as the routing in the first example). The hardware VTEP of some such embodiments, however, does not decrement the TTL at the DR routing level when both the distributed routing component and service routing component of the logical router participate in the routing of the packet (as in this example). This is because the TTL should not be decremented twice when in fact only one logical router performs the routing process. That is, even though two routing components are participating the routing of the packet in this example, these two components belong to a single logical router and as such act as one router. In some embodiments, the TTL is decremented at the SR routing level (and therefore only once).

In order to replace the source MAC address, the MHFE looks at the static route field of the logical router table 1070 and based on the destination IP address of the packet (i.e., 10.10.10.10) determines that the egress port should be sent to either SRP1 or SRP2. Therefore the packet must egress from port DRP1 of the DR 505, which has the MAC address of MAC3. The hardware VTEP may choose SRP1 or SRP2 as the next hop using an ECMP algorithm (e.g., based on the hash of the packet header the hardware VTEP may choose the next hop as SRP1 or SRP2).

The MHFE also looks up the destination IP address in the tunnel endpoint locator table 1080 and the matched record in this table yields both of the southbound logical port of the SR (either MAC1 or MAC2) as well as the tunnel endpoint locator address of the gateway machine that implements the logical switch (i.e., transit logical switch LS3 520) associated with this port (i.e., the IP address of either gateway machine Gateway 1 or gateway machine Gateway 2 which are implementing the transit logical switch). The MHFE then establishes the VXLAN tunnel 935 or 940 (depending on which SR is chosen) to the identified tunnel endpoint (e.g., an MFE operating on one of these two gateway machines if the SR is implemented by the MFE) and sends the packet to the destination port using the VXLAN tunnel (e.g., after adding the tunnel encapsulation data to the packet).

In the above second example, similar to the first example, the MHFE was able to locate the destination MAC address and tunnel endpoint locator in the tunnel endpoint locator table 1080 based on the destination IP address of the packet. The destination IP address is stored in the optional IP address field of the table at the time when the table is populated. However, if this IP address is missing in the table, some embodiments identify this IP address by using an address resolution protocol (ARP) mechanism and store the identified address in the table.

III. Two Tier and Active-Standby Logical Routers

Figure 11:
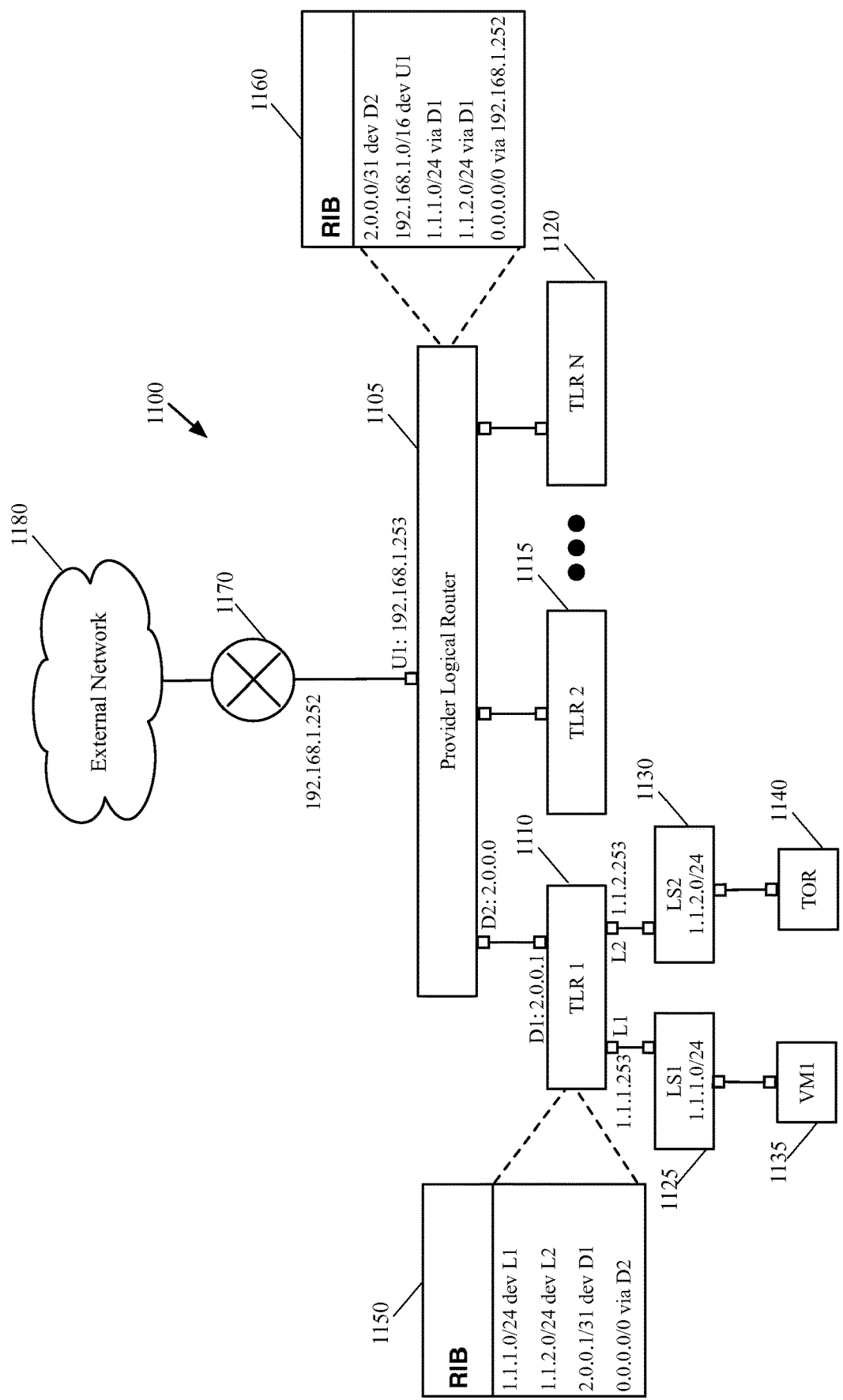
FIG. 11 conceptually illustrates a multi-tier logical router in a logical network of some embodiments.
Figure 12:
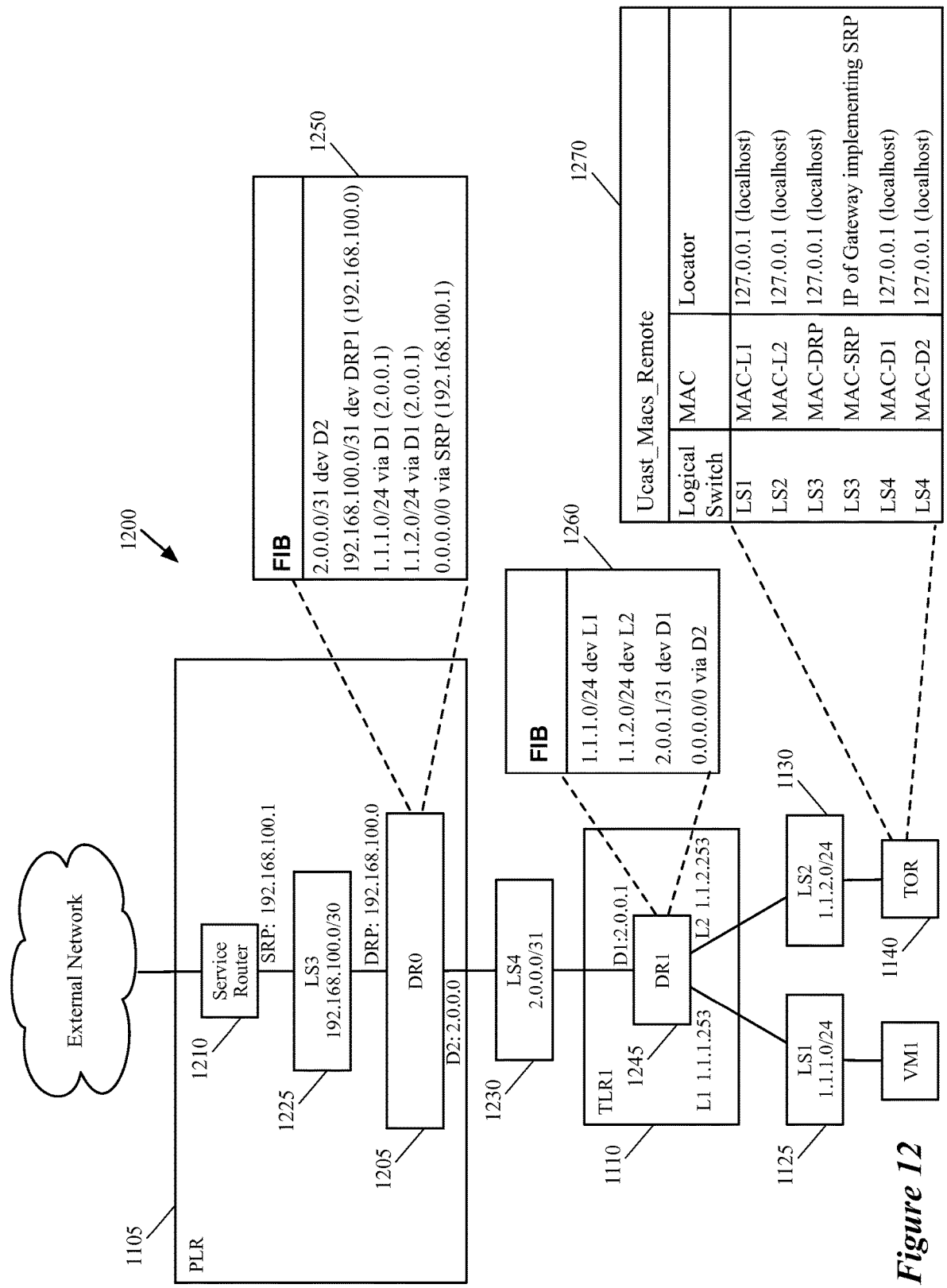
FIG. 12 illustrates the control plane view for the logical topology of FIG. 11 when a TLR in the logical network is completely distributed.

The above two sections described configuration and implementation of a single tier logical router that operates in an active-active mode on a MHFE (e.g., a third-party TOR switch). For logical networks with multiple-tier logical routers, some embodiments include both DRs and SRs at each level, or DRs and SRs at the upper level (the provider logic router (PLR) tier) with only DRs at the lower level (the tenant logical router (TLR) tier). FIG. 11 conceptually illustrates a multi-tier logical router in a logical network 1100 of some embodiments, with FIG. 12 illustrating the control plane view of the logical router. The provided examples and figures describe a two-tier logical router that includes a DR and a set of SRs at the upper level (PLR tier) with only a DR at the lower level (TLR tier). The multiple-tier logical routers that include both DRs and SRs at each level are described in the U.S. Provisional Patent Application 62/110,061, filed Jan. 30, 2015.

FIG. 11 conceptually illustrates a logical network 1100 with two tiers of logical routers. As shown, the logical network 1100 includes a provider logical router 1105 and several tenant logical routers 1110-1120 for L3 operations. The first tenant logical router 1110 has two logical switches 1125 and 1130 attached, with one or more data compute nodes (VMs) and/or MHFEs (TORs) coupling to each of the logical switches. For simplicity, only the logical switches attached to the first TLR 1110 are shown, although the other TLRs 1115 and 1120 would typically also have attached logical switches (with DCNs and MHFEs). As an example the figures shows that a virtual machine 1135 has coupled to the software switch 1125, while a TOR switch 1140 has coupled to the logical switch 1130.

In some embodiments, any number of TLRs may be attached to a PLR such as the PLR 1105. Some datacenters may have only a single PLR to which all TLRs implemented in the datacenter attach, whereas other datacenters may have numerous PLRs. For instance, a large datacenter may want to use different PLR policies for different tenants, or may have too many different tenants to attach all of the TLRs to a single PLR. Part of the routing table for a PLR includes routes for all of the logical switch domains of its TLRs, so attaching numerous TLRs to a PLR creates several routes for each TLR just based on the subnets attached to the TLRs. The PLR 1105, as shown in the figure, provides a connection to the external physical network 1180 (through the physical router 1170). Some embodiments only allow the PLR to provide such a connection, so that the datacenter provider can manage this connection. Each of the separate TLRs 1110-1120, though part of the logical network 1100, are configured independently (although a single tenant could have multiple TLRs if they so chose).

As shown in the figure, the logical switches 1125 and 1130 are each assigned its own subnet, 1.1.1.0/24 and 1.1.2.0/24, and all of the data compute nodes and MHFEs attached to these logical switches will have IP addresses in the corresponding subnet. The TLR 1110 has an interface L1 to the first logical switch 1125, with an IP address of 1.1.1.253 that is the default gateway for the data compute nodes and MHFEs in the subnet 1.1.1.0/24, including the VM 1135. The TLR 1110 also has a second interface L2 to the second logical switch 1130, with an IP address of 1.1.2.253 which is the default gateway for the data compute nodes and MHFEs in the subnet 1.1.2.0/24, including the TOR switch 1140.

The northbound side of the TLR 1110 has a northbound interface D1 with an IP address of 2.0.0.1 that is connected to the southbound interface D2 of the PLR 1105 with an IP address of 2.0.0.0. The PLR 1105 also has an uplink U1 that is the interface of the PLR to the next hop physical router 1170 with an IP address of 192.168.1.252. The uplink U1 has an IP address of 192.168.1.253 and connects to the external network 1180. The physical router 1170 is not actually part of the logical network 1100, but rather connect the logical network to the external network 1180. Although not shown, each of the logical ports of the TLR and PLR is also assigned a separate data link layer (MAC) address.

Based on these example addresses, the RIB 1150 defines the different routes of the TLR 1110. Specifically, the RIB 1150 includes three connected routes based on the subnets configured on the southbound and northbound interfaces of the TLR 1110. These three connected routes include a route that egresses from logical port L1 for any packet that has a destination IP address that is in the subnet of LS1; a route that egresses from the logical port L2 for packets with destination IP addresses that belong to the subnet of LS2; and a route that egresses from the logical port D1 for packets that are routed to the logical port D2 of the PLR 1105. The RIB 1150 also includes a static default route (e.g., configured by the user) that says any other packets should be routed through the southbound ports of the PLR 1105 (e.g., port D2).

The RIB 1160 of the PLR 1105 does not show the routes that are related to any TLR other than the TLR 1110 for simplicity of the description. Specifically, the RIB 1160 includes two connected routes and three static routes. The connected routes are based on the subnets configured on the southbound and northbound interfaces of the PLR (excluding the southbound ports that are connected to the other TLRs as stated above). These two connected routes include a route that egresses from logical port D2 for any packet that is sent to the northbound port of the TLR (D1), and a route that egresses from the logical port U1 for packets with destination IP addresses that belong to the subnet of U1 and/or physical router 1170. The RIB also includes three other static routes: a route that says any packet with the subnet IP address of 1.1.1.0/24 should be routed via logical port D1; a route that says any packet with the subnet IP address of 1.1.2.0/24 should be routed via logical port D1; and finally a default route which is through the physical router 1170.

FIG. 12 illustrates the control plane view 1200 for the logical topology 1100. The figure also illustrates how the control plane configures the tunnel endpoint locators on an MHFE that implements the logical router. For simplicity, only details of the first TLR 1110 are shown; the other TLRs will each have its own DR, as well as SRs in some cases. Also to simplify the description, only one uplink connects the logical network to an external network. In this example, the PLR 1105 includes a DR 1205 and one SR 1210, connected together by a transit logical switch 1225. In addition to the transit logical switch 1225 within the PLR 1105 implementation, the control plane also defines separate transit logical switches between each of the TLRs and the DR 1205 of the PLR 1105, for which only the transit switch 1230 (LS4) that is between TLR1 1110 and the PLR 1105 is shown in the figure.

The transit logical switch 1230 (LS4) connects to a DR 1245 that implements the configuration of the TLR 1110. Thus a packet sent to a destination in the external network by a data compute node attached to the logical switch 1125 (e.g., virtual machine VM1) will be processed through the pipelines of the logical switch 1125, the DR 1245 of TLR 1110, the transit logical switch 1230, the DR 1205 of the PLR 1105, the transit logical switch 1225, and the SR 1210 (in the same manner that described in the two examples described above by reference to FIG. 9). In some embodiments, the existence and definition of the transit logical switches 1225 and 1230 are hidden from the user that configures the network through the API (e.g., an administrator), with the possible exception of troubleshooting purposes.

The above figure illustrates the control plane view of logical routers of some embodiments. In some embodiments, an administrator or other user provides the logical topology (as well as other configuration information) through an API. This data is provided to a control plane, which defines the implementation of the logical network topology (e.g., by defining the DRs, SRs, transit logical switches, etc.). In addition, in some embodiments a user associates each logical router (e.g., each PLR or TLR) with a set of physical machines (e.g., a pre-defined group of machines in the datacenter) for deployment. For purely distributed routers, such as the TLR 1205 as implemented in FIG. 12, the set of physical machines is not important, as the DR is implemented across the managed forwarding elements that reside on hosts along with the data compute nodes that connect to the logical network. However, if the logical router implementation includes SRs, then these SRs will each be deployed on specific physical machines.

In some embodiments, the user definition of a logical router includes a particular number of uplinks. As described, an uplink is a northbound interface of a logical router in the logical topology. For a TLR, its uplinks connect to a PLR (all of the uplinks connect to the same PLR, generally). For a PLR, its uplinks connect to external routers. Some embodiments require all of the uplinks of a PLR to have the same external router connectivity, while other embodiments allow the uplinks to connect to different sets of external routers. Once the user selects a group of machines for the logical router, if SRs are required for the logical router, the control plane assigns each of the uplinks of the logical router to a physical machine in the selected group of machines (e.g., gateway machines). The control plane then creates an SR on each of the machines to which an uplink is assigned. Some embodiments allow multiple uplinks to be assigned to the same machine, in which case the SR on the machine has multiple northbound interfaces.

As mentioned above, in some embodiments the SR may be implemented as a virtual machine or other container, or as a VRF context (e.g., in the case of DPDK-based SR implementations). In some embodiments, the choice for the implementation of an SR may be based on the services chosen for the logical router and which type of SR best provides those services.

In addition, the control plane of some embodiments creates the transit logical switches. For each transit logical switch, the control plane assigns a unique VNI to the logical switch, creates a port on each SR and DR that connects to the transit logical switch, and allocates an IP address for any SRs and the DR that connect to the logical switch. Some embodiments require that the subnet assigned to each transit logical switch is unique within a logical L3 network topology having numerous TLRs (e.g., the network topology 1200), each of which may have its own transit logical switch. That is, in FIG. 12, the transit logical switch 1225 within the PLR implementation and the transit logical switch 1230 between the PLR and the TLR1, each requires a unique subnet.

Some embodiments place various restrictions on the connection of logical routers in a multi-tier configuration. For instance, while some embodiments allow any number of tiers of logical routers (e.g., a PLR tier that connects to the external network, along with numerous tiers of TLRs), other embodiments only allow a two-tier topology (one tier of TLRs that connect to the PLR). In addition, some embodiments allow each TLR to connect to only one PLR, and each logical switch created by a user (i.e., not a transit logical switch) is only allowed to connect to one PLR or one TLR. Some embodiments also add the restriction that southbound ports of a logical router must each be in different subnets. Thus, two logical switches may not have the same subnet if connecting to the same logical router. Lastly, some embodiments require that different uplinks of a PLR must be present on different gateway machines. It should be understood that some embodiments include none of these requirements, or may include various different combinations of the requirements.

The control plane of some embodiments generates a FIB for each routing component of each logical router. FIG. 12 shows the FIBs 1250 and 1260 for DRs (DR0 and DR1) that are generated based on the configuration data and the RIBs of the PLR and TLR shown in FIG. 11. Each of these FIBs includes the different routes implemented by the corresponding DR. Specifically FIB 1260 for DR1245 (DR1, generated DR of TLR1) includes the same routes as were shown in RIB of TLR1. That is, FIB 1260 includes the same three connected routes and on static routes of RIB 1160. This is because DR1 has inherited the same logical ports from the tenant logical router 1110.

On the other hand, as shown in the figure, the generated FIB 1250 for the DR 1205 has two connected routes, which connect DR0 1205 to the subnet of transit logical switch 1230 as well as the subnet of transit logical switch 1225. This FIB also includes three static routes two of which are for the subnets of the two logical switch LS1 and LS2, which are both via the northbound port of the DR 1245 (i.e., port D1), and one default route through the southbound port of the service router (i.e., port SRP). In addition to configuring the FIBs of the DRs and SRs, the control plane also assigns MAC addresses to the DR and SR interfaces in some embodiments.

Similar to DRs of a logical router, the control plane also configures each SR of the logical router with a separate FIB and interfaces. As described above, SRs in some embodiments deliver services (i.e., functionalities beyond simply routing, such as NAT, firewall, load balancing, etc.) and provide the connection between the logical network and external physical networks. The configuration of the SRs in multi-tier logical routers is done in the same manner that the SRs of a single-tier logical router are configured. For example, as shown in FIG. 12, since PLR 1105 has one uplink (U1), the control plane defines one service router (SR) 1210 for the PLR. This SR is assigned a southbound interface, with an IP address of 192.168.100.1, which is in the same subnet of the TLS 1225 (LS3), and a MAC address.

Similarly, for each southbound interface of a TLR, some embodiments add a route for the corresponding network to the RIB of each SR. This route points to the northbound DR interface of the TLR as the next-hop IP address of the southbound interface of the SR. Furthermore, any other routes configured for the logical router that egress from the southbound interface are copied to the SR with the same northbound DR interface as the next-hop IP address. On the other hand, a static route of the logical router that egresses from an uplink (e.g., U1 or U2) is copied to the FIB of the SR. In addition, the SRs of the PLR may learn dynamic routes and place the learned dynamic routes in their FIB (though some embodiments perform this locally, without involving the centralized controllers in the control plane).

As described above, the control plane of some embodiments generates and configures a set of forwarding tables on an MHFE (e.g., the TOR switch 1140) using the OVSDB schema in order to logically connect the MHFE to one or more logical networks and also to enable the MHFE to perform logical routing functionalities on the L3 packets of these logical networks. One of these tables is the tunnel endpoint locator table (Ucast_Macs_Remote table 1270 in OVSDB schema) that includes tunnel endpoint locations which specify the network layer (IP) addresses of the MFEs and MHFEs that implement the logical ports of logical switches to which the machines (e.g., end machines, physical machines, etc.) and/or logical ports of the logical routers are connected. By locating the tunnel endpoints, the MFEs and MHFEs are able to establish tunnels between themselves and exchange the logical network data through the established tunnels (VXLAN tunnels).

As shown in FIG. 12, the tunnel endpoint locator (Ucast_Macs_Remote) table 1270 that is generated on the TOR switch 1140 (e.g., by the OVSDB schema) has several different fields. These fields, as described for the tunnel endpoint locator table 540 of FIG. 5, include (i) a logical switch field that species the logical switch to which a port of a machine or a logical router is connected, (ii) a MAC address field that specifies the corresponding MAC address of the port, and (iii) a locator field that specifies the IP address of the tunnel endpoint for the corresponding MAC address.

Also as described above, when the MHFE (e.g., the hardware VTEP) realizes that the destination MAC address of a packet belongs to a port of the distributed routing component, the VTEP does not establish a tunnel for routing the packet because the distributed routing component is implemented by every single MFE, MHFE, and gateway that participates in the logical network. As such, a packet with a destination MAC address of the logical router is not required to be routed to any other node in the network. However, some embodiments populate the tunnel endpoint locator table with the tunnel endpoint data of each logical port of the service routing components that is connected to a logical forwarding element (e.g., an L2 logical switch).

That is, for each logical port of the SRs, some embodiments store (i) in the logical switch field, the logical switch to which the port is connected (e.g., the transit logical switch to which the southbound port of the service component is connected), (ii) in the MAC address field, the MAC address of the port, and (iii) in the locator field, the IP address of the tunnel endpoint that implements the logical switch port to which the service component port is connected (e.g., the IP address of the gateway machine that implements the service routing component).

For example, for the MAC address of the logical port L1 of the DR1 (MAC-L1) which is connected to the logical switch LS1, the control plane stores 127.0.0.1 (localhost) as the IP address of the tunnel endpoint locator field. Similarly, the MAC addresses MAC-L2, MAC-DRP, MAC-D1, and MAC-D2, which are the MAC addresses of the other ports of the distributed routers DR0 and DR1, and are connected to the logical switches LS2, L3, and LS4 also have the same loopback IP address of 127.0.0.1 (localhost) stored in their corresponding tunnel endpoint locator field.

For the service components of the logical router, however, the control plane stores the IP addresses of the gateway machines that implement (e.g., through the MFEs that the gateway machines execute) the logical switch ports that are connected to the SR ports. That is, the SR port SRP with the MAC address MAC-SRP is implemented by the gateway machine Gateway1 (not shown in the figure). As such, the control plane stores, in the locator field, the IP address of Gateway1.

Figure 13:
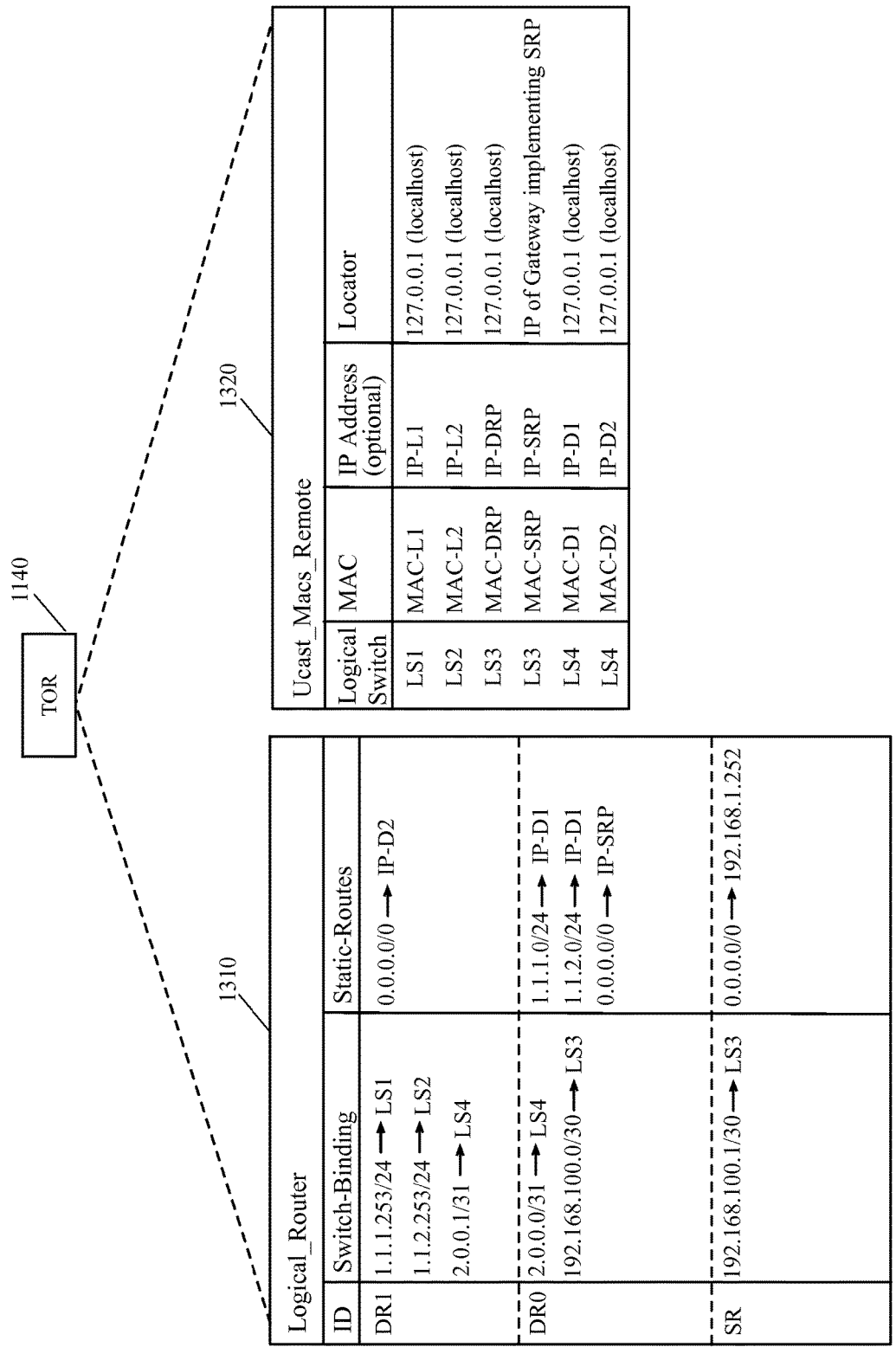
FIG. 13 illustrates another example of the configuration data propagated in different database tables stored on an MHFE using the OVSDB schema in order to enable the MHFE to infer the MAC address of logical ports of multi-tier logical routers.

FIG. 13 illustrates the configuration data propagated in different database tables stored on an MHFE using the OVSDB schema in order to enable the MHFE to infer the data link layer (MAC) address of logical ports of multi-tier logical routers. The MHFE for which the tables are illustrated is the TOR switch 1140 shown in FIG. 12. As shown in the figure the logical router table 1210 (Logical_Router table) is a table that is configured to map the IP addresses of logical ports of a logical router to one or more logical switches. Since a logical router is divided to separate distributed and service routers in some embodiments, the control plane of some embodiments configures each of these routing components as a separate router in this table. As illustrated, the logical router table includes an ID field that identifies the router, a switch binding field that maps the different IP addresses of the different ports of the router to a logical switch, and a static route field that specifies the different static routes included by the router.

As shown, the table 1310 includes a DR row (with DR1/DR2 in ID field) for each of the distributed routers 1205 and 1245 of FIG. 12, and one SR row for the service router 1210. The corresponding switch binding field for DR1 has the IP address of logical port L1 (1.1.1.253/24) which is mapped to the logical switch 1125 (LS1); the IP address of logical port L2 (1.1.2.253/24) is mapped to the logical switch 1130 (LS2); and the IP address of logical port D1 (2.0.0.1/31) which is mapped to the transit logical switch 1230 (LS4). The remaining routes specified in the FIB 1260 are the static routes. In other words, the connected routes of the FIB 1260 of the routing component DR1 form the switch-binding field of the routing component DR1, and the remaining routes in the FIB 1310 form the static routes field in some embodiments. Therefore, the static routes field of the table 1310 shows the only remaining route (i.e., the default route) in the static routes field for DR1.

The corresponding switch binding field for DR0 has the two connected routes of the FIB 1250 which are the IP address of logical port D2 that is mapped to the logical switch LS4 and the IP address of logical port DRP, which is mapped to the logical switch LS3. The remaining routes of the FIB 1250 will be the static routes for DR0. Therefore, the static routes field of the table 1310 shows the three remaining route in the static routes field for DR0 in the static routes field of this router. These routes include the default route, which is reached via the southbound interface of the SR (SRP port). The subnets of the first and second logical switches (LS1 and LS2) are reached through the northbound interface (D1 port) of the DR 1245 (DR1).

The table 1310 also shows that the switch-binding field for the service routing component SR maps the IP address of the southbound logical port SRP (192.168.100.1/30) to the logical switch LS3. In some embodiments, when there is no logical switch associated with the northbound logical ports of the service routers (e.g., when the uplinks of the router are connected directly to a physical router that connects the router to an external network), no switch binding field for those logical ports are populated in the logical router table. Finally, the static route for the service router is the remaining route of the FIB of this router which shows, e.g., an IP address of the next hop physical router towards the external network.

The illustrated table 1320 is the same as the table 1270 shown in FIG. 12 with the exception that this table now shows an additional optional field for holding a corresponding IP address for each MAC address populated in the MAC address field (i.e., the MAC field in the Ucast_Macs_Addresses table) in the OVSDB schema. As described above, the control plane of some embodiments populates the IP address of each logical port of the routing components in this field in order to (1) link the Ucast_Macs_Addresses table 1320 to the Logical_Router table 1310 and (2) enable the TOR switch 1140 to infer the MAC addresses of the logical router ports and thereby identify the packets that are destined for the logical router implemented by the TOR switch 1140.

As an example, when the TOR switch receives a packet that has a destination MAC address MAC-D1 in the data link layer of the packet header, the TOR switch of some embodiments retrieves the corresponding IP address for this MAC address (i.e., IP address IP-D1) from the tunnel locator table 1320 and matches this IP address against the IP addresses of the logical router table 1310. The TOR switch then realizes that the MAC address belongs to one of the ports of the distributed router DR1 that is associated with the logical switch LS4. As such, the TOR switch concludes that the packet is an L3 packet and starts L3 processing on the packet (e.g., in the same manner for packet processing described by reference to the examples of FIG. 9 above).

In some other embodiments, as described above, the control plane tags the MAC addresses of the logical ports of a logical router during the configuration of the tunnel endpoint locator table. The control plane tags these MAC addresses by populating a corresponding IP address for each MAC address of the table and linking the corresponding IP addresses to the IP addresses of logical ports of the logical router populated in the logical router table. In some such embodiments, the TOR switch simply looks up the MAC address of the received packet in the tunnel endpoint locator table 1320 and starts L3 processing on the packet when the MAC address of the packet matches one of the tagged MAC addresses in the table.

While the SR setups in the above-described sections are for active-active configuration (using ECMP), some embodiments use an active-standby configuration with two SRs. Some embodiments use the active-standby configuration when stateful services are configured on the SRs. In this case, the benefit of avoiding having to continuously shared state between the SRs may outweigh the negatives of sending all of the northbound and southbound traffic between multiple SRs (while using a standby for backup in case of failure). In the active-standby mode, the state is periodically synchronized between the two SRs (i.e., between the active and standby SRs), though this need not be done for every packet.

In some embodiments, for active-standby configuration, the administrator is required to configure two uplinks when defining the logical router, and the uplinks need not be in the same L2 domain. However, because the active and standby SRs should be equivalent options to the DR (with the active SR the preferred of the two options), some embodiments require the two SRs to have uniform L3 connectivity. This is, of course, not an issue when the active-standby SRs are configured for a TLR with stateful services, as both SRs will have one next hop, the DR of the PLR to which the TLR connects. For a PLR in active-standby configuration, the two uplinks are configured with the same connectivity in some embodiments. For a PLR, some embodiments allow (or require) performing dynamic routing protocols (e.g., BGP) on the SRs.

Figure 14:
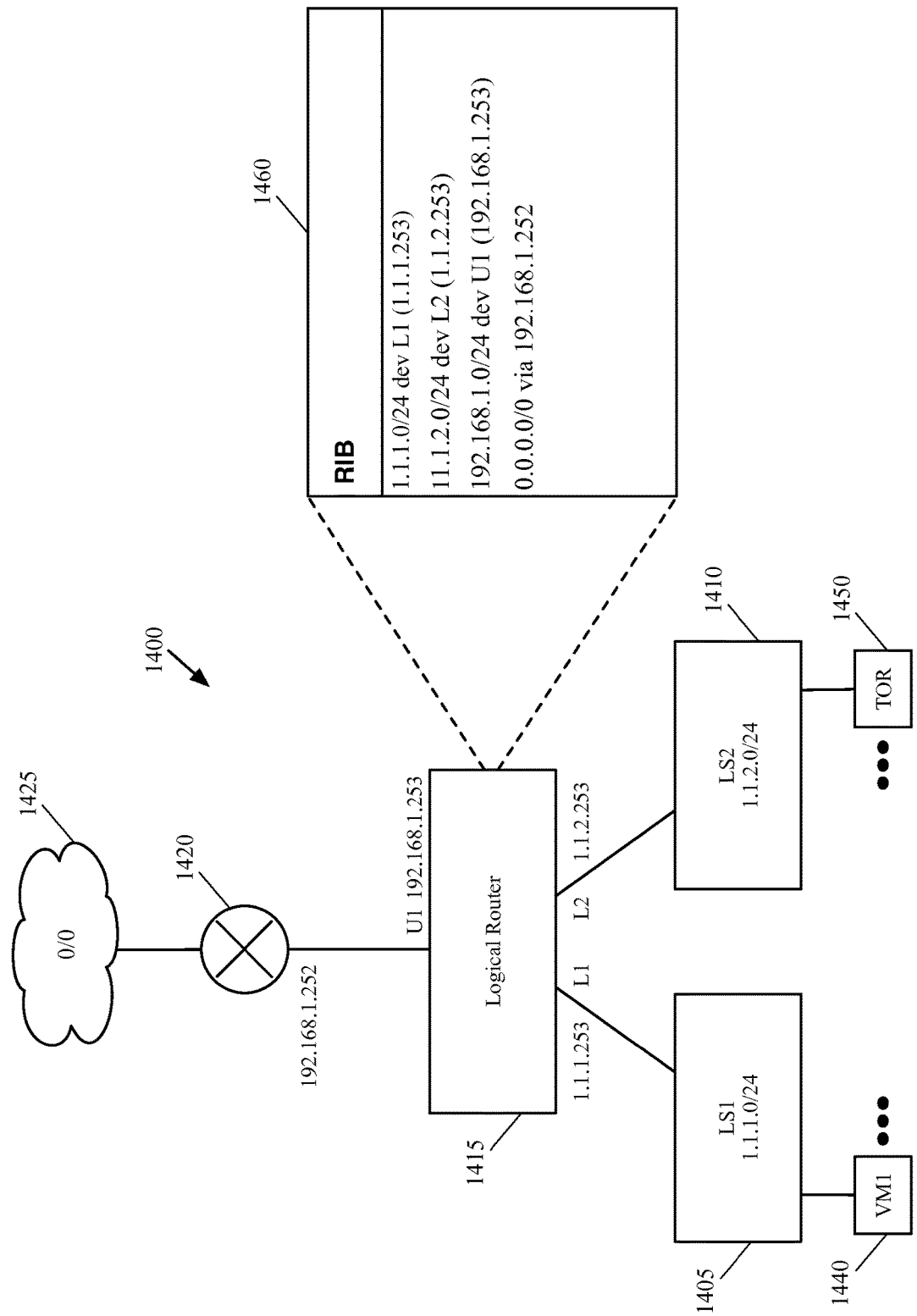
FIG. 14 illustrates an example of a logical network topology that includes single-tier logical router and a RIB that defines the routes of the logical router.

FIG. 14 illustrates a logical network topology 1400 that includes single-tier logical router and a RIB that defines the routes of the logical router. The network topology 1400 is similar to that of FIG. 4, with the exception that this figure shows only one L3 connectivity for the uplink of a logical router. The logical network topology 1400 includes two logical switches 1405 and 1410 that are connected to a logical router 1415. The configuration of these components is the same as with the network topology 400, except for the configuration of the uplinks and the physical routers to which the uplinks connect.

That is, there is only one uplink interface that connects the logical network to an external network 1425 through the physical router 1420 and for this uplink, the user (e.g., network administrator) has defined stateful services (e.g., NAT, load balancing, etc.) and has associated the uplink port (i.e., port U1) with two different edge nodes (e.g., gateway machines). The user of some embodiments is able to associate one uplink of a logical router to more than one edge node through a set of APIs. As a result of configuring the uplink on two edge nodes, the control plane, as shown below in FIG. 15, configures (defines) two different service routers, one of which would be an active service router while the other one would operate as a standby service router.

As shown, the logical switches 1405 and 1410 are each assigned its own subnet (1.1.1.0/24 and 1.1.2.0/24), and all of the data compute nodes and MHFEs attached to the logical switches 1405 and 1410 will have IP addresses in the corresponding subnet. The logical router 1415 has an interface L1 to the first logical switch 1405, with an IP address of 1.1.1.253 that is the default gateway for the data compute nodes and MHFEs in the subnet 1.1.1.0/24, including the VM 1440. The logical router 1415 also has a second interface L2 to the second logical switch 1410, with an IP address of 1.1.2.253 which is the default gateway for the data compute nodes and MHFEs in the subnet 1.1.2.0/24, including the TOR switch 1450.

The northbound side of the logical router 1415 has an uplink U1, which has an IP address of 192.168.1.253 and connects to the physical router 1420 with an IP address of 192.168.1.252. The physical router 1420 is not actually a part of the logical network 1400, but rather connect the logical network to the external network 1425. Although not shown, each of the logical ports of the logical router is also assigned a separate data link layer (MAC) address.

Based on these example addresses, the RIB 1460 defines the different routings performed by the router 1415. Specifically, the RIB includes three connected routes based on the subnets configured on the southbound and northbound interfaces of the logical router. These three connected routes include a route that egresses from logical port L1 for any packet that has a destination IP address that is in the subnet of LS1; a route that egresses from the logical port L2 for packets with destination IP addresses that belong to the subnet of LS2; and a route that egresses the logical port U1 for packets with destination IP addresses that belong to the subnet of U1 and/or physical router 1420. The RIB 1460 also includes one other static route through the physical router 1420, which is a default route for other packets.

Figure 15:
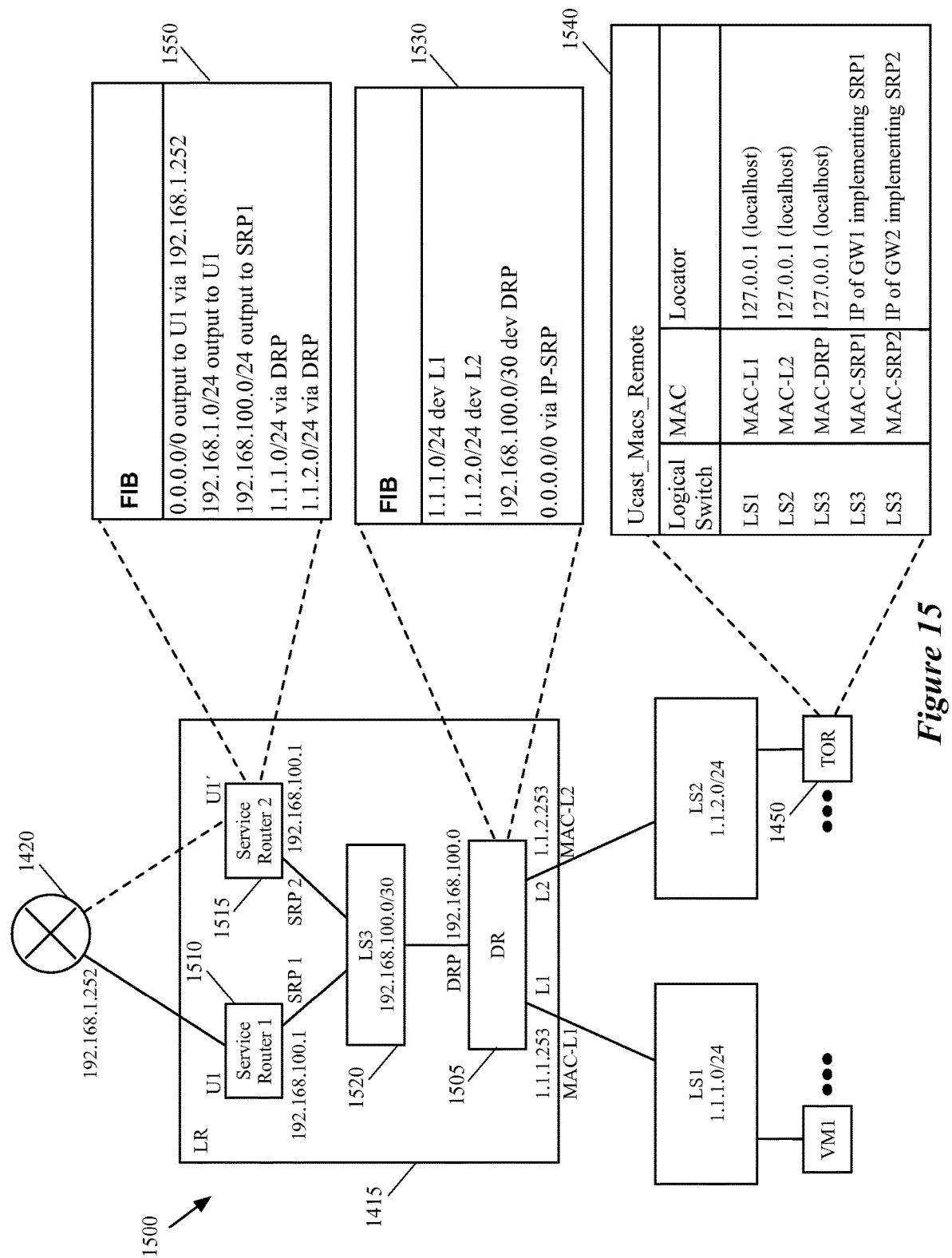
FIG. 15 illustrates a control plane view of the logical network topology of FIG. 14 when the logical router is configured in active-standby mode, rather than active-active (ECMP) mode.

FIG. 15 illustrates a control plane view 1500 of the logical network topology 1400 of FIG. 14 when the logical router is configured in active-standby mode, rather than active-active (ECMP) mode. Specifically, the logical router 1415 includes two SRs 1510 and 1515, one of which is an active SR while the other is an standby SR (i.e., in standby for the active SR). The control plane configures the DR 1505 in the same manner as in the general case of FIG. 5, in terms of assigning MAC and IP addresses to its southbound and northbound interfaces. When constructing the FIB 1530, the same connected routes are used, and the same static route rules apply. The only important difference between this figure and the active-active SR mode shown in FIG. 5 is that because the logical router provides stateful services, the single uplink port is configured on two different edge nodes. As such, the southbound interfaces of the SRs 1510 and 1515 are assigned the same IP address (i.e., IP address 192.168.100.1). These two southbound ports of the SRs 1510 and 1515 will be assigned different MAC addresses though.

Each of the SRs 1510 and 1515 will be configured in mostly the same manner. When the logical router 1415 is a PLR (or in a one-tier topology, as in the example), the IP and MAC addresses of the northbound interfaces are the same as those assigned to the uplinks configured for the PLR. On the other hand, when the logical router 1415 is a TLR, it may only have one uplink that is configured to connect to the PLR. In this case, the IP addresses of the two northbound interfaces are the same, but each SR is assigned a different MAC address. Similarly, in either of these two cases (PLR or TLR), a single IP address is assigned to the two southbound interfaces, with two different MAC addresses for the two SRs.

Any uplink-independent service policies are pushed by the controller (in the control plane) to both of the SRs identically, in some embodiments. If any service policies that depend on the uplink are allowed and configured, then these are pushed to the SRs on which the uplink with which they are associated exists. In addition, any dynamic routing configurations of a logical router port are transferred to the northbound interface of the SRs.

The FIB 1550 for the SRs 1510 and 1515 is similar to that described above for the general case. Static and connected routes that egress from an uplink of the logical router are added to the FIB 1550 of the SRs without modification. For each southbound interface of the logical router (e.g., routes for logical switch subnets), a route for the network is added with the next hop IP address set to the northbound interface of the DR. The FIB 1550 for the SRs 1510 and 1515, as shown in the example of FIG. 15 will include the following routes, prior to learning any additional routes via dynamic routing protocols: any default route 0.0.0.0/0 should be output to U1 via 192.168.1.252 (i.e., the IP address of physical router 1420); any IP address in the subnet 192.168.1.0/24 (subnet of port U1) should be output to U1. Any IP address in the subnets of LS1 and/or LS2 should be routed via northbound port of the DR (i.e., port DRP with IP address of 192.168.100.0).

As mentioned, the SRs 1510 and 1515 are in active-standby mode. In some embodiments, when a SR is set as a standby SR (rather than active SR), the SR does not answer to the ARP requests on its southbound interface in some embodiments. ARP packets for the southbound IP of the SR will be broadcast on the transit logical switch that connects the SRs and the DR, and both the active and standby SRs will be responsive to that IP address. However, only the active SR will respond to ARP requests, so that the DR will route packets to the MAC address of the active SR rather than the standby SR. The standby SR in some embodiments will nevertheless accept packets received by the northbound interface, in order to run its dynamic routing protocol and keep an up-to-date set of routes in case it becomes the active SR. However, the standby SR does not advertise prefixes to the external networks, unless it becomes active.

In some embodiments, the gateway machines (not illustrated) that implement the active SR and the standby SR (SRs 1510 and 1515) monitor each other's liveness over a tunnel between them in some embodiments. In case the active SR fails, the standby SR takes over its responsibilities and the active SR becomes the standby SR. The failure may occur due to the machine on which the SR operates crashing completely, the data compute node or datapath software that implements the machine corrupting, the ability of the SR to connect to either the external network or through tunnels to other components of the logical network failing, etc. On the other hand, when a standby SR fails some embodiments take no action.

As shown in FIG. 15, the generated FIB 1530 for the DR 1505 has three connected routes, which connect (i) the logical port L1 to the subnet of the logical switch LS1, (ii) the logical port L2 to the subnet of the logical switch LS2, and (iii) the logical port DRP to the subnet of transit logical switch 1520. The FIB 1530 also includes a static route, which is the default route through the IP address that is shared between the active and standby SRs 1510 and 1515 for their southbound ports (i.e., 192.168.100.1 shared by the ports SRP1 and SRP2).

As shown in the figure, the tunnel endpoint locator (Ucast_Macs_Remote) table 1540 is configured on the TOR switch 1450 (e.g., through the OVSDB schema) to have a tunnel locator address of 127.0.0.1 (localhost) for each MAC address of the logical ports of the DR 1505 (i.e., MAC-L1, MAC-L2, and MAC-DRP), since DR 1505 is implemented on all of the managed hardware and software forwarding elements that implement the logical switches and routers of the logical network.

For the service components of the logical router 1415, however, the control plane stores the IP addresses of the gateway machines that implement (through the MFEs that the gateway machines execute) the logical switch ports that are connected to the SR ports. That is, the SR port SRP1 with the MAC address MAC-SRP1 is implemented by the gateway machine GW1 (not shown in the figure). As such, the control plane stores, in the locator field, the IP address of GW1, while the SR port SRP2 with the MAC address MAC-SRP2 is implemented by the gateway machine GW2 (not shown in the figure either) and therefore, the control plane stores the IP address of GW2 in the locator field.

Figure 16:
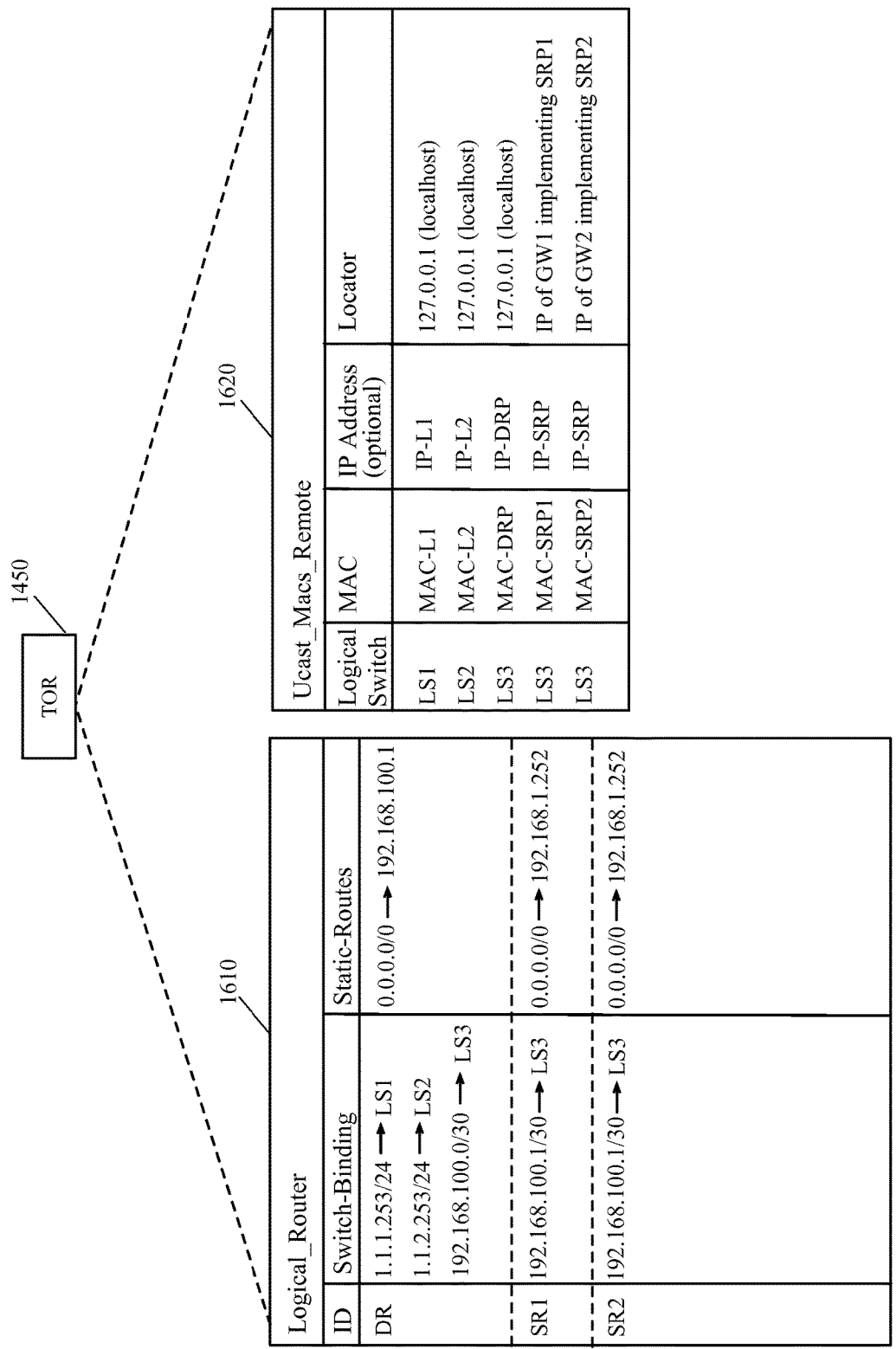
FIG. 16 illustrates another example of the configuration data propagated in different database tables stored on an MHFE using the OVSDB schema in order to enable the MHFE to infer the MAC address of logical ports of the logical router.

FIG. 16 illustrates the configuration data propagated in different database tables 1610 and 1620 stored on an MHFE using the OVSDB schema in order to enable the MHFE to infer the MAC address of logical ports of the logical router. The MHFE for which the tables are illustrated is the TOR switch 1450 shown in FIG. 15. As shown in the figure, the logical router table 1610 (Logical Router table) includes a row for the distributed router 1505 (DR row) and rows for the service routers 1510 and 1515 (SR1 row and SR2 row). The corresponding switch-binding field of the DR row includes: the IP address of logical port L1 (1.1.1.253/24), which is mapped to the logical switch LS1; the IP address of logical port L2 (1.1.2.253/24), which is mapped to the logical switch LS2; and the IP address of logical port DRP (192.168.100.0), which is mapped to the transit logical switch (LS3). The only static route populating the static routes field for the DR is the default route through the share IP address of the southbound interfaces of SR1 and SR2.

The table 1610 also shows that the switch-binding field for the service routing components SR1 and SR2 maps the shared IP address 192.168.100.1/30 of the southbound logical ports SRP1 and SRP2 to the logical switch LS3. Finally, the static route for each of the SRs (active and standby) is the remaining route of the FIB of this routers, which shows an IP address 192.168.1.252 of the next hop physical router towards the external network (in this case, the next hop address for both of the SRs is the same).

The illustrated table 1620 is the same table 1540 shown in FIG. 15 with the exception that the table 1620 shows an additional optional IP address field for holding a corresponding IP address for each MAC address populated in the MAC address field (i.e., the MAC field in the Ucast_Macs_Addresses table) in the OVSDB schema. As described above, the control plane of some embodiments populates the IP address of each logical port of the routing components in the optional IP address field in order to (1) link the table 1620 (i.e., Ucast_Macs_Addresses table) to the table 1610 (Logical_Router table) and (2) enable the TOR switch 1450 to infer the MAC addresses of the logical router ports and thereby identify the packets that are destined for the logical router implemented by the TOR switch 1450.

Additionally, as shown in the figure, the IP address for southbound ports of the SRs are not configured by the control plane in the optional IP address field of the table 1620 (e.g., for either MAC-SRP1 or MAC-SRP2). This is due to the active-standby nature of the service routers (SR1 1510 and SR2 1515). In some embodiments, when the control plane configures the tunnel endpoint locator table (i.e., Ucast_Macs_Remote table), the control plane does not populate the optional IP address fields of this table for any service routing component of the logical router that operates in active-standby mode (e.g., when the logical router 1415 provides stateful services).

In some such embodiments, the control plane leaves the task of identifying the corresponding IP address of each MAC address of the SR's southbound ports for the hardware VTEP (MHFE) to perform. In some embodiments, the hardware VTEP must resolve this IP address when needed, in which case the active SR on the corresponding edge node would respond with the MAC address of the active SR (e.g., MAC-SRP1 or MAC-SRP2).

As an example, when the TOR switch receives a packet that has a destination MAC address MAC-DRP in the data link layer of the packet header, the TOR switch of some embodiments retrieves the corresponding IP address for this MAC address (i.e., IP address IP-DRP) from the tunnel locator table 1620 and matches this IP address against the IP addresses of the logical router table 1610. The TOR switch then realizes that the MAC address belongs to one of the ports of the distributed router 1505 that is associated with the transit logical switch LS3. As such, the TOR switch concludes that the packet is an L3 packet and starts L3 processing on the packet (e.g., in the same manner described above for packet processing by reference to the examples of FIG. 9).

In some other embodiments, as described above, the control plane tags the MAC addresses of the logical ports of a logical router during the configuration of the tunnel endpoint locator table. The control plane tags these MAC addresses by populating a corresponding IP address for each MAC address of the table and linking the corresponding IP addresses to the IP addresses of logical ports of the logical router populated in the logical router table. In some such embodiments, the TOR switch simply looks up the MAC address of the received packet in the tunnel endpoint locator table 1620 and starts L3 processing on the packet when the MAC address of the packet matches one of the tagged MAC addresses in the table IV. Configuring MHFE as an Edge Node The above sections described implementation of the service routing components (SRs) on one or more gateway machines to connect a logical network to one or more external physical networks. As described above, the gateway machines, in some embodiments, are host machines that host service routers rather than user VMs. Additionally, each of the gateway machine of some embodiments includes an MFE that implements the logical forwarding elements of a logical network (e.g., L2 switches, DR, etc.) in a manner similar to the other MFEs operating on other host machines of a datacenter. In some embodiments the SRs are separate from the MFEs that operate on the gateway machines, while in other embodiments, SRs are implemented by the MFEs of the gateway machines in a similar manner that the other logical forwarding elements are implemented.

Instead of configuring a SR on a gateway machine, some embodiments configure a service routing component of a logical router on an edge hardware VTEP (i.e., an edge MHFE) in order to connect a logical network to external physical networks through the edge hardware VTEP. In other words, some embodiments configure an edge MHFE to enable the MHFE to act as a gateway machine to communicate with the external networks.

When a user (e.g., a datacenter administrator) wishes to configure an edge MHFE (e.g., a third-party managed hardware switch) as the gateway of a logical network (e.g., a tenant logical network), the user attach the uplink port (i.e., the northbound interface of the logical router that communicates with external routers) of the logical router to the edge MHFE when defining the logical router. In other words, the user defines the MAC and IP addresses of the uplink port to be bound to one of the physical ports of the MHFE (e.g., a physical port of a TOR switch).

When the control plane receives the definition of a logical router, in which, the uplink port is defined to be attached to a physical port of an MHFE (i.e., the physical port is assigned the same IP and MAC addresses of the uplink port), the management plane instantiates both the distributed component and service components of the logical router on the MHFE. That is, the management plane configures the MHFE (e.g., through the OVSDB schema) to not only implement the DR of the logical router but to implement the SR(s) of the logical router as well. In order to bind the uplink port of the logical router to the physical port of the MHFE, in some embodiments, the management plane defines a new uplink logical switch (ULS) for handling the communications between the SRs implemented on the MHFE and the external networks. In some embodiments the defined uplink logical switch is hidden from the user that configures the logical router through the API, with the possible exception of inspection and troubleshooting purposes.

In some embodiments, the control plane defines the southbound interface of the uplink logical switch (ULS) to be associated with the physical port of the edge MHFE having the MAC and IP addresses of the uplink port of the logical router. In some such embodiments, the management plane defines the northbound interface of the ULS to be associated with an external network (e.g., a southbound port of a next hop physical router that connects the logical network to one or more external networks).

Additionally, the ULS is associated with the uplink port of the logical router and therefore it does not participate in any tunneling mesh. That is, since the edge MHFE is the only logical network element that implements the ULS in the physical network, the MHFE does not establish any tunnel (e.g., VXLAN tunnel) to any other managed forwarding element (e.g., an MFE, an MHFE, etc.) and/or gateway machine that implements a logical switch.

Figure 17:
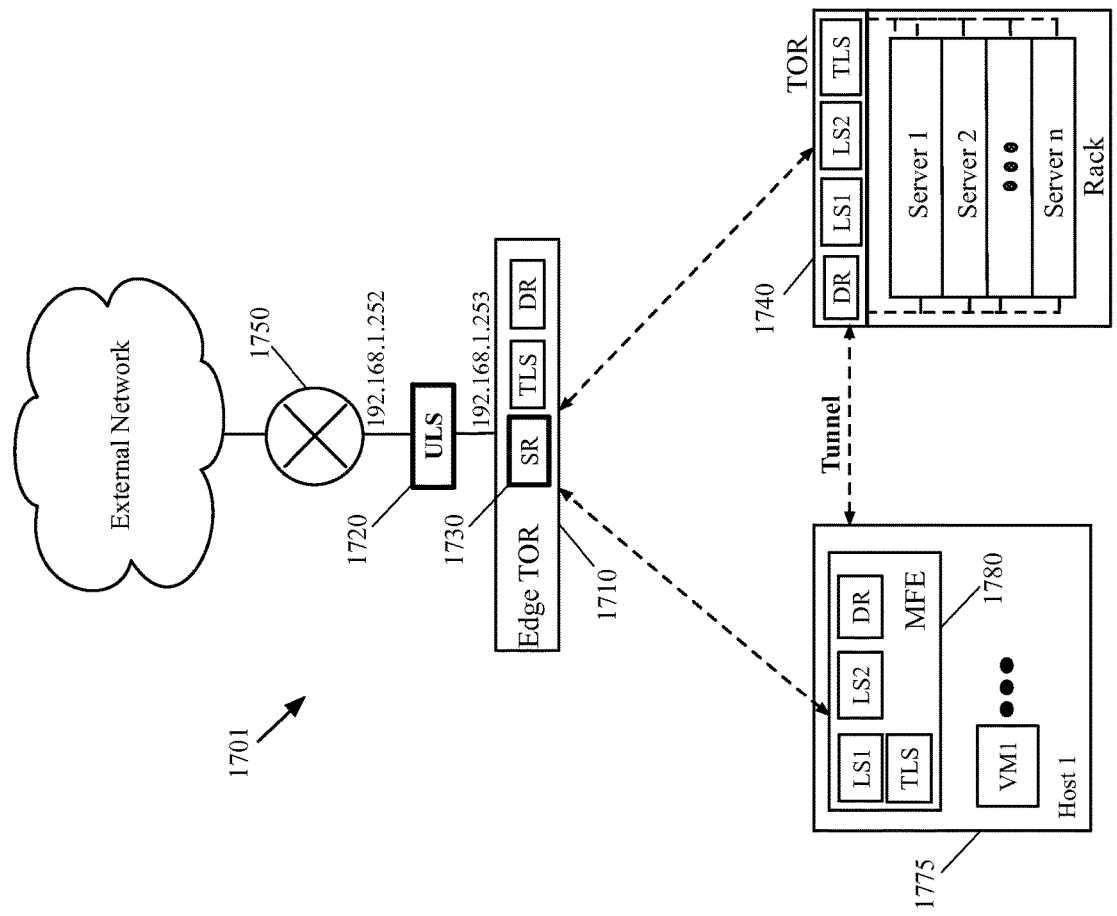
FIG. 17 illustrates a control plane view and physical realization of a logical network topology, in which an edge MHFE implements the service component of the logical router and communicates with external networks through the service component.
Figure 17:
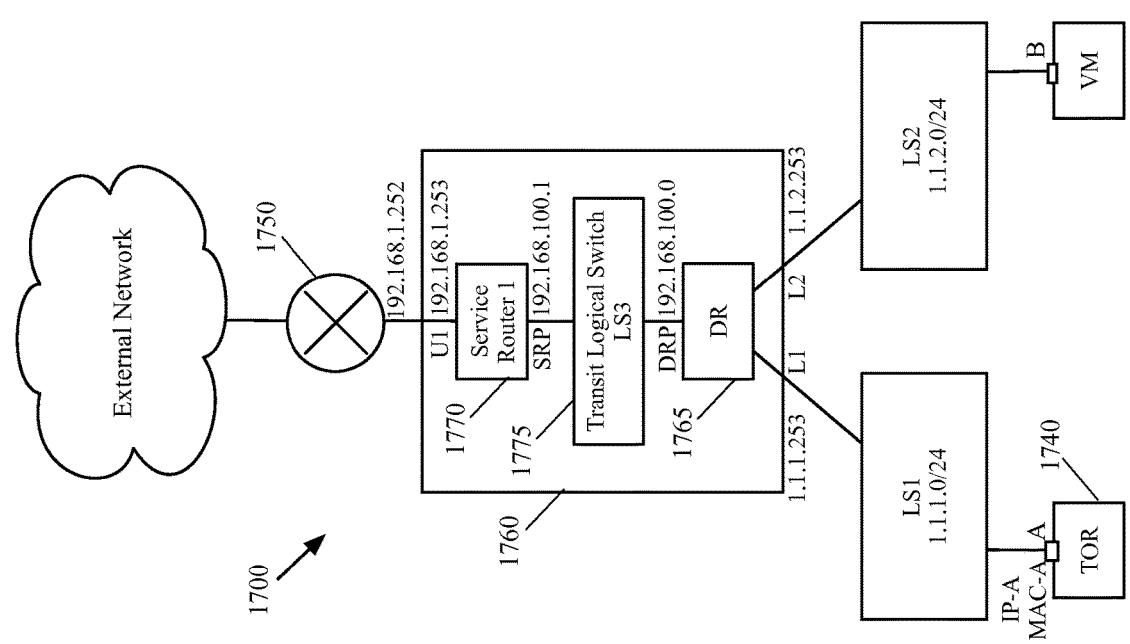

FIG. 17 illustrates a control plane view and physical realization of a logical network topology, in which an edge MHFE implements the service component of the logical router and communicates with external networks through the service component. Specifically this figure illustrates a control plane view 1700 of the logical network topology 1400 of FIG. 14 and a physical realization 1701 of this logical network topology. The control plane view illustrates a logical router 1760 that is configured (by the control plane) to have a DR 1765 that is the southbound interface of the logical router (connected to logical switches LS1 and LS2), and a SR that is the northbound interface of the logical router (connected to the next hop physical router 1750).

The control plane view also shows that the physical port A on TOR switch 1740 is logically connected to the logical network through the logical switch LS1, while port B of VM1 (that is physically implemented by the MFE 1780 running on the host machine 1775) is logically connected to the logical network through the logical switch LS2.

The physical realization shows a host machine 1775, a TOR switch 1740, and an edge TOR 1710. The host machine 1775 executes the virtual machine VM1 and the MFE 1780. The MFE 1780 implements the different logical switches of the logical network (i.e., LS1 and LS2) as well as the DR and TLS of the logical router 1760. The TOR switch 1740 has several servers (e.g., third-party servers) Server1-Server(n) connected to its ports and as such connects these servers to the logical router 1760 and the logical switches LS1 and LS2 by implementing the DR 1765 of the logical router 1760 and the logical switches LS1 and LS2, respectively.

In this example, the user has attached, in the definition of the logical router, the uplink interface of the logical router to the edge TOR switch 1710. That is, when the control plane receives the user definition of the logical router 1760, the control plane realizes that the MAC and IP addresses of the uplink port of the logical router (port U1) are assigned to one of the physical ports of the edge TOR switch 1710. As such, the control plane of some embodiments configures the edge TOR switch 1710 to implement the SR of the logical switch (as illustrated in the OVSDB tables below by reference to FIG. 18).

The control plane also defines a new uplink logical switch 1720. The southbound port of the ULS 1720 is defined to be associated with the physical port of the edge TOR switch 1710 that is bound to the uplink port of the logical router. As shown, the southbound port of the ULS is associated with the physical port of the TOR switch, which has the IP address of port U1 (192.168.1.253), while the northbound port of the ULS is associated with the southbound port of the physical router 1750 which has the IP address of 192.168.1.252. In this manner, and as described below in the provided packet processing example, any logical network L3 packet that is to be sent to a machine in an external network will be sent out of the logical network through the physical port of the edge TOR switch 1710 that is associated with the southbound port of the ULS 1720.

Although the uplink logical switch 1720 is illustrated as a separate network element in the physical realization of the logical network topology, it should be understood that this ULS 1720 is implemented by the edge TOR switch 1710 similar to the TLS 1775, SR 1770, and DR 1765 of the logical router 1760. It is not a separate network element in the physical implementation. The ULS logical switch 1720 is only shown as a separate element to demonstrate the connection of TOR switch 1740 with the external network.

It is also important to note that although the edge TOR switch 1710 shown in the figure is a separate TOR switch from the TOR switch 1740 that logically connects the physical servers to the logical network, some embodiments configure the same TOR switch 1740 to act as the gateway of the logical network as well. That is, when a user defines the logical router in such a way that the uplink port of the logical router is mapped to a physical port of the TOR switch 1740, the control plane of some embodiments configures the SR of the logical router to be implemented by the TOR switch 1740.

The control plane also defines a new ULS that connects the mapped port of the TOR switch to the external networks in the same manner that is described above. Therefore for the same TOR switch, a first set of physical ports are logically connected to a logical network to connect a set of physical machines and devices to the logical network, while a second set of physical ports are connected to one or more external networks. This way, a single TOR switch is able to connect all the machines of one or more logical networks to one or more external networks.

It should also be understood that even though in all of the examples provided above and below, the MHFE is logically connected to one logical network, an MHFE may logically connect to many more logical networks (of many other tenants of a datacenter) at the same time. In some embodiments, an MHFE can connect to one logical network through one set of physical ports while it can connect to a second logical network through a second set of physical ports.

Figure 18:
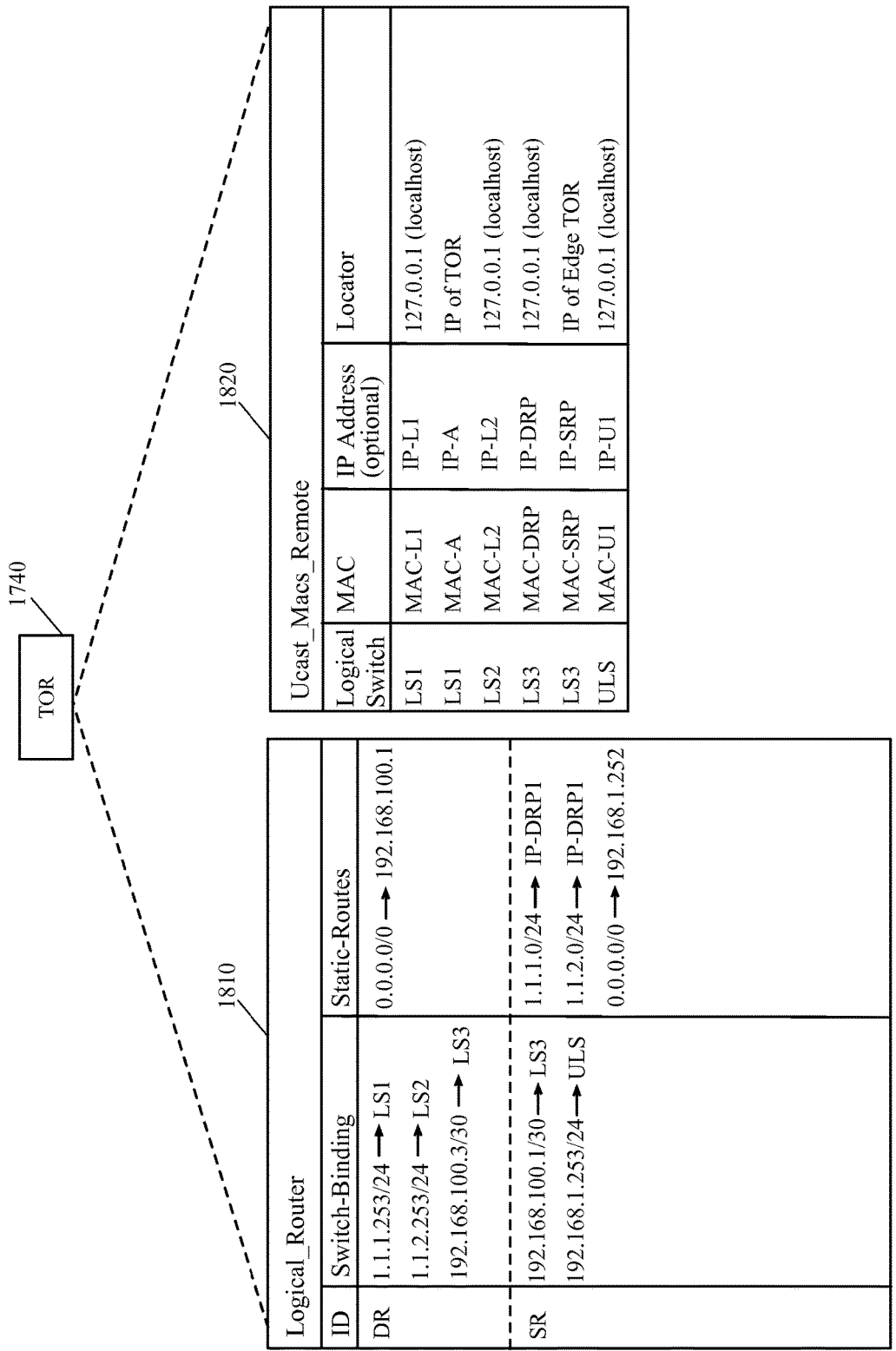
FIG. 18 illustrates an example of the configuration data propagated in different database tables stored on an MHFE using the OVSDB schema in order to configure the MHFE as an edge node of the logical router.

FIG. 18 illustrates an example of the configuration data propagated in different database tables stored on the edge MHFE of FIG. 17, using the OVSDB schema. Specifically, this figure shows a logical router table 1810 (Logical_Router table) and a tunnel endpoint locator table 1820 (Ucast_Macs_Remote).

The logical router table 1810 (Logical Router table) includes a DR row for the distributed router 1765 and an SR row for the service router 1770. The corresponding switch binding field for the DR has the IP address of logical port L1 (1.1.1.253/24) which is mapped to the logical switch LS1; the IP address of logical port L2 (1.1.2.253/24) which is mapped to the logical switch LS2; and the IP address of logical port DRP (192.168.100.3) which is mapped to the transit logical switch (LS3). The only static route populated in the static routes field for the DR is the default route which is through the IP address of the southbound interface SRP (192.168.100.1) of the SR 1770.

The logical router table 1810 also shows that the switch-binding field for the service routing component SR maps two IP addresses to two different logical switches. This is because unlike the previous examples, the northbound port of the SR is also associated with a logical port of a logical switch (i.e., ULS). Therefore, the IP address of the southbound logical port SRP (192.168.100.1/30) is mapped to the transit logical switch LS3, while the IP address of the northbound logical port U1 (192.168.1.253) is mapped to the uplink logical switch ULS. Finally, the static routes for the service router is the remaining routes of the FIB of the SR. As shown, the static routes include, a default route which is through the IP address of the southbound interface of the physical router 1750 (192.168.1.253), and any packet with the destination subnet address of LS1 and/or LS2 should be routed through the northbound interface of the DR (i.e., port DRP with IP address of 192.168.100.0).

The tunnel endpoint locator table 1820 shows how the control plane has populated the different fields in the OVSDB schema in order to configure both TOR switch 1740 and edge TOR switch 1710. As described above, the control plane of some embodiments populates the IP address of each logical port of the routing components in this field in order to (1) link the table 1820 (i.e., Ucast_Macs_Addresses table) to the table 1810 (Logical_Router table) and (2) enable the TOR switches 1710 and 1740 to infer the MAC addresses of the logical router ports and thereby identify the packets that are destined for the logical router implemented by the TOR switch.

As shown in the table 1820, the MAC address of port A (MAC-A) of the TOR switch 1740 (of FIG. 17) is associated with a logical port of the logical switch LS1 and has a corresponding IP address of IP-A. The tunnel endpoint locator for the logical switch LS1 indicates that the TOR switch 1740 is implementing this logical switch for this port MAC address (MAC-A). Additionally, the MAC address of southbound port of the SR (MAC-SRP) is associated with a logical port of the transit logical switch LS3 and has a corresponding IP address of IP-SRP. Unlike all of the previous examples in which the transit logical switch associated with the SR port was implemented on a gateway machine, the SR in this example is implemented on the edge TOR switch 1710. The tunnel endpoint locator for the logical switch LS3 indicates that TOR switch 1710 is implementing the logical switch for this port MAC address (MAC-SRP).

Furthermore, as described above, the newly defined uplink logical switch 1720 (ULS) for the uplink port of the logical router is not a VXLAN backed logical switch. In other words, this logical switch (ULS) does not participate in the mesh of overlay tunnels between the managed forwarding elements (e.g., MFEs and MHFEs) that implement the logical switches. As such, the locator field of the table 1820 for the MAC address of port U1 that is associated with the logical switch ULS is propagated (by the control plane) with the fixed loopback address 127.0.0.1 (localhost). As described before, this address indicates that no tunnel should be established to any other managed forwarding element for logical switch 1720.

As an example, when the TOR switch receives a packet that has a destination MAC address MAC-SRP in the data link layer of the packet header, the TOR switch of some embodiments retrieves the corresponding IP address for this MAC address (i.e., IP address IP-SRP) from the tunnel endpoint locator table 1820 and matches this IP address against the IP addresses of the logical router table 1810. The TOR switch then realizes that the MAC address belongs to one of the ports of the SR that is associated with the transit logical switch LS3. As such, the TOR switch concludes that the packet is an L3 packet and starts L3 processing on the packet.

In some other embodiments, as described above, the control plane tags the MAC addresses of the logical ports of a logical router during the configuration of the tunnel endpoint locator table. The control plane tags these MAC addresses by populating a corresponding IP address for each MAC address of the table and linking the corresponding IP addresses to the IP addresses of logical ports of the logical router populated in the logical router table. In some such embodiments, the TOR switch simply looks up the MAC address of the received packet in the tunnel endpoint locator table 1820 and starts L3 processing on the packet when the MAC address of the packet matches one of the tagged MAC addresses in the table.

An example packet processing which involves north-south routing is now described. In the example, the physical machine is connected to port A of the hardware VTEP that is associated with the logical switch LS1 as shown in FIG. 17, and has an IP address of IP-A (1.1.1.1) and a MAC address of MAC-A. Also the virtual machine VM has a virtual interface (port B) which is implemented on MFE 1780. In the provided example the physical machine on port A, sends a packet to a machine connected to an external network with an IP address of 10.10.10.10.

The default gateway for the TOR switch 1740 is the L1 port of the DR 1765 (the default gateway has been assigned to the TOR switch by assigning a static IP address to its different ports including port B, or through a DHCP service). The default gateway port L1 is in the same subnet as port A and has an IP address of 1.1.1.253 and a MAC address of MAC-L1 as shown in the FIG. 17. Therefore, the physical machine (e.g. a server connected to port A of the TOR switch) sends an L3 packet that has a destination MAC address of MAC-L1, a source MAC address of MAC-A, a destination IP address of 10.10.10.10 (i.e. the IP address of external machine connected to the external network), and a source IP address of IP-A.

It should be noticed that the MAC address of the default gateway port can be learned by sending an ARP request from the physical machine (e.g., server) connected to port A to the hardware VTEP, which in response yields the MAC address using the Ucast_Macs_Remote table (since the hardware VTEP knows that port A is associated with the logical switch LS1 and therefore the MAC address associated with this logical switch in the table is MAC-L1).

After the L3 packet is received at the TOR switch 1740, the TOR switch realizes that the packet is an L3 packet because the destination MAC address of the packet is MAC-L1, which is a MAC address of one of the ports of the logical router. As such, the TOR switch performs L3 processing on the packet. The TOR switch starts to perform the L3 processing by replacing the destination MAC address of the packet (MAC-L1) with the destination MAC address of the SRP port of SR 1770 associated with one of the logical ports of the transit logical switch LS3. The TOR switch also replaces the source MAC address MAC-A with the MAC address of northbound logical port of the DR 1765. The source and destination IP addresses remain the same.

In order to replace the source MAC address, the TOR switch 1740 looks at the static route column of the logical router table 1810 (shown in FIG. 18) and based on the destination IP address of the packet (i.e., 10.10.10.10) determines that the packet should be sent from the egress port of the DR to the default port SRP (192.168.100.1) of the SR 1770. The TOR switch also looks up the destination IP address in the tunnel locator table 1820 and the matched record in this table yields the southbound logical port of the SR as well as the tunnel endpoint locator address of the edge TOR switch 1710 that implements the transit logical switch LS3 associated with this port (port SRP). The TOR switch then establishes a VXLAN tunnel to the identified tunnel endpoint (TOR switch 1710) and sends the packet to the destination port using the VXLAN tunnel (e.g., after adding the tunnel encapsulation data to the packet).

When the packet arrives at the edge TOR switch 1710, the edge TOR switch from the tunnel endpoint locator table 1820 for MAC-SRP, and the logical router table for SR, infers that the destination MAC address of the packet belongs to a logical router port and as such the packet is an L3 packet. Hence, the edge TOR switch 1710 starts to run logical router functionalities on the packet. Based on the static routes of the logical router table, the edge TOR switch realizes that the packet needs to be routed to the next hop physical router 1750 (192.168.1.252) from the uplink port U1 (192.168.1.253). These two IP addresses are associated with the uplink logical switch 1720 (ULS).

If needed, the edge TOR switch would perform an ARP request for the IP address of the physical router (192.168.1.252) from port U1 (using IP-U1 as source IP, and MAC-ill as source MAC, which are provided in the table 1820). Once, the ARP request is resolved, the edge TOR switch would have the MAC address of the southbound port of the physical router 1750. As such, the edge TOR switch 1710 replaces the destination MAC address with the MAC address of the physical router port that has the corresponding IP address 192.168.1.252. The edge TOR switch also replaces the source MAC address with the MAC address of the uplink port U1 (MAC-U1) and sends the packet to the next hop physical router through the physical port on which the MAC address MAC-ill is mapped.

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 19:
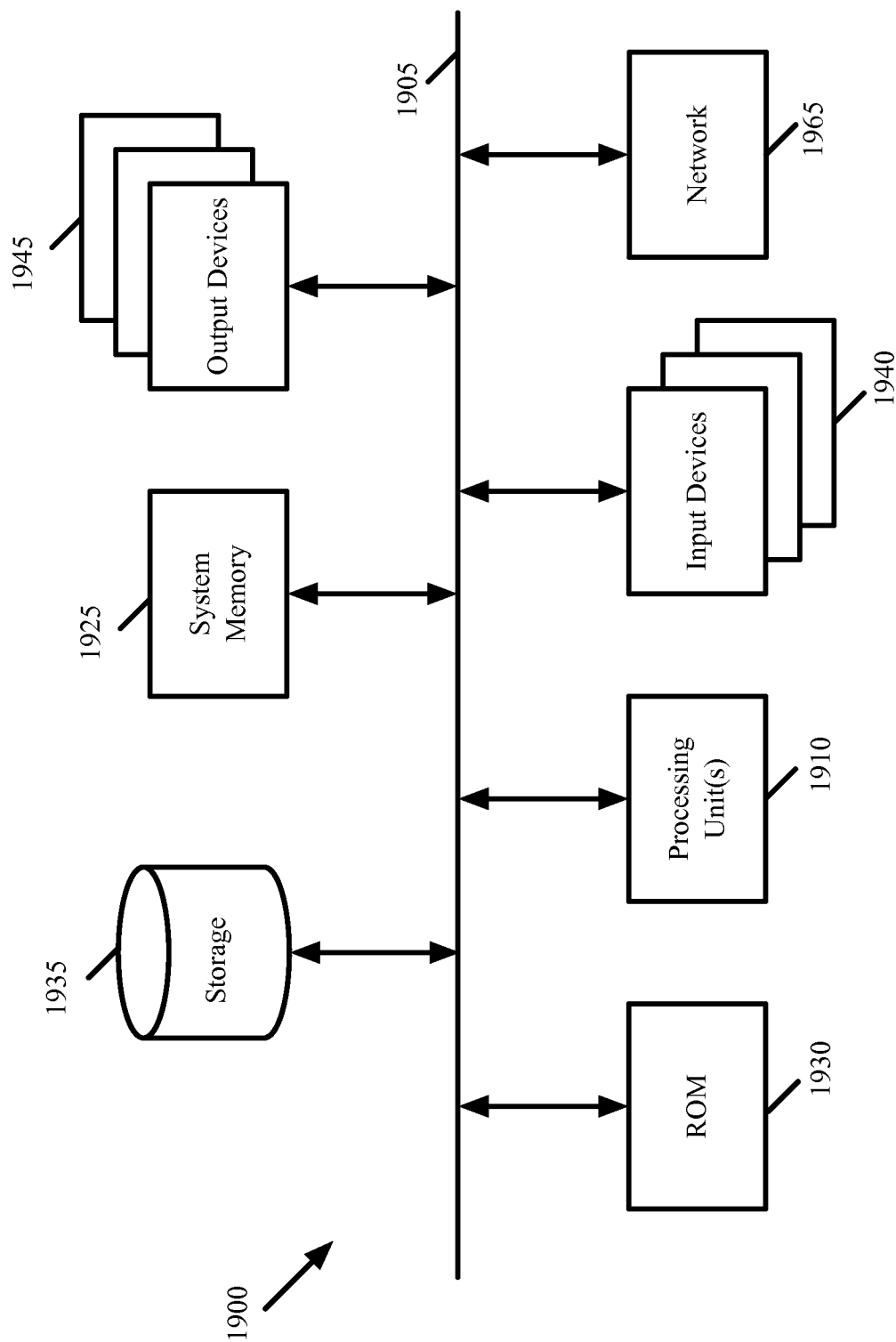
FIG. 19 conceptually illustrates an electronic system with which some embodiments of the invention are implemented.

FIG. 19 conceptually illustrates an electronic system 1900 with which some embodiments of the invention are implemented. The electronic system 1900 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1900 includes a bus 1905, processing unit(s) 1910, a system memory 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the system memory 1925, and the permanent storage device 1935.

From these various memory units, the processing unit(s) 1910 retrieves instructions to execute and data to process in order to execute the processes of the invention. The processing unit(s) may be a single processor or a multi-core processor in different embodiments.

The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive) as the permanent storage device 1935.

Other embodiments use a removable storage device (such as a floppy disk, flash memory device, etc., and its corresponding drive) as the permanent storage device. Like the permanent storage device 1935, the system memory 1925 is a read-and-write memory device. However, unlike storage device 1935, the system memory 1925 is a volatile read-and-write memory, such a random access memory. The system memory 1925 stores some of the instructions and data that the processor needs at runtime. In some embodiments, the invention's processes are stored in the system memory 1925, the permanent storage device 1935, and/or the read-only memory 1930. From these various memory units, the processing unit(s) 1910 retrieves instructions to execute and data to process in order to execute the processes of some embodiments.

The bus 1905 also connects to the input and output devices 1940 and 1945. The input devices 1940 enable the user to communicate information and select commands to the electronic system. The input devices 1940 include alphanumeric keyboards and pointing devices (also called "cursor control devices"), cameras (e.g., webcams), microphones or similar devices for receiving voice commands, etc. The output devices 1945 display images generated by the electronic system or otherwise output data. The output devices 1945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 19, bus 1905 also couples electronic system 1900 to a network 1965 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

Additionally, the term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. In addition, a number of the figures (including FIGS. 6 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for using a managed hardware forwarding element (MHFE) to perform packet forwarding operations for a logical network, the method comprising:
   receiving at the MHFE data that defines a logical router and a plurality of logical switches of the logical network that connects a plurality of end machines operating on a plurality of host computers to a plurality of physical machines that are connected to the MHFE;
   using the received data to configure a set of forwarding tables of the MHFE in order to define the logical router and the plurality of logical switches on the MHFE; and
   using the set of forwarding tables at the MHFE to perform packet forwarding operations for the logical network,
   wherein the logical router spans the MHFE and forwarding elements on the host computers that implement the logical router, while each logical switch spans the MHFE and the forwarding elements on the host computers that implement the logical switch;
   wherein the forwarding elements on the host computers connect to the end machines operating on the host computers and the MHFE connects to the end machines only through the forwarding elements on the host computers as the MHFE is a standalone hardware appliance that operates outside of the host computers.

2. The method of claim 1, wherein the plurality of logical switches are logically connected through the logical router.

3. The method of claim 1, wherein a set of the forwarding elements on a set of host computers are software forwarding elements executing on the set of host computers.

4. The method of claim 1, wherein the received data includes data regarding the logical ports of the logical switches and logical routers.

5. The method of claim 4, wherein the received data comprises:
   for each logical port of the logical router, a network address and a data link address;
   for each logical port of each logical switch, linking data comprising a corresponding network address for each data link address of each port that is associated with a logical switch, including the logical ports of the logical router.

6. The method of claim 5, wherein the MHFE identifies the logical network packets that are destined for the logical router by identifying a destination data link address in a data link header of a received packet of the logical network, and determining that the identified data link address is a data link address of a logical port of a logical router by identifying a corresponding network address of the identified destination data link address of the received packet, and matching the retrieved network address against a network address of the logical port.

7. The method of claim 4, wherein the set of forwarding tables of the MHFE comprises first and second tables, wherein using the received data to configure the set of forwarding tables comprises:
   for each logical port of each logical switch, storing in the first forwarding table linking data for identifying the logical router when the logical port is connected to a logical port of the logical router; and
   for the logical router, storing in the second forwarding table a set routes for the logical router to use to perform forwarding operations.

8. The method of claim 7, wherein using the set of forwarding tables comprises using the first and second forwarding tables to perform packet forwarding operations at the MHFE.

9. The method of claim 7, wherein the first table further stores a tunnel endpoint address for a forwarding element that executes on a host computer to implement a logical switch that is associated with a port of a logical network element in order to establish a tunnel between the MHFE and the host computer that executes the forwarding element.

10. The method of claim 7, wherein the first and second tables are linked in order to enable the MHFE to identify logical network packets that are destined for the logical router, wherein the MHFE performs logical forwarding operations on the identified logical network packets by replacing source and destination data link addresses in a data link header of the packet in order to route the packet to a next hop or a destination of the packet.

11. A non-transitory machine readable medium storing a program for using a managed hardware forwarding element (MHFE) to perform packet forwarding operations for a logical network, the program comprising sets of instructions for:
receiving at the MHFE data that defines a logical router and a plurality of logical switches of the logical network that connects a plurality of end machines operating on a plurality of host computers to a plurality of physical machines that are connected to the MHFE;
using the received data to configure a set of forwarding tables of the MHFE in order to define the logical router and the plurality of logical switches on the MHFE; and
using the set of forwarding tables at the MHFE to perform packet forwarding operations for the logical network,
wherein the logical router spans the MHFE and forwarding elements on the host computers that implement the logical router, while each logical switch spans the MHFE and the forwarding elements on the host computers that implement the logical switch;
wherein the forwarding elements on the host computers connect to the end machines operating on the host computers and the MHFE connects to the end machines only through the forwarding elements on the host computers as the MHFE is a standalone hardware appliance that operates outside of the host computers.

12. The non-transitory machine readable medium of claim 11, wherein the plurality of logical switches are logically connected through the logical router.

13. The non-transitory machine readable medium of claim 11, wherein a set of the forwarding elements on a set of host computers are software forwarding elements executing on the set of host computers.

14. A method for configuring a managed hardware forwarding element (MHFE) to perform packet forwarding operations for a logical network, the method comprising:
receiving data for the logical network that defines a logical router and a set of logical switches for logically connecting a plurality of end machines operating on a plurality of host machines to a plurality of physical machines that are connected to the MHFE;
defining a plurality of routing components for the logical router based on the received logical network data, each routing component comprising a separate set of logical ports; and
configuring a forwarding table on the MHFE by populating the forwarding table with tunnel endpoint data for each logical port of each routing component of the logical router that is associated with a logical port of a logical switch;
wherein the logical router spans the MHFE and forwarding elements on the host machines that implement the logical router, while each logical switch spans the MHFE and the forwarding elements on the host machines that implement the logical switch;
wherein the forwarding elements on the host machines connect to the end machines operating on the host machines and the MHFE connects to the end machines only through the forwarding elements on the host machines as the MHFE is a standalone hardware appliance that operates outside of the host machines.

15. The method of claim 14, wherein each forwarding element operates on a host machine on which a subset of the plurality of end machines reside.

16. The method of claim 14, wherein the tunnel endpoint data populated for each logical port of the remaining routing components in the plurality of routing components indicate a tunnel endpoint network address for a forwarding element that implements the logical switch in order to establish a tunnel from the MHFE to the forwarding element for exchanging network data.

17. The method of claim 16, wherein the logical switch comprises logical ports, one of which is associated with a logical port of the routing component for which the tunnel is established.

18. The method of claim 15, wherein a particular routing component comprises a distributed router that is also implemented by both the MHFE and the forwarding elements, wherein every other routing component in the plurality of routing components comprises a service router that is neither implemented by the MHFE nor by any of the forwarding elements.

19. The method of claim 18, wherein the logical router further connects the logical network to one or more external physical networks, wherein each service router is implemented on a gateway machine that connects the logical network to the one or more external physical networks.

20. The method of claim 18 further comprising, based on the definition of the logical router, defining a transit logical switch for logically handling traffic between the distributed router and the service routers, wherein the MHFE, gateway machines, and the forwarding elements further implement the transit logical switch.

* * * * *